(12) United States Patent
Saito et al.

(10) Patent No.: US 11,906,300 B2
(45) Date of Patent: Feb. 20, 2024

(54) ABSOLUTE ENCODER

(71) Applicant: MINEBEA MITSUMI Inc., Nagano (JP)

(72) Inventors: Katsunori Saito, Kanagawa (JP); Hiroki Negishi, Tokyo (JP); Yasuo Osada, Saitama (JP); Norikazu Sato, Saitama (JP)

(73) Assignee: MINEBEA MITSUMI Inc., Nagano (JP)

(*) Notice: Subject to any disclaimer, the term of this patent is extended or adjusted under 35 U.S.C. 154(b) by 351 days.

(21) Appl. No.: 17/593,638

(22) PCT Filed: Mar. 24, 2020

(86) PCT No.: PCT/JP2020/013012
§ 371 (c)(1),
(2) Date: Sep. 22, 2021

(87) PCT Pub. No.: WO2020/203467
PCT Pub. Date: Oct. 8, 2020

(65) Prior Publication Data
US 2022/0196380 A1    Jun. 23, 2022

(30) Foreign Application Priority Data
Mar. 29, 2019    (JP) .................................. 2019-066046

(51) Int. Cl.
*G01B 7/30*    (2006.01)
(52) U.S. Cl.
CPC ...................................... *G01B 7/30* (2013.01)
(58) Field of Classification Search
CPC .... G01D 2205/28; G01D 5/145; G01D 5/245; G01B 7/30
See application file for complete search history.

(56) References Cited

U.S. PATENT DOCUMENTS 6,424,928 B1 * 7/2002 Elliott .................... G01D 5/145
702/182
7,584,818 B2 * 9/2009 Choi .................. B62D 15/0235
180/444
(Continued)

FOREIGN PATENT DOCUMENTS

JP    2011-033601    2/2011
JP    2012-005260    1/2012
(Continued)

OTHER PUBLICATIONS

International Search Report of Int. Appl. No. PCT/JP2020/013012 dated Jun. 30, 2020.
(Continued)

*Primary Examiner* — Thomas C Diaz
(74) *Attorney, Agent, or Firm* — IPUSA, PLLC

(57) ABSTRACT

An absolute encoder suitable for size reduction is provided. An absolute encoder includes: a first driving gear configured to rotate according to rotation of a spindle; a first driven gear having a center axis perpendicular to a center axis of the first driving gear and configured to engage with the first driving gear; and a second driving gear provided coaxially with the first driven gear and configured to rotate according to rotation of the first driven gear. The absolute encoder includes a permanent magnet (8) provided on a layshaft gear (5A) having a center axis perpendicular to the center axis of the first driven gear and where a worm wheel portion (52*e*) is formed to engage with the second driven gear; and a resin sheet (5A1) provided on the layshaft gear (5A) to prevent the permanent magnet (8) from coming out from the layshaft gear (5A) in the axial direction.

7 Claims, 42 Drawing Sheets

(56) References Cited

U.S. PATENT DOCUMENTS

| | | | |
|---|---|---|---|
| 8,847,584 B2* | 9/2014 | Steinich | G01D 5/04 |
| | | | 324/207.2 |
| 8,878,125 B2 | 11/2014 | Miyajima et al. | |
| 2004/0007067 A1* | 1/2004 | Meyer | B60R 1/074 |
| | | | 73/514.31 |
| 2011/0247440 A1* | 10/2011 | Warke | F16H 1/16 |
| | | | 74/405 |
| 2020/0132507 A1 | 4/2020 | Osada | |

FOREIGN PATENT DOCUMENTS

| | | |
|---|---|---|
| JP | 2012-016235 | 1/2012 |
| JP | 2013-024572 | 2/2013 |
| JP | 2014-042431 | 3/2014 |
| JP | 2018-119883 | 8/2018 |
| JP | 2019-015536 | 1/2019 |
| TW | 201003043 | 1/2010 |

OTHER PUBLICATIONS

Office Action dated Feb. 6, 2023 with respect of the corresponding Taiwanese patent application No. 109110169.

\* cited by examiner

ABSOLUTE ENCODER

TECHNICAL FIELD

The present invention relates to an absolute encoder.

BACKGROUND ART

Conventionally, when controlling various mechanical devices, it is known to use rotary encoders to detect positions and angles of movable elements. Such encoders include incremental encoders for detecting a relative position or angle, and absolute encoders for detecting an absolute position or angle. For example, Patent Document 1 describes an absolute rotary encoder having a plurality of magnetic encoder parts for detecting angular positions of a spindle and a layshaft using magnetism, and configured to measure an absolute position of the spindle from results of the detection.

PRIOR ART DOCUMENTS

Patent Documents

[Patent Document 1] Japanese Laid-open Patent Publication No. 2013-24572

SUMMARY OF THE INVENTION

Problem to be Solved by the Invention

In the absolute encoder described in Patent Document 1, a magnetic field generating element (magnet) is provided at one end of the layshaft, and a magnetic field generated from the magnetic field generating element is detected by a magnetic detecting element. In this state, the magnetic detecting element may not be able to detect an appropriate angular position of the spindle if a center of the magnetic field generating element, a center of the layshaft, and a center of the magnetic detecting element become misaligned, if rotations of the magnetic field generating element and the layshaft are not synchronized, or the like.

In view of the above, the present invention has an object to provide an absolute encoder that enables to hold a magnet more reliably.

Means for Solving the Problem

According to an embodiment of the present invention, an absolute encoder includes a first driving gear configured to rotate according to rotation of a spindle; a first driven gear having a center axis perpendicular to a center axis of the first driving gear and configured to engage with the first driving gear; and a second driving gear provided coaxially with the first driven gear and configured to rotate according to rotation of the first driven gear. The absolute encoder includes a second driven gear having a center axis perpendicular to the center axis of the first driven gear and configured to engage with the second driven gear; a magnet provided on a cylindrical member where the second driven gear is formed; and a coming-out preventing member provided on the cylindrical member and configured to prevent the magnet from coming out from the cylindrical member in an axial direction.

Effects of the Invention

According to the present invention, an absolute encoder that enables to provide increase reliability can be provided.

EMBODIMENT FOR CARRYING OUT THE INVENTION

Hereinafter, a configuration of an absolute encoder according to embodiments of the present invention will be described in detail, with reference to the drawings. It should be noted that the present invention is not limited by the described embodiments.

Embodiment 1

Figure 1:
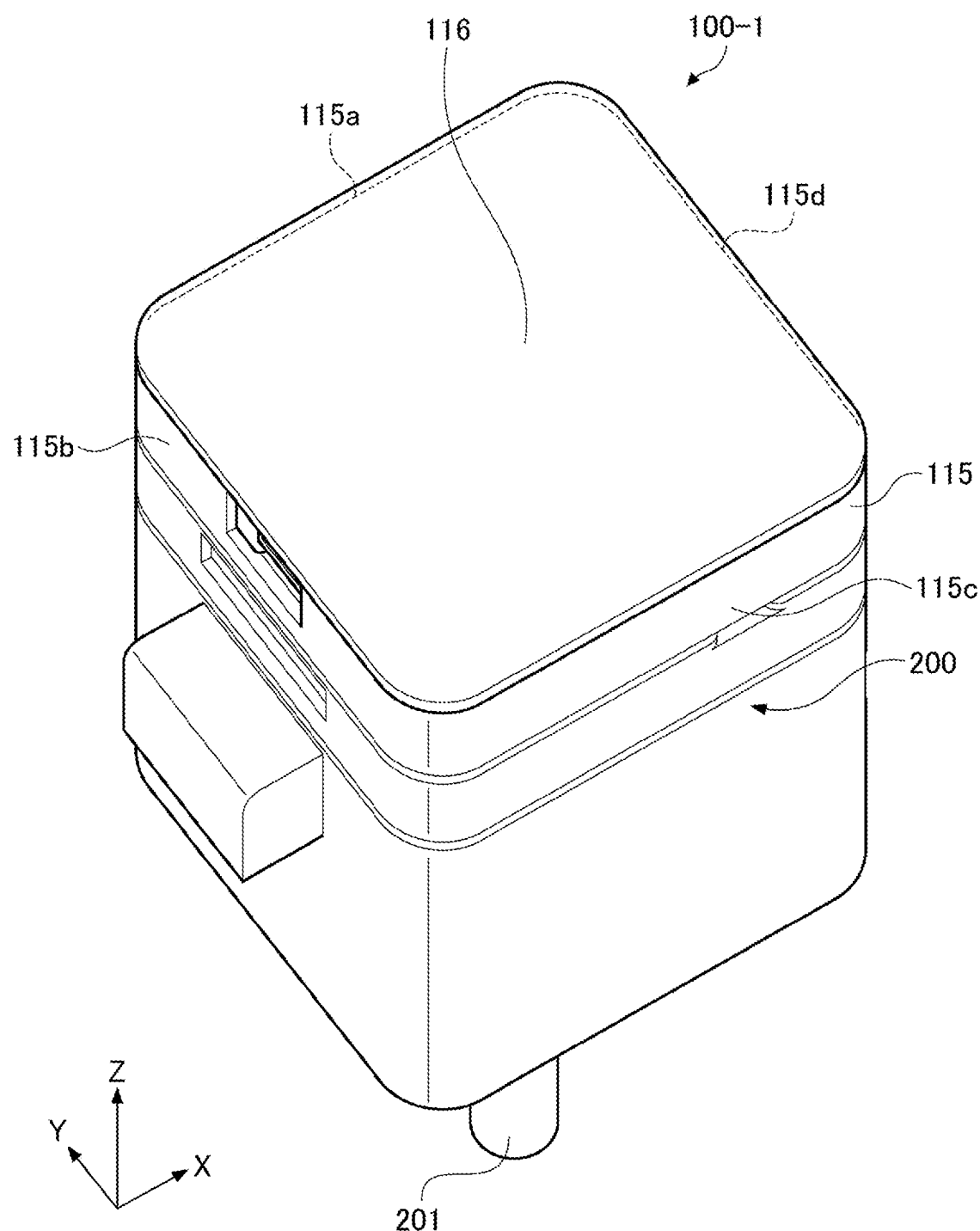
FIG. 1 is a perspective view illustrating a state in which an absolute encoder 100-1 according to an embodiment 1 of the present invention is attached to a motor 200.

FIG. 1 is a perspective view illustrating a state in which the absolute encoder 100-1 according to an embodiment 1 of the present invention is attached to the motor 200. The description hereinafter will be based on the XYZ orthogonal coordinate system. The X-axis direction corresponds to a horizontal left and right direction, the Y-axis direction corresponds to a horizontal front and rear direction, and the Z-axis direction corresponds to a vertical up and down direction. The Y-axis direction and the Z-axis direction are perpendicular to the X-axis direction, respectively. The X-axis direction may be referred to as the left direction or the right direction, the Y-axis direction may be referred to as the front direction or the rear direction, and the Z-axis direction may be referred to as the up direction or the down direction. In FIG. 1, a state viewed from above in the Z-axis direction is referred to as a plan view, a state viewed from the front in the Y-axis direction is referred to as a front view, and states viewed from the left and right in the X-axis direction are referred to as side views. Such designations of the directions do not limit an orientation in which the absolute encoder 100-1 is used, and the absolute encoder 100-1 may be used in a desired orientation. In addition, the illustration of a gear profile is omitted in the drawings.

Figure 2:
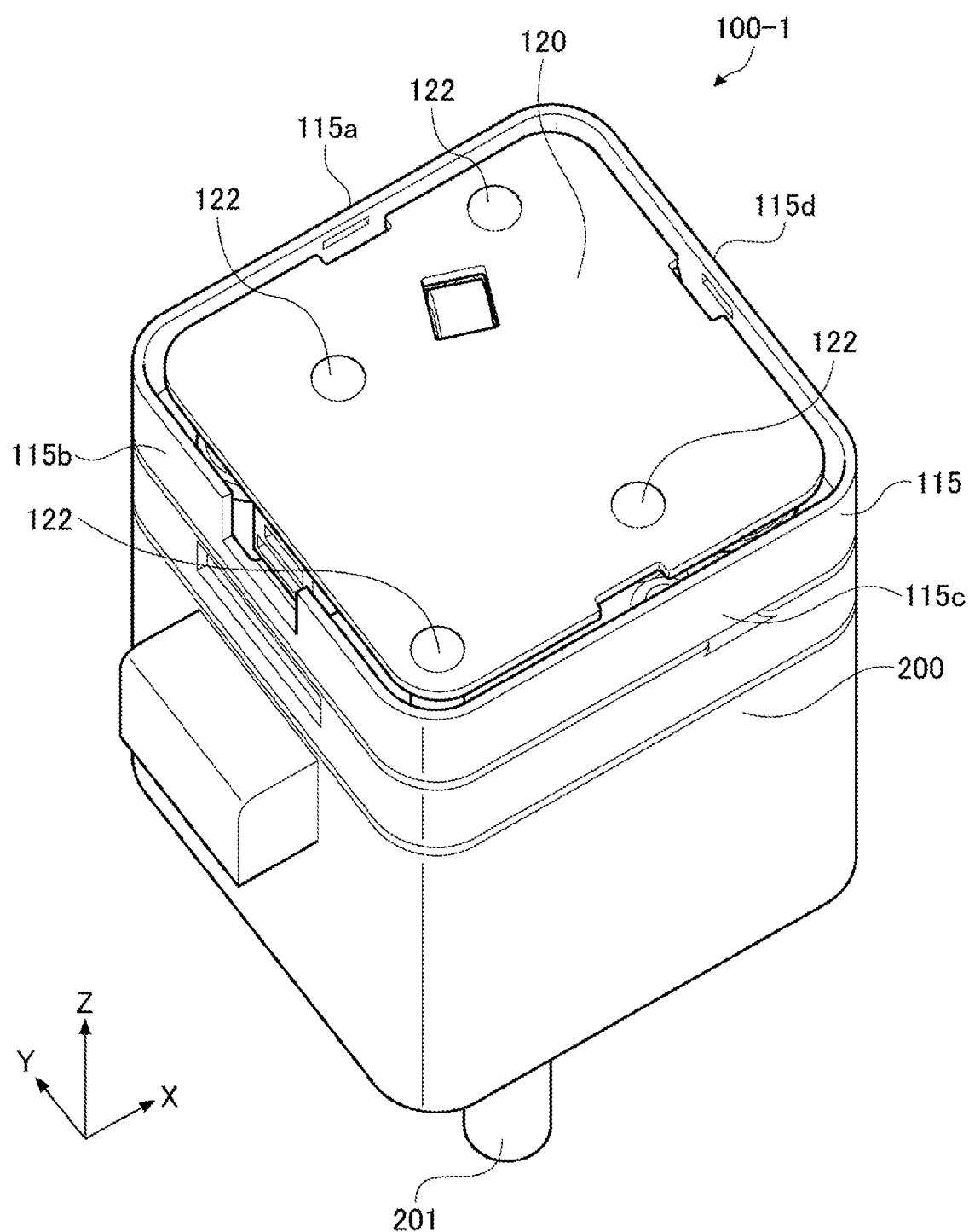
FIG. 2 is a perspective view illustrating a state in which a lid 116 is removed from a case 115 illustrated in FIG. 1.
Figure 3:
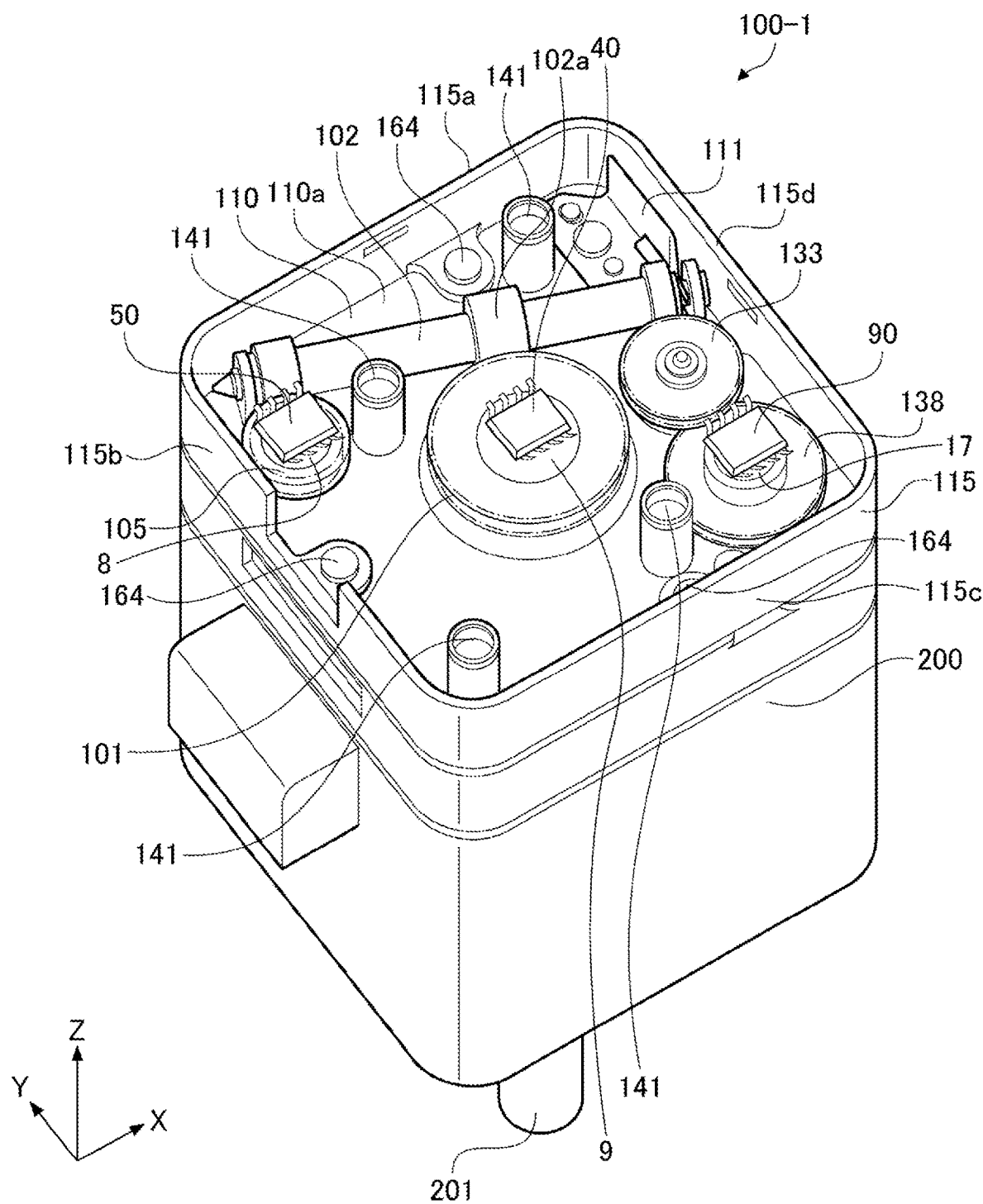
FIG. 3 is a perspective view illustrating a state in which a substrate 120 and substrate attaching screws 122 are removed from the absolute encoder 100-1 illustrated in FIG. 2.
Figure 4:
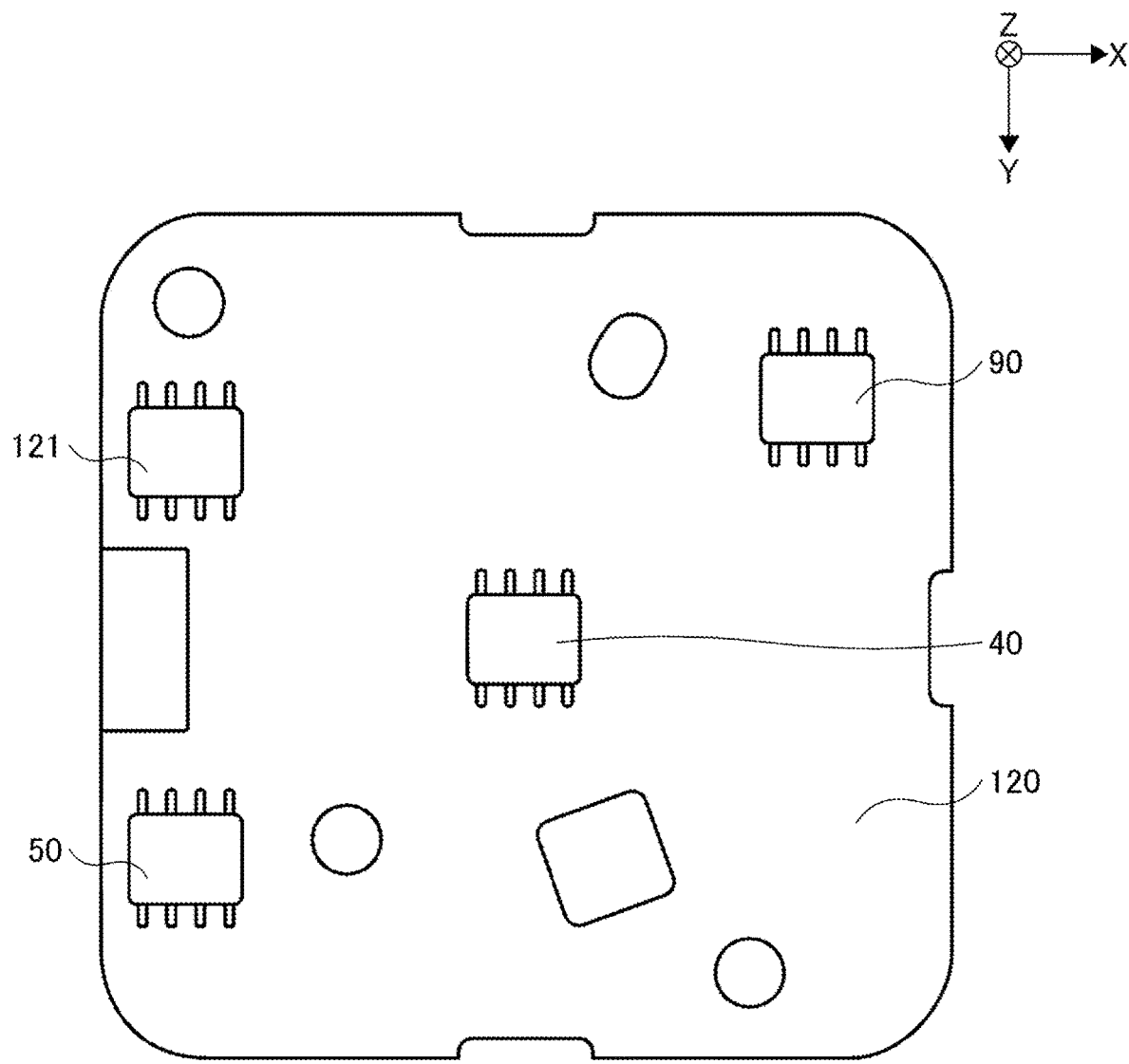
FIG. 4 is a bottom view of the substrate 120.
Figure 5:
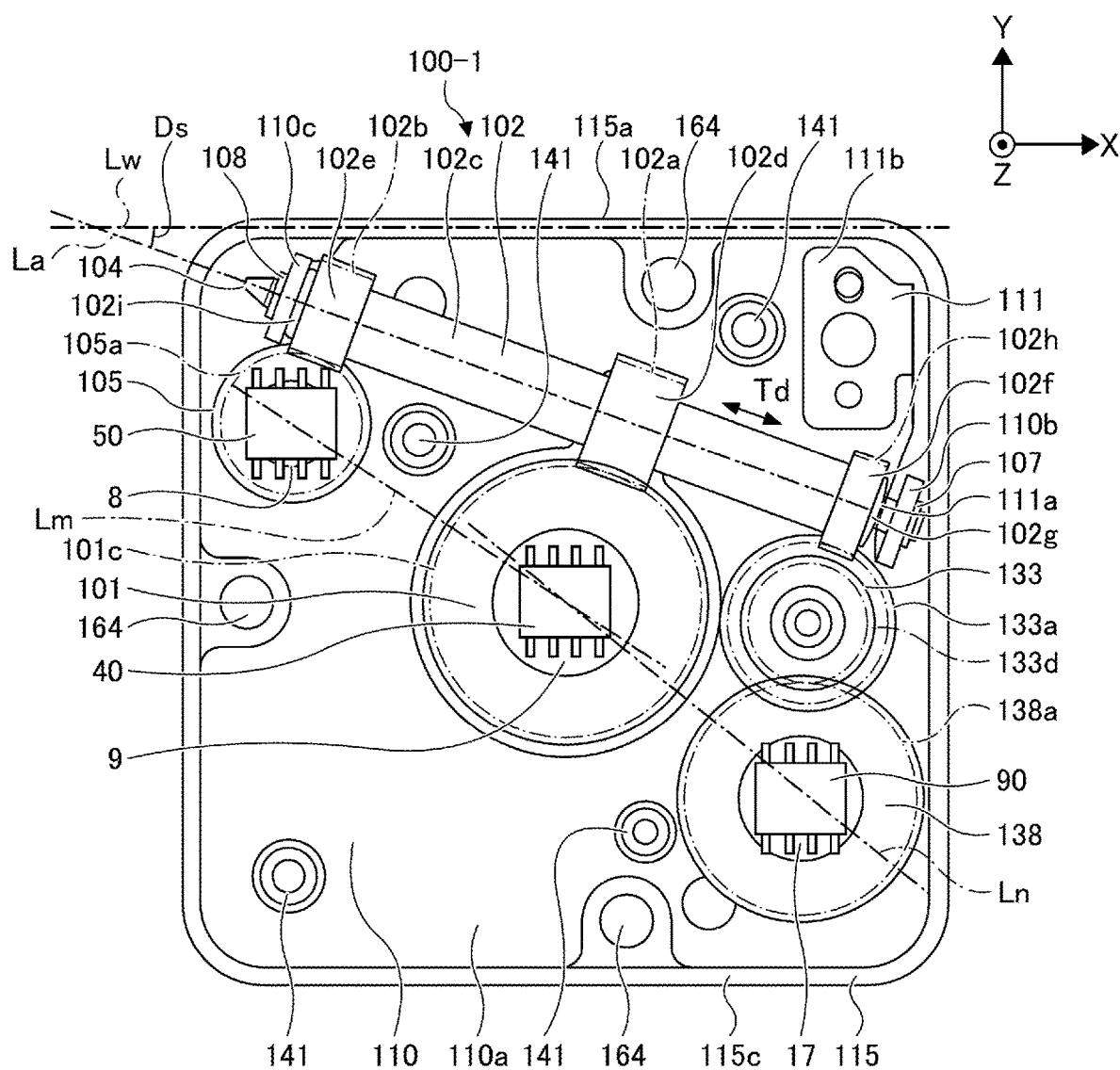
FIG. 5 is a plan view of the absolute encoder 100-1 illustrated in FIG. 3.
Figure 6:
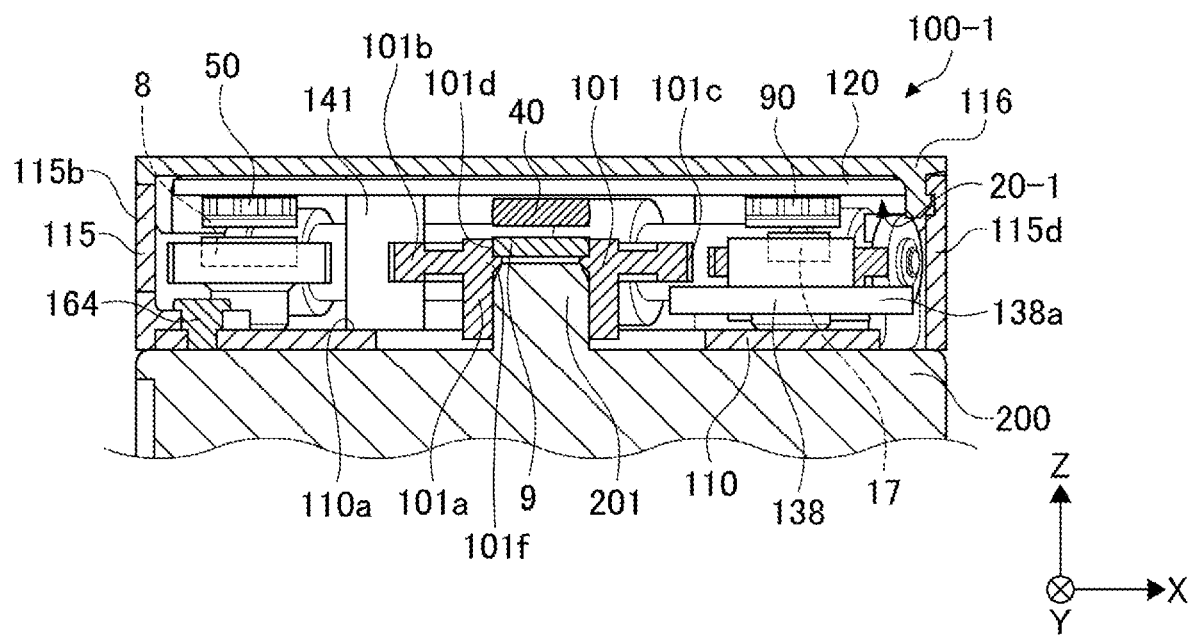
FIG. 6 is a cross sectional view of a state in which the absolute encoder 100-1 is cut along a plane passing through the center of a motor shaft 201 and parallel to an X-Z plane, where a second layshaft gear 138 and a magnetic sensor 90 are illustrated.
Figure 7:
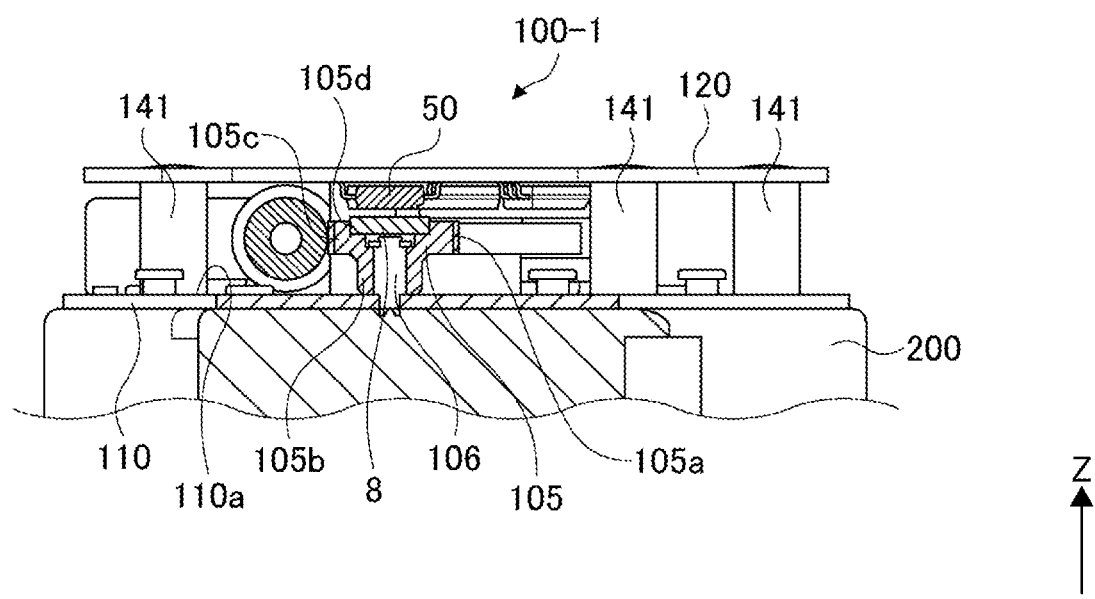
FIG. 7 is a cross sectional view of the absolute encoder 100-1 cut along a plane perpendicular to a center line of a first intermediate gear 102 and passing through a center of a first layshaft gear 105.
Figure 8:
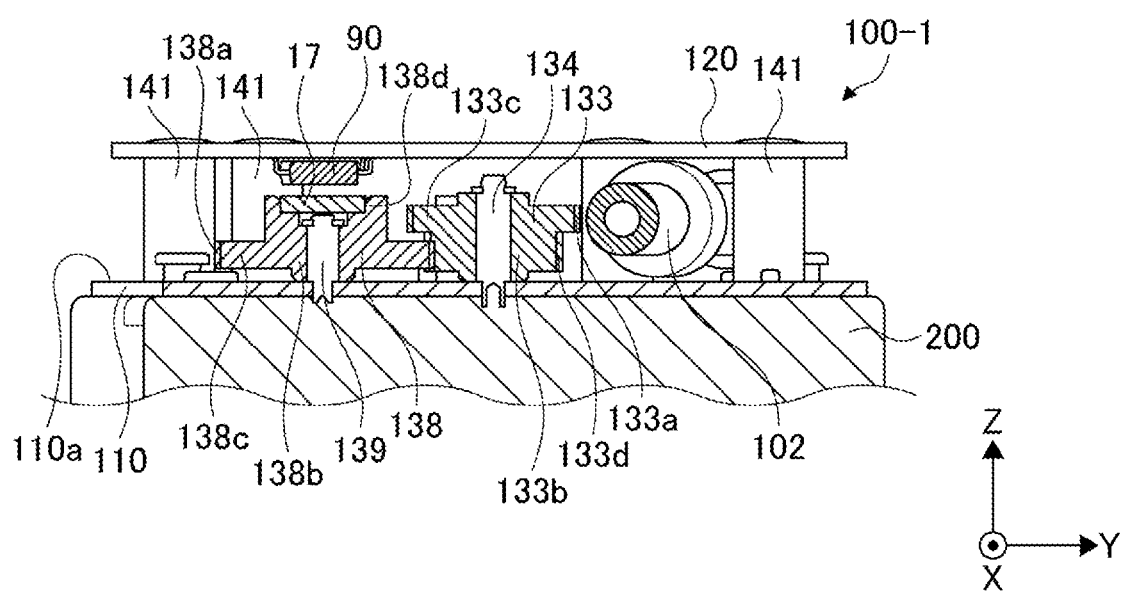
FIG. 8 is a cross sectional view of a state in which the absolute encoder 100-1 is cut along a plane passing through a center of the second layshaft gear 138 and a center of a second intermediate gear 133 and parallel to a Z-axis direction, viewed from approximately the right side.

FIG. 2 is a perspective view illustrating a state in which the lid 116 is removed from the case 115 illustrated in FIG. 1. FIG. 3 is a perspective view illustrating the substrate 120 and substrate attaching screws 122 removed from the absolute encoder 100-1 illustrated in FIG. 2. FIG. 4 is a bottom view of the substrate 120. FIG. 5 is a plan view of the absolute encoder 100-1 illustrated in FIG. 3. FIG. 6 is a cross sectional view of the absolute encoder 100-1 cut along a plane passing through the center of the motor shaft 201 and parallel to the X-Z plane. However, the second layshaft gear 138 and the magnetic sensor 90 are illustrated. FIG. 7 is a cross sectional view of the absolute encoder 100-1 cut along a plane perpendicular to the center line of the first intermediate gear 102 and passing through the center of the first layshaft gear 105. In FIG. 7, the illustration of the case 115 and the lid 116 is omitted. FIG. 8 is a cross sectional view of a state in which the absolute encoder 100-1 is cut along a plane passing through the center of the second layshaft gear 138 and the center of the second intermediate gear 133 and parallel to the Z-axis direction, viewed from approximately the right side. In FIG. 8, the illustration of the case 115 and the lid 116 is omitted.

Hereinafter, the configuration of the absolute encoder 100-1 will be described in detail, by referring to FIG. 1 through FIG. 8. The absolute encoder 100-1 is an absolute encoder which determines and outputs a rotation quantity over multiple revolutions of a spindle of the motor 200. The motor 200 may be a stepping motor or a brushless DC motor, for example. As an example, the motor 200 may be applied as a driving source which drives an industrial robot or the like via a deceleration mechanism, such as a harmonic gearing device or the like. The motor shaft 201 of the motor 200 protrudes from both sides of the motor 200 in the Z-axis direction. The absolute encoder 100-1 outputs the rotation quantity of the motor shaft 201 as a digital signal. The motor shaft 201 is an example of the spindle.

The absolute encoder 100-1 is provided at an end of the motor 200 in the Z-axis direction. Although the shape of the absolute encoder 100-1 is not particularly limited, the absolute encoder 100-1 according to the embodiment 1 has an approximately rectangular shape in the plan view, and has a thin rectangular shape elongated in an elongation direction of the spindle (hereinafter referred to as an axial direction. In the embodiment 1, the axial direction is a direction parallel to the Z-axis direction) in the front view and the side view. In other words, the absolute encoder 100-1 has a parallelepiped shape which is flat in the Z-axis direction.

The absolute encoder 100-1 includes a case 115 which has a hollow rectangular tube shape and accommodates internal structures. The case 115 includes a plurality of (for example, four) outer wall sections including an outer wall section 115a, an outer wall section 115b, an outer wall section 115c, and an outer wall section 115d which surround at least the spindle and an intermediate rotating body. The lid 116 is fixed to ends of the outer wall section 115a, the outer wall section 115b, the outer wall section 115c, and the outer wall section 115d of the case 115. The lid 116 is a member having an approximately rectangular shape in the plan view, and a thin plate shape in the axial direction.

The outer wall section 115a, the outer wall section 115b, the outer wall section 115c, and the outer wall section 115d are connected in this order. The outer wall section 115a and the outer wall section 115c are provided in parallel to each other. The outer wall section 115b and the outer wall section 115d bridge the sides of the outer wall section 115a and the outer wall section 115c, and are provided in parallel to each other. In this example, the outer wall section 115a and the outer wall section 115c extend in the X-axis direction in the plan view, and the outer wall section 115b and the outer wall section 115d extend in the Y-axis direction in the plan view.

The absolute encoder 100-1 includes a main base 110, the case 115, the lid 116, the substrate 120, the leaf spring 111, and a plurality of screws 164. The main base 110 is a base which rotatably supports each rotating body and each gear. The main base 110 includes a base portion 110a, a plurality of (for example, four) supports 141, and a shaft 106, a shaft 134, and a shaft 139.

The base portion 110a of the main base 110 is a plate shaped portion facing toward the motor 200 of the absolute encoder 100-1, and extending in the X-axis direction and the Y-axis direction. The hollow rectangular tube shaped case 115 is fixed to the base portion 110a of the main base 110 by the plurality of (for example, three) screws 164.

The supports 141 disposed on the main base 110 are approximately cylindrical portions protruding from the base portion 110a in the axial direction away from the motor 200, and support the substrate 120. The substrate 120 is fixed to the protruding ends of the supports 141 using the substrate attaching screws 122. FIG. 2 illustrates a state in which the substrate 120 is provided to cover the interior of the encoder. The substrate 120 is a printed wiring board having a thin plate shape in the axial direction, and having an approximately rectangular shape in the plan view. The substrate 120 is mounted mainly with the magnetic sensor 50, the magnetic sensor 40, the magnetic sensor 90, and the microcomputer 121.

In addition, the absolute encoder 100-1 includes the spindle gear 101, a worm gear portion 101c, a worm wheel portion 102a, a first intermediate gear 102, a first worm gear portion 102b, a worm wheel portion 105a, a first layshaft gear 105, a second worm gear portion 102h, and a worm wheel portion 133a. Further, the absolute encoder 100-1 includes the second intermediate gear 133, a fourth driving gear portion 133d, a fourth driven gear portion 138a, the second layshaft gear 138, the permanent magnet 8, the permanent magnet 9, the permanent magnet 17, the magnetic sensor 50, the magnetic sensor 40, the magnetic sensor 90, and the microcomputer 121.

The spindle gear 101 rotates according to the rotation of the motor shaft 201, and transmits the rotation of the motor shaft 201 to the worm gear portion 101c. As illustrated in FIG. 6, the spindle gear 101 includes a first cylindrical portion 101a fit around an outer periphery of the motor shaft 201, a disk portion 101b on which the worm gear portion 101c is formed, and a magnet holding portion 101d which holds the permanent magnet 9. The magnet holding portion 101d has a cylindrical recess shape that is provided in an upper surface of the first cylindrical portion 101a at a center of the disk portion 101b. The first cylindrical portion 101a, the disk portion 101b, and the magnet holding portion 101d are integrally formed so that center axes thereof approximately coincide with each other. The spindle gear 101 may be formed of any of various materials, such as resin materials, metallic materials, or the like. The spindle gear 101 may be formed of a polyacetal resin, for example.

The worm gear portion 101c is an example of a first driving gear which drives the worm wheel portion 102a. In particular, the worm gear portion 101c is a worm gear having a number of threads=1 formed on the outer periphery of the disk portion 101b. A rotation axis of the worm gear portion 101c extends in the axial direction of the motor shaft 201.

As illustrated in FIG. 5, the first intermediate gear 102 is a gear portion that transmits the rotation of the spindle gear 101 to the worm wheel portion 105a and the second intermediate gear 133. The first intermediate gear 102 is rotatably supported around a rotation axis La extending approximately parallel to the base portion 110a, by a shaft 104. The first intermediate gear 102 is an approximately cylindrical member extending in the direction of the rotation axis La thereof. The first intermediate gear 102 includes a base portion 102c, a first cylindrical portion 102d on which the worm wheel portion 102a is formed, a second cylindrical portion 102e on which the first worm gear portion 102b is formed, and a third cylindrical portion 102f on which the second worm gear portion 102h is formed. A through hole is formed inside the first intermediate gear 102, and the shaft 104 penetrates the through hole. The shaft 104 is inserted into holes formed in a support portion 110b and a support portion 110c provided on the base portion 110a of the main base 110, to rotatably support the first intermediate gear 102. A groove is provided near both ends of the shaft 104 protruding outwardly from the support portion 110b and the support portion 110c, respectively, and a retaining ring 107 and a snap ring 108 are fit into the groove to prevent the shaft 104 from coming out.

The outer wall section 115a is provided on the side of the first intermediate gear 102 opposite to the motor shaft 201. The outer wall section 115c is provided on the side where the motor shaft 201 of the first intermediate gear 102 is arranged parallel to the outer wall section 115a. The first intermediate gear 102 may be arranged so that the rotation axis La thereof faces a desired direction. In the plan view, the rotation axis La of the first intermediate gear 102 may be provided in a range inclined by 5° to 30° with respect to the direction in which the outer wall section 115a is provided on the side of the first intermediate gear 102 opposite to the motor shaft 201. In the example of FIG. 5, the rotation axis La of the first intermediate gear 102 is inclined by 20° with respect to the direction in which the outer wall section 115a extends. In other words, in the plan view, the case 115 includes the outer wall section 115a extending in the direction inclined by 5° to 30° with respect to the rotation axis La of the first intermediate gear 102. In the example of FIG. 5, an inclination Ds of the rotation axis La of the first intermediate gear 102 with respect to the direction in which the outer wall section 115a extends is set to 20°.

In the embodiment 1, the base portion 102c of the first intermediate gear 102 has a cylindrical shape, and the first cylindrical portion 102d, the second cylindrical portion 102e, and the third cylindrical portion 102f have a cylindrical shape with a diameter larger than a diameter of the base portion 102c. In addition, a through hole is formed at a center of the first intermediate gear 102. The base portion 102c, the first cylindrical portion 102d, the second cylindrical portion 102e, the third cylindrical portion 102f, and the through hole are integrally formed so that center axes thereof approximately coincide with one another. The second cylindrical portion 102e, the first cylindrical portion 102d, and the third cylindrical portion 102f are arranged in this order at mutually separated positions. The first intermediate gear 102 can be formed of any of various materials, such as resin materials, metallic materials, or the like. In the embodiment 1, the first intermediate gear 102 is formed of a polyacetal resin.

Each of the support portion 110b and the support portion 110c is a protruding member which protrudes from the base portion 110a in the Z-axis positive direction, by cutting and raising a portion of the base portion 110a of the main base 110, and is formed with the hole penetrated by the shaft 104 of the first intermediate gear 102. In addition, the groove is provided near both ends of the shaft 104 protruding outwardly from the support portion 110b and the support portion 110c, respectively, and the retaining ring 107 and the snap ring 108 are fit into the groove to prevent the shaft 104 from coming out. By employing such a configuration, the first intermediate gear 102 is rotatably supported at the rotation axis La.

The leaf spring 111 will be described. When the first worm gear portion 102b and the second worm gear portion 102h drive the respective worm wheels, a reaction force acts in an axial direction Td of the first intermediate gear 102, and the position of the first intermediate gear 102 may deviate in the axial direction Td. Accordingly, in the embodiment 1, the leaf spring 111 is provided to apply a biasing force to the first intermediate gear 102. The leaf spring 111 applies the biasing force in the rotation axis La of the first intermediate gear 102, with respect to the first intermediate gear 102, to reduce the positional deviation in the axial direction Td. The leaf spring 111 includes an attaching portion 111b which is attached to the base portion 110a of the main base 110, and a sliding portion 111a which extends from the attaching portion 111b and makes contact with a hemispherical projection 102g. The attaching portion 111b and the sliding portion 111a are formed of a thin plate shaped spring member, and an intermediate portion of a base of the sliding portion 111a is bent approximately at right angles to the attaching portion 111b. Because the leaf spring 111 makes direct contact with and presses against the hemispherical projection 102g of the first intermediate gear 102, the first intermediate gear 102 is biased in the axial direction Td. Further, a sliding portion 102i of the first intermediate gear 102 makes contact with and slides against the support portion 110c of the main base 110. Hence, it is possible to reduce the positional deviation of the first intermediate gear 102 in the axial direction Td.

In the embodiment 1, the direction of the reaction force received by the first intermediate gear 102 from the worm wheel portion 105a of the first layshaft gear 105 when the first worm gear portion 102b which engages with the worm wheel portion 105a of the first layshaft gear 105 rotates, is set to be in the opposite direction to the direction of the reaction force received by the first intermediate gear 102 from the worm wheel portion 133a of the second intermediate gear 133 when the second worm gear portion 102h which engages with the worm wheel portion 133a of the second intermediate gear 133 rotates. In other words, the gear profile of each worm gear is set so that components of these two reaction forces in the axial direction Td of the first intermediate gear 102 act in mutually opposite directions. More particularly, an inclination direction of the teeth of each worm gear is set so that the components of these two reaction forces in the axial direction Td applied from the worm gears to the first intermediate gear 102 act in mutually opposite directions. In this case, because a combined reaction force in the axial direction Td becomes small compared to a case where the components of the reaction forces in the axial direction Td received by the first intermediate gear 102 from the worm gears act in the same direction, it is possible to reduce the biasing force of the leaf spring 111 according to the small combined reaction force. Hence, a rotational resistance of the first intermediate gear 102 can be reduced, thereby enabling smooth rotation of the first intermediate gear 102.

The method described above is effective when a sliding resistance caused by the engagement between the worm gear portion 101c of the spindle gear 101 and the worm wheel portion 102a of the first intermediate gear 102 is relatively small, and the force in the axial direction Td acting on the first intermediate gear 102 due to the rotation of the spindle gear 101 is relatively small compared to the reaction force received by the first intermediate gear 102 from the worm wheel portion 105a of the first layshaft gear 105 and the worm wheel portion 133a of the second intermediate gear 133. However, the following method is effective when the sliding resistance between the worm gear portion 101c of the spindle gear 101 and the worm wheel portion 102a of the first intermediate gear 102 is relatively large.

In FIG. 5, when the spindle gear 101 rotates clockwise, a force acts on the first intermediate gear 102 to the right with respect to the axial direction Td due to the sliding resistance caused by the engagement between the worm gear portion 101c of the spindle gear 101 and the worm wheel portion 102a of the first intermediate gear 102, and the first intermediate gear 102 is urged to move clockwise. In this state, when the forces generated in the axial direction Td by the worm gears at both ends of the first intermediate gear 102 are set to be mutually canceled by the method described above, the clockwise force acting on the first intermediate gear 102 becomes relatively large due to the sliding resistance caused by the engagement between the worm gear portion 101c of the spindle gear 101 and the worm wheel portion 102a of the first intermediate gear 102 as described above. In order to prevent the first intermediate gear 102 from moving clockwise against the clockwise force acting on the first intermediate gear 102, the pressing force of the leaf spring 111 needs to be large. Consequently, the sliding resistance between the sliding portion 111a of the leaf spring 111 and the hemispherical projection 102g of the first intermediate gear 102 pressed against the sliding portion 111a, and the sliding resistance between the sliding portion 102i and the support portion 110c positioned at the end of the first intermediate gear 102 on the opposite side from the hemispherical projection 102g, increase, thereby making the rotational resistance of the first intermediate gear 102 large.

When the spindle gear 101 rotates clockwise, the direction of the reaction force received by the first intermediate gear 102 from the worm wheel portion 105a of the first layshaft gear 105 due to the rotation of the first worm gear portion 102b which engages with the worm wheel portion 105a of the first layshaft gear 105, and the direction of reaction force received by the first intermediate gear 102 from the worm wheel portion 133a of the second intermediate gear 133 due to the rotation of the second worm gear portion 102h which engages with the worm wheel portion 133a of the second intermediate gear 133, can both set to the direction of a force which urges the first intermediate gear 102 to move to the left with respect to the axial direction Td. By this setting, the clockwise force acting on the first intermediate gear 102 due to the sliding resistance caused by the engagement between the worm gear portion 101c of the spindle gear 101 and the worm wheel portion 102a of the first intermediate gear 102 described above, can be made small. For this reason, the biasing force applied to the first intermediate gear 102 by the leaf spring 111 can be made small. Hence, it is possible to reduce the rotational resistance of the first intermediate gear 102, and smoothly rotate the first intermediate gear 102.

On the other hand, when the spindle gear 101 rotates counterclockwise, a force acts on the first intermediate gear 102 to the left with respect to the axial direction Td due to the sliding resistance caused by the engagement between the worm gear portion 101c of the spindle gear 101 and the worm wheel portion 102a of the first intermediate gear 102, and the first intermediate gear 102 is urged to move counterclockwise. In this state, the reaction forces receive by the first worm gear portion 102b and the second worm gear portion 102h at both ends of the first intermediate gear 102 both become forces which urge the first intermediate gear 102 to move clockwise. Accordingly, the counterclockwise force acting on the first intermediate gear 102 can also be made small in this case. Because the biasing force applied to the first intermediate gear 102 by the leaf spring 111 is always a counterclockwise force with respect to the axial direction Td, the counterclockwise forces applied to the first intermediate gear 102 due to the engagement of the gears at the three locations described above become small, thereby also making the overall counterclockwise force applied to the first intermediate gear 102 small. Accordingly, the rotational resistance caused by the sliding between the sliding portion 102i at the left end of the first intermediate gear 102, and the support portion 110c provided on the base portion 110a of the main base 110, can be made small.

In FIG. 5, the worm wheel portion 102a is an example of a first driven gear which engages with the worm gear portion 101c of the spindle gear 101. The worm wheel portion 102a is a worm wheel having a number of teeth=20 formed on the outer periphery of the first cylindrical portion 102d. The worm gear portion 101c and the worm wheel portion 102a form a first worm transmission mechanism. A rotation axis of the worm wheel portion 102a extends in a direction perpendicular to the axial direction of the motor shaft 201.

When the number of threads of the worm gear portion 101c of the spindle gear 101 is 1, and the number of teeth of the worm wheel portion 102a of the first intermediate gear 102 is 20, a reduction gear ratio is 20. In other words, when the spindle gear 101 makes 20 revolutions, the first intermediate gear 102 makes 20÷20=1 revolution.

The first worm gear portion 102b is an example of a second driving gear which drives the worm wheel portion 105a, and is a gear portion of the first intermediate gear 102. In particular, the first worm gear portion 102b is a worm gear having a number of threads=5 formed on the outer periphery of the second cylindrical portion 102e. A rotation axis of the first worm gear portion 102b extends in a direction perpendicular to the axial direction of the motor shaft 201.

In FIG. 5 and FIG. 7, the first layshaft gear 105 is decelerated and rotates unitarily with the permanent magnet 8, according to the rotation of the motor shaft 201. The first layshaft gear 105 is a member having an approximately circular shape in the plan view, and includes a cylindrical bearing portion 105b rotatably supported on the shaft 106 projecting approximately perpendicularly from the base portion 110a of the main base 110, a disk portion 105c on which the worm wheel portion 105a is formed, and a holding portion 105d which holds the permanent magnet 8.

In FIG. 7, the disk portion 105c has a disk shape protruding radially from the outer periphery of the bearing portion 105b. In the embodiment 1, the disk portion 105c is provided at a position near the end of the bearing portion 105b farther away from the base portion 110a. The holding portion 105d has a cylindrical recess shape provided in the end surface of the disk portion 105c, farther away from the base portion 110a in the axial direction of the disk portion 105c. The bearing portion 105b, the disk portion 105c, and the holding portion 105d are integrally formed so that center axes thereof approximately coincide with one another. The first layshaft gear 105 may be formed of any of various materials, such as resin materials, metallic materials, or the like. In the embodiment 1, the first layshaft gear 105 is formed of a polyacetal resin.

The worm wheel portion 105a is an example of a second driven gear to which the first worm gear portion 102b engages. In particular, the worm wheel portion 105a is a gear having a number of teeth=25 formed on the outer periphery of the disk portion 105c. The first worm gear portion 102b and the worm wheel portion 105a form a second worm transmission mechanism. A rotation axis of the worm wheel portion 105a extends in a direction parallel to the axial direction of the motor shaft 201.

When the number of threads of the first worm gear portion 102b of the first intermediate gear 102 is 5, and the number of teeth of the worm wheel portion 105a of the first layshaft gear 105 is 25, the reduction gear ratio is 5. In other words, when the first intermediate gear 102 makes 5 revolutions, the first layshaft gear 105 makes 1 revolution. Accordingly, when the spindle gear 101 makes 100 revolutions, the first intermediate gear 102 makes 100÷20=5 revolutions, and the first layshaft gear 105 makes 5÷5=1 revolution. Because the first layshaft gear 105 rotates unitarily with the permanent magnet 8, the permanent magnet 8 makes 1 revolution when the spindle gear 101 makes 100 revolutions. In other words, the magnetic sensor 50 can determine a rotation quantity corresponding to 100 revolutions of the spindle gear 101.

The absolute encoder 100-1 having the configuration described above can determine a rotation quantity of the spindle gear 101. As an example, when the spindle gear 101 makes 1 revolution, the first layshaft gear 105 and the permanent magnet 8 make 1/100 revolution, or rotate by 3.6°. For this reason, if the rotation angle of the first layshaft gear 105 is 3.6° or less, it is possible to determine that the rotation quantity of the spindle gear 101 is 1 revolution or less.

In FIG. 5, the second worm gear portion 102h is an example of a third driving gear which drive the worm wheel portion 133a, and is a gear portion of the first intermediate gear 102. More particularly, the second worm gear portion 102h is a worm gear having a number of threads=1 formed in the outer periphery of the third cylindrical portion 102f. A rotation axis of the second worm gear portion 102h extends in a direction perpendicular to the axial direction of the motor shaft 201.

In FIG. 5, the second intermediate gear 133 is a disk shaped gear that rotates according to the rotation of the motor shaft 201, and decelerates the rotation of the motor shaft 201 to transmit the decelerated rotation to the second layshaft gear 138. The second intermediate gear 133 is provided between the second worm gear portion 102h, and the fourth driven gear portion 138a provided on the second layshaft gear 138. The fourth driven gear portion 138a engages with the fourth driving gear portion 133d. The second intermediate gear 133 includes the worm wheel portion 133a which engages with the second worm gear portion 102h of the third driving gear portion, and the fourth driving gear portion 133d which drives the fourth driven gear portion 138a. The second intermediate gear 133 is formed of a polyacetal resin, for example. The second intermediate gear 133 is a member having a circular shape in the plan view. The second intermediate gear 133 includes a bearing portion 133b rotatably supported on the base portion 110a of the main base 110, and a flange portion 133c on which the worm wheel portion 133a is formed.

In FIG. 5, by providing the second intermediate gear 133, the second layshaft gear 138, which will be described later, can be disposed at a position separated from the second worm gear portion 102h. For this reason, the distance between the permanent magnet 9 and the permanent magnet 17 can be made long to reduce leakage magnetic fluxes thereof affecting each other. In addition, by providing the second intermediate gear 133, a range in which the reduction gear ratio can be set is expanded, thereby improving the freedom of the design.

In FIG. 8, the flange portion 133c has a disk shape protruding radially from the outer periphery of the bearing portion 133b. In the embodiment 1, the flange portion 133c is provided at a position near the end of the bearing portion 133b farther away from the base portion 110a of the main base 110. The fourth driving gear portion 133d is formed in an outer periphery of a region on the side closer to the base portion 110a than the flange portion 133c of the bearing portion 133b. The bearing portion 133b and the flange portion 133c are integrally formed so that center axes thereof approximately coincide with each other.

The worm wheel portion 133a is a gear portion of the second intermediate gear 133, which engages with the second worm gear portion 102h. In particular, the worm wheel portion 133a is a worm wheel having a number of teeth=30 formed on the outer periphery of the flange portion 133c. The second worm gear portion 102h and the worm wheel portion 133a form a third worm transmission mechanism. A rotation axis of the worm wheel portion 133a extends in a direction parallel to the axial direction of the motor shaft 201.

When the number of threads of the second worm gear portion 102h of the first intermediate gear 102 is 1, and the number of teeth of the worm wheel portion 133a of the second intermediate gear 133 is 30, the reduction gear ratio is 30. In other words, when the first intermediate gear 102 makes 30 revolutions, the second intermediate gear 133 makes 1 revolution. Accordingly, when the spindle gear 101 makes 600 revolutions, the first intermediate gear 102 makes 600÷20=30 revolutions, and the second intermediate gear 133 makes 30÷30=1 revolution.

The fourth driving gear portion 133d is a transmission element which drives the fourth driven gear portion 138a. The fourth driving gear portion 133d is provided on the side of the spindle gear 101 opposite to the side closer to the first layshaft gear 105, and rotates according to the rotation of the worm wheel portion 133a. The fourth driving gear portion 133d is a spur gear having a number of teeth=24 formed on the outer periphery of the bearing portion 133b.

In FIG. 8, the second layshaft gear 138 is a gear portion having a circular shape in the plan view, which rotates according to, the rotation of the motor shaft 201, decelerates the rotation of the motor shaft 201, and transmits the decelerated rotation to the permanent magnet 17. The second layshaft gear 138 is rotatably supported around a rotation axis extending approximately perpendicularly from the base portion 110a of the main base 110. The second layshaft gear 138 includes a bearing portion 138b rotatably supported on the base portion 110a of the main base 110, a flange portion 138c on which the fourth driven gear portion 138a is formed, and a magnet holding portion 138d which holds the permanent magnet 17. The bearing portion 138b has a cylindrical ring shape which surrounds the shaft 139 projecting from the base portion 110a of the main base 110 via a gap.

The flange portion 138c has a disk shape protruding radially from the outer periphery of the bearing portion 138*b*. In the embodiment 1, the flange portion 138*c* is provided on the bearing portion 138*b* at a position near the base portion 110*a* of the main base 110. The magnet holding portion 138*d* has a cylindrical recess shape provided in the end surface of the bearing portion 138*b*, farther away from the base portion 110*a* in the axial direction of the bearing portion 138*b*. The bearing portion 138*b*, the flange portion 138*c*, and the magnet holding portion 138*d* are integrally formed so that center axes thereof approximately coincide with one another. The second layshaft gear 138 may be formed of any of various materials, such as resin materials, metallic materials, or the like. In the embodiment 1, the second layshaft gear 138 is formed of a polyacetal resin.

The fourth driven gear portion 138*a* is a transmission element which is driven by the fourth driving gear portion 133*d*. The fourth driven gear portion 138*a* and the fourth driving gear portion 133*d* form a deceleration mechanism. In particular, the fourth driven gear portion 138*a* is a spur gear having a number of teeth=40 formed on the outer periphery of the flange portion 138*c*.

When the number of teeth of the fourth driving gear portion 133*d* is 24, and the number of teeth of the fourth driven gear portion 138*a* is 40, the reduction gear ratio is 40/24=5/3. When the spindle gear 101 makes 1000 revolutions, the first intermediate gear 102 makes 1000÷20=50 revolutions, and the second intermediate gear 133 makes 50÷30=5/3 revolutions. Accordingly, the second layshaft gear 138 makes 5/3÷5/3=1 revolution. Because the second layshaft gear 138 rotates unitarily with the permanent magnet 17, the permanent magnet makes 1 revolution when the spindle gear 101 makes 1000 revolutions. In other words, the magnetic sensor 90 can determine a rotation quantity corresponding to 1000 revolutions of the spindle gear 101.

Figure 43:
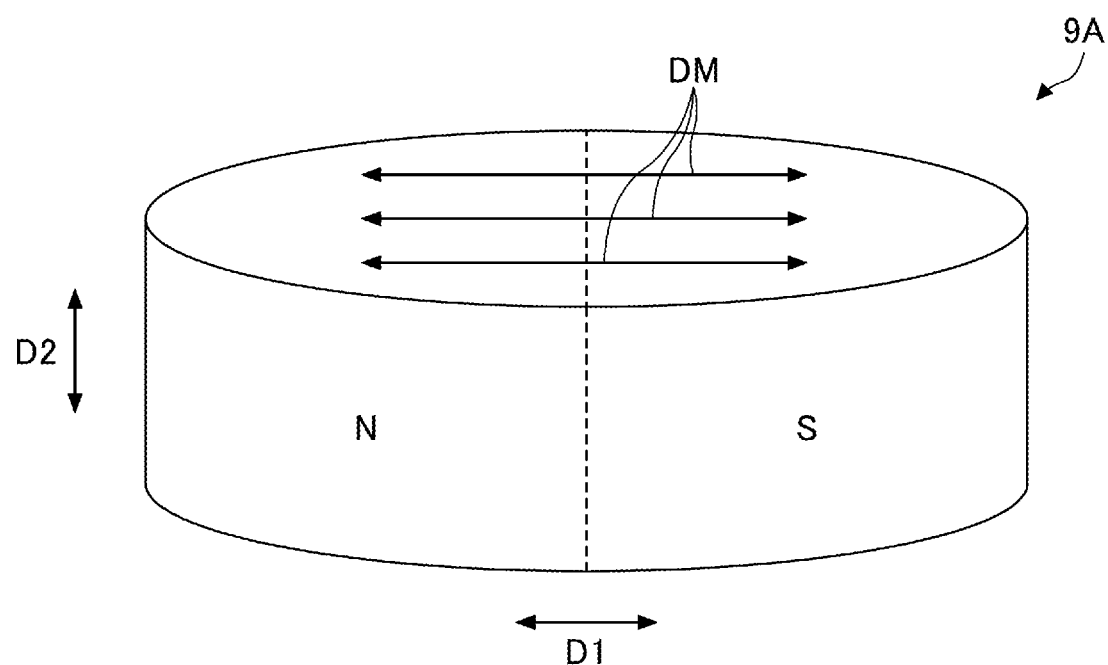
FIG. 43 is a diagram illustrating a permanent magnet 9A applicable to the absolute encoders 100-1 and 100-2 of the embodiments 1 and 2.
Figure 44:
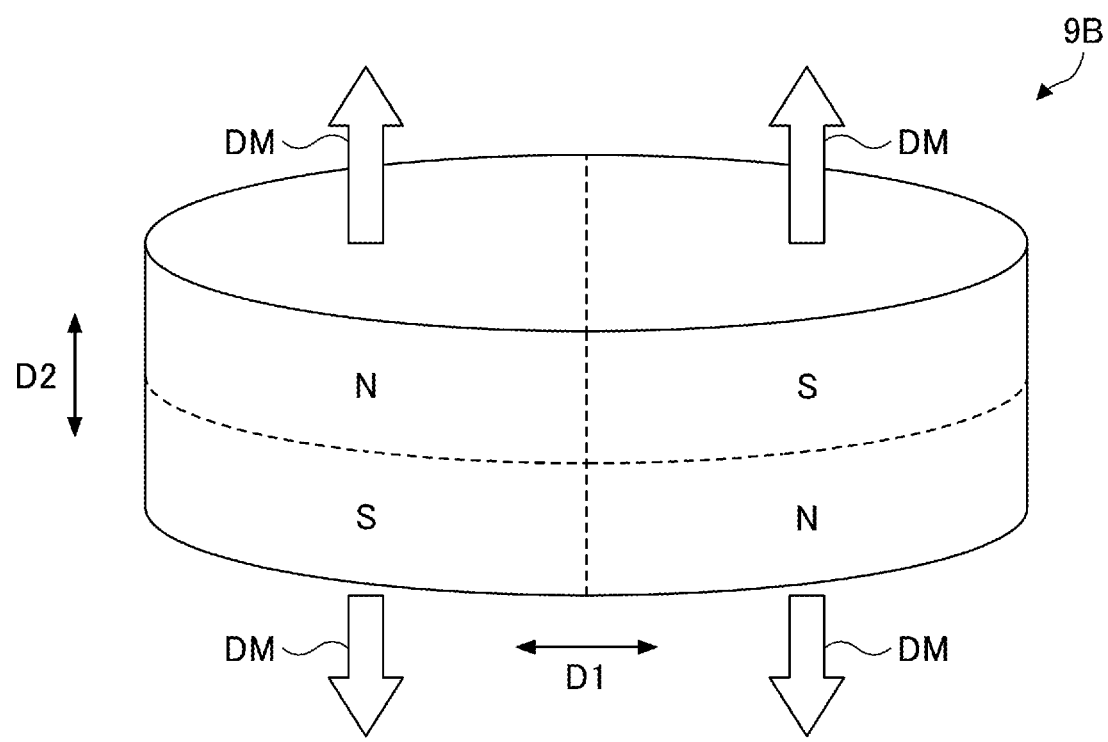
FIG. 44 is a diagram illustrating a permanent magnet 9B applicable to the absolute encoders 100-1 and 100-2 of the embodiments 1 and 2.

In FIG. 5 through FIG. 8, the permanent magnet 9 is a first permanent magnet, the permanent magnet 8 is a second permanent magnet, and the permanent magnet 17 is a third permanent magnet. Each of the permanent magnet 8, the permanent magnet 9, and the permanent magnet 17 (hereinafter referred to as each permanent magnet) has an approximately cylindrical shape which is flat in the axial direction. Each permanent magnet is formed of a magnetic material, such as a ferrite-based material, a Nd(neodymium)-Fe(iron)-B(boron)-based material, or the like, for example. Each permanent magnet may be a bonded magnet or a rubber magnet including a resin binder, for example. Each permanent magnet is provided with magnetic poles. A magnetization direction of each permanent magnet is not particularly limited, but in the embodiment 1, the two magnetic poles are provided on the end surface of the permanent magnet opposing a magnetic sensor, as illustrated in FIG. 43 and FIG. 44. A magnetic flux density distribution in a rotating direction of each permanent magnet may have a trapezoidal wave shape, a sinusoidal shape, or a square wave shape.

Each permanent magnet is partially or entirely accommodated in a recess formed in the end of a corresponding rotating body, and is secured by adhesion, caulking, press-fitting, or the like, for example. The permanent magnet 8 is bonded and fixed to the holding portion 105*d* of the first layshaft gear 105. The permanent magnet 9 is bonded and fixed to the magnet holding portion 101*d* of the spindle gear 101. The permanent magnet 17 is bonded and fixed to the magnet holding portion 138*d* of the second layshaft gear 138.

If the distance between two permanent magnets is short, a detection error of the magnetic sensor becomes large due to the effects of the leakage magnetic flux of the adjacent magnets. Hence, in the example of FIG. 5, the permanent magnet 9 and the permanent magnet 8 in the plan view are arranged on a line of sight, Lm, which is inclined with respect to the outer wall section 115*a* of the case 115, at positions separated from each other. The line of sight, Lm, is equal to an imaginary line connecting the permanent magnet 8 and the permanent magnet 9. The permanent magnet 9 and the permanent magnet 17 are arranged on a line of sight, Ln, which is inclined with respect to the outer wall section 115*a* of the case 115, at positions separated from each other. The line of sight, Ln, is equal to an imaginary line connecting the permanent magnet 17 and the permanent magnet 9. In the embodiment 1, because the lines of sight, Lm and Ln, are inclined with respect to the outer wall section 115*a*, the distance between two permanent magnets can be made long compared to the case where the lines of sight, Lm and Ln, are parallel to the outer wall section 115*a*.

Each of the magnetic sensor 50, the magnetic sensor 40, and the magnetic sensor 90 (hereinafter referred to as each magnetic sensor) is a sensor which detects an absolute rotation angle in the range of 0° to 360° corresponding to one revolution of each rotating body. Each magnetic sensor outputs a signal (for example, a digital signal) corresponding to the detected rotation angle to the microcomputer 121. Each magnetic sensor outputs the same rotation angle as before stopping the supply of a current, even if the supply of the current is once stopped and the supply of the current is resumed thereafter. For this reason, it is possible to employ a configuration which is not provided with a backup power supply.

As illustrated in FIG. 4, each magnetic sensor is fixed on the same plane by a method, such as soldering, bonding, or the like, to the surface of the substrate 120 on the side of the base portion 110*a* of the main base 110. The magnetic sensor 40 is fixed to the substrate 120 at a position opposing the end surface of the permanent magnet 9 provided on the spindle gear 101, via a predetermined gap. The magnetic sensor 40 is a first angle sensor which detects the rotation angle of the spindle gear 101 corresponding to a change in the magnetic flux generated from the permanent magnet 9. The magnetic sensor 50 is fixed to the substrate 120 at a position opposing the end surface of the permanent magnet 8 provided on the first layshaft gear 105, via a predetermined gap. The magnetic sensor 50 is a second angle sensor which detects the rotation angle of the first layshaft gear 105 corresponding to a change in the magnetic flux generated from the permanent magnet 8. The magnetic sensor 90 is fixed to the substrate 120 at a position opposing the end surface of the permanent magnet 17 provided on the second layshaft gear 138, via a predetermined gap. The magnetic sensor 90 is a third angle sensor which detects the rotation angle of the second layshaft gear 138 corresponding to a change in the magnetic flux generated from the permanent magnet 17.

A magnetic angle sensor having relatively high resolution may be used for each magnetic sensor. The magnetic angle sensor is arranged to oppose the end surface, including the magnetic pole, of each permanent magnet along the axial direction of each rotating body, via the predetermined gap, and outputs the digital signal determining the rotation angle of the opposing rotating body, based on the rotation of the magnetic pole. As an example, the magnetic angle sensor includes a sensing element which senses the magnetic pole, and a computing circuit which outputs a digital signal based on the output of the sensing element. The sensing element may include a plurality of (for example, 4) magnetic field sensing elements, such as Hall elements, Giant Magneto Resistive (GMR) elements, or the like, for example.

The computing circuit may determine the rotation angle by a table processing which uses a look-up table, using a difference or a ratio of the outputs of the plurality of sensing elements as a key, for example. The sensing element and the computing circuit may be integrated in a single IC chip. This IC chip may be embedded in a resin having a thin parallelepiped shape. Each magnetic sensor outputs, to the microcomputer 121, an angle signal which is the digital signal corresponding to the rotation angle of each rotating body sensed via an interconnect member which is not illustrated. For example, each magnetic sensor outputs the rotation angle of each rotating body as the digital signal having a plurality of bits (for example, 7 bits).

Figure 9:
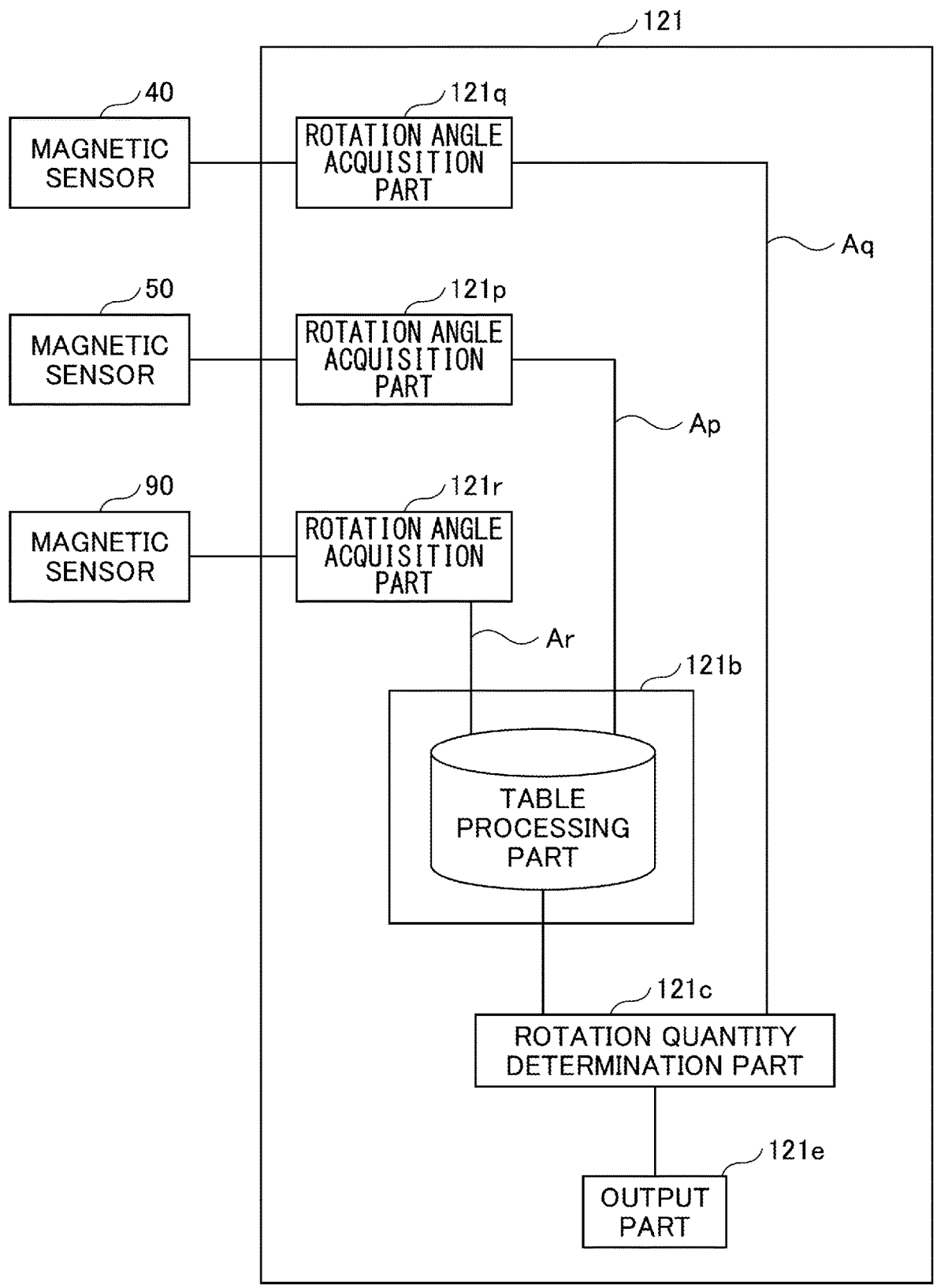
FIG. 9 is a diagram illustrating the functional configuration of a microcomputer 121 provided in the absolute encoder 100-1 according to the embodiment 1 of the present invention.

FIG. 9 is a diagram illustrating the functional configuration of the microcomputer 121 provided in the absolute encoder 100-1 according to the embodiment 1 of the present invention. The microcomputer 121 is fixed to the surface of the substrate 120 on the side of the base portion 110a of the main base 110, by the method, such as soldering, bonding, or the like. The microcomputer 121 is formed by a CPU, acquires the digital signal indicating the rotation angle and output from each of the magnetic sensor 40, the magnetic sensor 50, and the magnetic sensor 90, and computes the rotation quantity of the spindle gear 101. Each block of the microcomputer 121 illustrated in FIG. 9 represents a function (facility) which is achieved when the CPU forming the microcomputer 121 executes a program. Each block of the microcomputer 121 may be implemented in hardware by elements and mechanical devices including the central processing unit (CPU) of the computer, or implemented in software by a computer program or the like. Hereinafter, the illustrated functional block is achieved by a coordination of the hardware and the software. Accordingly, it may be understood by those skilled in the art that these functional blocks may be implemented in various forms according to combinations of the hardware and the software.

The microcomputer 121 includes a rotation angle acquisition part 121p, a rotation angle acquisition part 121q, a rotation angle acquisition part 121r, a table processing part 121b, a rotation quantity determination part 121c, and an output part 121e. The rotation angle acquisition part 121q acquires a rotation angle Aq, which is the angle information indicating the rotation angle of the spindle gear 101 based on the signal output from the magnetic sensor 40. The rotation angle acquisition part 121p acquires the rotation angle Ap, which is the angle information indicating the rotation angle of the first layshaft gear 105 based on the signal output from the magnetic sensor 50. The rotation angle acquisition part 121r acquires the rotation angle Ar, which is the angle information indicating the rotation angle of the second layshaft gear 138 based on the signal output from the magnetic sensor 90.

The table processing part 121b determines a rotation speed of the spindle gear 101 corresponding to the acquired rotation angle Ap, by referring to a first correspondence relationship table which stores the rotation angle Ap, and the rotation speed of the spindle gear 101 corresponding to the rotation angle Ap. In addition, the table processing part 121b determines the rotation speed of the spindle gear 101 corresponding to the acquired rotation angle Ar, by referring to a second correspondence relationship table which stores the rotation angle Ar, and the rotation speed of the spindle gear 101 corresponding to the rotation angle Ar.

The rotation quantity determination part 121c determines a first rotation quantity over multiple revolutions of the spindle gear 101, according to the rotation speed of the spindle gear 101 determined by the table processing part 121b, and the acquired rotation angle Aq. The output part 121e converts the rotation quantity over the multiple revolutions of the spindle gear 101 determined by the rotation quantity determination part 121c into information indicating the rotation quantity, and outputs the converted information.

The actions and effects of the absolute encoder 100-1 according to the embodiment 1 configured as described above will be described.

The absolute encoder 100-1 according to the embodiment 1 is an absolute encoder which determines the rotation quantity over multiple revolutions of the motor shaft 201, and includes the worm gear portion 101c which rotates according to the rotation of the motor shaft 201, the worm wheel portion 102a which engages with the worm gear portion 101c, the first worm gear portion 102b which rotates according to the rotation of the worm wheel portion 102a, the worm wheel portion 105a which engages with the first worm gear portion 102b, the first layshaft gear 105 which rotates according to the rotation of the worm wheel portion 105a, the permanent magnet 8 which rotates unitarily with the first layshaft gear 105, and the magnetic sensor 50 which detects the rotation angle of the permanent magnet 8. According to this configuration, the rotation quantity over the multiple revolutions of the motor shaft 201 can be determined according to a detection result of the magnetic sensor 50. The absolute encoder 100-1 can form a bent transmission path and have a thin configuration, by providing a first worm transmission mechanism including the worm gear portion 101c, and the worm wheel portion 102a which engages with the worm gear portion 101c, and a second worm transmission mechanism including the first worm gear portion 102b, and the worm wheel portion 105a which engages with the first worm gear portion 102b.

The absolute encoder 100-1 according to the embodiment 1 is an absolute encoder which determines the rotation quantity over multiple revolutions of the motor shaft 201, and includes the first intermediate gear 102 which rotates at the first reduction gear ratio according to the rotation of the motor shaft 201, the first layshaft gear 105 which rotates at the second reduction gear ratio according to the rotation of the first intermediate gear 102, the permanent magnet 8 which rotates unitarily with the first layshaft gear 105, and the magnetic sensor 50 which detects the rotation angle of the permanent magnet 8. A rotation axis of the motor shaft 201 is located at a position which is twisted with respect to a rotation axis of the first intermediate gear 102, and is set parallel to a rotation axis of the first layshaft gear 105. According to this configuration, the rotation quantity over the multiple revolutions of the motor shaft 201 can be determined according to the detection result of the magnetic sensor 50. The absolute encoder 100-1 can form the bent transmission path and have the thin configuration, because the rotation axis of the first intermediate gear 102 is located at the position twisted with respect to the rotation axes of the motor shaft 201 and the first layshaft gear 105.

The absolute encoder 100-1 according to the embodiment 1 is an absolute encoder which determines the rotation quantity over multiple revolutions of the motor shaft 201, and includes the deceleration mechanism which includes the first worm transmission mechanism and rotates the permanent magnet 8 according to the rotation of the motor shaft 201, and the magnetic sensor 50 which detects the rotation angle of the permanent magnet 8 according to the magnetic pole of the permanent magnet 8, and the rotation axis of the motor shaft 201 is set parallel to the rotation axis of the permanent magnet 8. According to this configuration, the rotation quantity over the multiple revolutions of the motor shaft 201 can be determined according to the detection result of the magnetic sensor 50. The absolute encoder 100-1 can form the bent transmission path and have the thin configuration, because the first worm transmission mechanism is provided, and the rotation axis of the motor shaft 201 and the rotation axis of the permanent magnet 8 are set to be parallel to each other.

The absolute encoder 100-1 according to the embodiment 1 includes the magnetic sensor 40 which detects the rotation angle of the motor shaft 201. According to this configuration, the rotation angle of the motor shaft 201 can be determined according to a detection result of the magnetic sensor 40. Compared to a case where the magnetic sensor 40 is not provided, the absolute encoder 100-1 can improve the resolution of the rotation angle of the motor shaft 201 which can be determined.

The absolute encoder 100-1 according to the embodiment 1 includes the second worm gear portion 102*h* which rotates according to the rotation of the worm wheel portion 102*a*, the worm wheel portion 133*a* which engages with the second worm gear portion 102*h*, the second layshaft gear 138 which rotates according to the rotation of the worm wheel portion 133*a*, the permanent magnet 17 which rotates unitarily with the second layshaft gear 138, and the magnetic sensor 90 which detects the rotation angle of the permanent magnet 17. According to this configuration, the rotation quantity over the multiple revolutions of the motor shaft 201 can be determined according to a detection result of the magnetic sensor 90. Compared to the case where the magnetic sensor 90 is not provided, the absolute encoder 100-1 can increase a range in which the rotation quantity of the motor shaft 201 can be determined.

The absolute encoder 100-1 according to the embodiment 1 includes the first intermediate gear 102 provided with the first worm gear portion 102*b* and the second worm gear portion 102*h*, and the direction of the reaction force received by the first intermediate gear 102 when the first worm gear portion 102*b* rotates is opposite to the direction of the reaction force received by the first intermediate gear 102 when the second worm gear portion 102*h* rotates. According to this configuration, the combined reaction force of both the reaction forces can be made small compared to a case where the directions of both the reaction forces are the same.

In the absolute encoder 100-1 according to the embodiment 1, an outer diameter of the worm wheel portion 102*a* is set smaller than an outer diameter of the worm gear portion 101*c*. According to this configuration, it is easier to make the absolute encoder thin when compared to a case where the outer diameter of the worm wheel portion 102*a* is larger than the outer diameter of the worm wheel portion 102*a*.

For example, in the case where the spindle gear 101 and the first layshaft gear 105 are arranged at positions adjacent to each other, a so-called magnetic interference is generated in which a portion of the magnetic flux generated from each of the permanent magnet 8 and the permanent magnet 9 affects the magnetic sensor not corresponding to each of the permanent magnet 8 and the permanent magnet 9, and this magnetic interference will be described.

Figure 28:
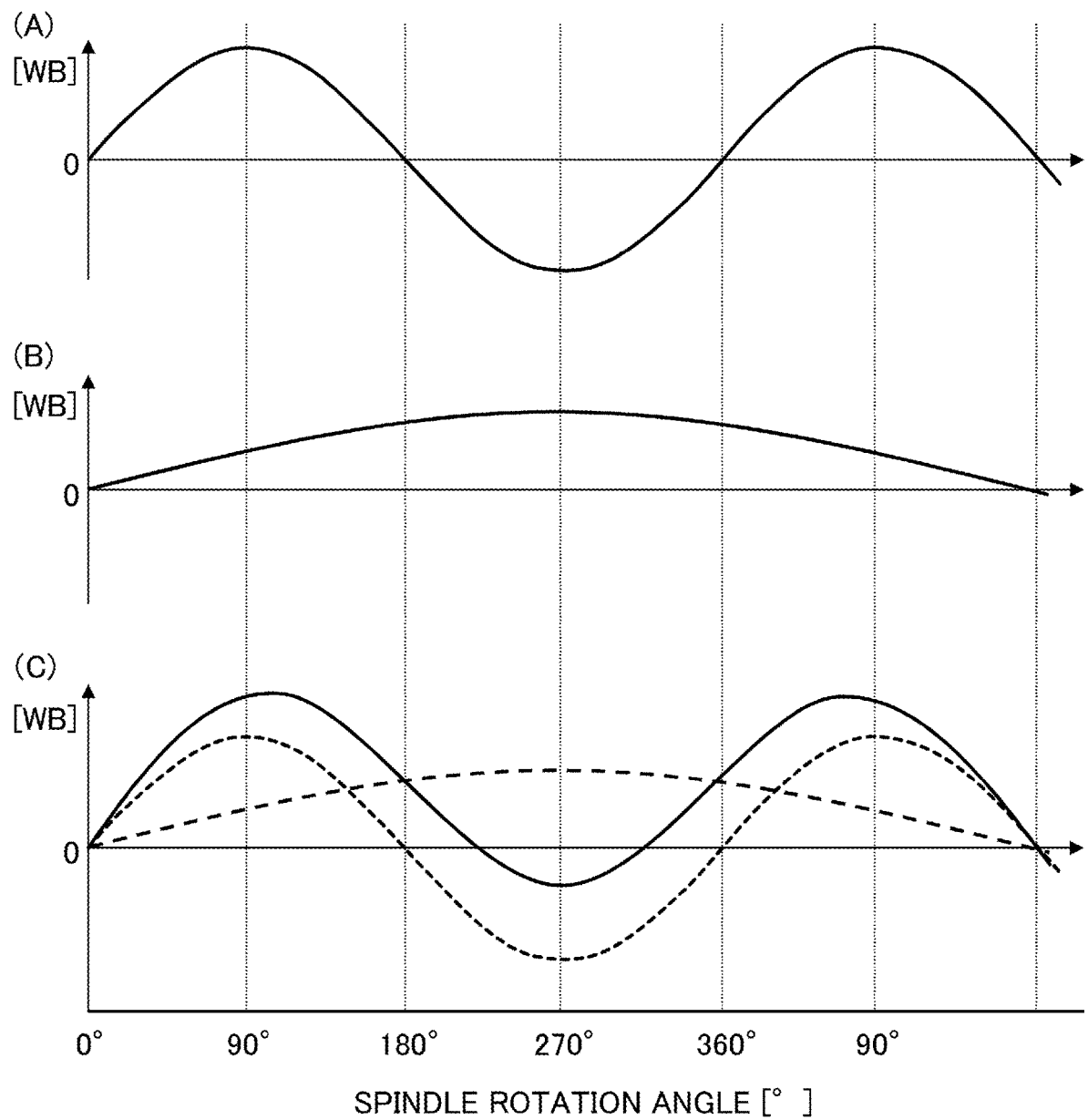
FIG. 28 is a diagram conceptually illustrating a waveform (A) detected by the magnetic sensor 40 which detects a magnetic flux of the permanent magnet 9 provided on a spindle gear 101 (spindle gear 1), a waveform (B) detected by the magnetic sensor 50 which detects a magnetic flux of the permanent magnet 8 provided on the first layshaft gear 105 (layshaft gear 5), and a magnetic interference waveform (C) detected by the magnetic sensor 40 which detects a state in which a portion of the magnetic flux of the permanent magnet 8 is superimposed on the magnetic flux of the permanent magnet 9 as a leakage magnetic flux.

FIG. 28 is a diagram conceptually illustrating a waveform (A) detected by the magnetic sensor 40 which detects the magnetic flux of the permanent magnet 9 provided on the spindle gear 101 (spindle gear 1), a waveform (B) detected by the magnetic sensor 50 which detects the magnetic flux of the permanent magnet 8 provided on the first layshaft gear 105 (layshaft gear 5), and a magnetic interference waveform (C) detected by the magnetic sensor 40 which detects a state in which a portion of the magnetic flux of the permanent magnet 8 is superimposed on the magnetic flux of the permanent magnet 9 as the leakage magnetic flux. An ordinate indicates the magnetic flux, and the abscissa indicates the rotation angle of the spindle gear 101. As described above, the magnetic sensor 40 desirably detects the waveform (A), but detects the waveform (C) when the magnetic interference is generated, thereby it is impossible to detect an accurate waveform.

Figure 29:
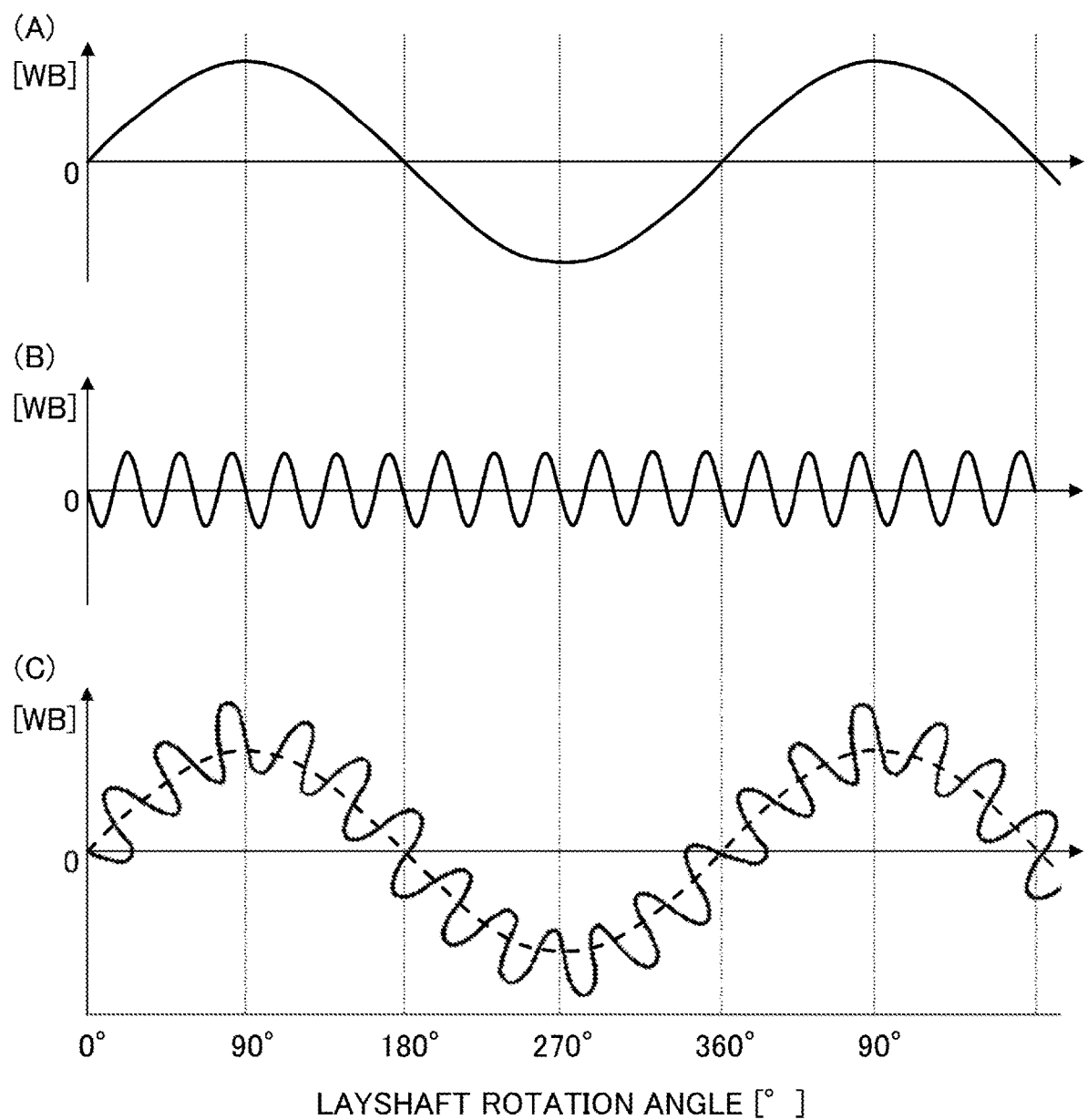
FIG. 29 is a diagram conceptually illustrating a waveform (A) detected by the magnetic sensor 50 which detects the magnetic flux of the permanent magnet 8 provided on the first layshaft gear 105 (layshaft gear 5), a waveform (B) detected by the magnetic sensor 40 which detects the magnetic flux of the permanent magnet 9 provided on the spindle gear 101 (spindle gear 1), and a magnetic interference waveform (C) detected by the magnetic sensor 50 which detects a state in which a portion of the magnetic flux of the permanent magnet 9 is superimposed on the magnetic flux of the permanent magnet 8 as a leakage magnetic flux.

Similarly, FIG. 29 is a diagram conceptually illustrating a waveform (A) detected by the magnetic sensor 50 which detects the magnetic flux of the permanent magnet 8 provided on the first layshaft gear 105 (layshaft gear 5), a waveform (B) detected by the magnetic sensor 40 which detects the magnetic flux of the permanent magnet 9 provided on the spindle gear 101 (spindle gear 1), and a magnetic interference waveform (C) detected by the magnetic sensor 50 which detects a state in which a portion of the magnetic flux of the permanent magnet 9 is superimposed on the magnetic flux of the permanent magnet 8 as the leakage magnetic flux. The ordinate indicates the magnetic flux, and the abscissa indicates the rotation angle of the first layshaft gear 105. As described above, the magnetic sensor desirably detects the waveform (A), but detects the waveform (C) when the magnetic interference is generated, thereby making it is impossible to detect the accurate waveform. In addition, the magnetic interference may be generated in the spindle gear 101 and the second layshaft gear 138, similar to (C) in FIG. 29.

The absolute encoder 100-1 according to the embodiment 1 includes the case 115 including the outer wall section 115*a* arranged on the side of the first intermediate gear 102 opposite to the motor shaft 201, and in the plan view, the rotation axis La of the first intermediate gear 102 is inclined by 20° with respect to the extending direction of the outer wall section 115*a*. According to this configuration, the inclination of a straight line on which each of the permanent magnets is arranged, with respect to the outer wall section 115*a*, can be made large, compared to a case where the rotation axis La of the first intermediate gear 102 is not inclined. For this reason, the distance between the respective permanent magnets can be made large. Hence, by setting the distance between the respective permanent magnets large, the generation of the magnetic interference in which a portion of the magnetic flux generated from each of the permanent magnet 8, the permanent magnet 9, and the permanent magnet 17 affects the magnetic sensors not corresponding to each of the permanent magnet 8, the permanent magnet 9, and the permanent magnet 17, can be reduced. For example, a portion of the magnetic flux generated from the permanent magnet 9 provided on the spindle gear 101, interfering with the magnetic sensor 50 which is originally provided on the first layshaft gear 105 for the purposes of detecting a change in the magnetic flux generated from the permanent magnet 8, as a leakage magnetic flux, can be reduced. In addition, a portion of the magnetic flux generated from the permanent magnet 9, interfering with the magnetic sensor 40 which is originally provided for the purposes of detecting a change in the magnetic flux generated from the permanent magnet 8, as a leakage magnetic flux, can be reduced. Therefore, it is possible to reduce the effects of the leakage flux from the adjacent magnets.

Further, in the absolute encoder 100-1 according to the embodiment 1, the base portion 110*a* of the main base 110, which is a plate shaped member made of a magnetic material such as iron or the like, is provided between the second angle sensor and the motor 200, or between the third angle sensor and the motor 200. In other words, the base portion 110a functions as a magnetic shield with respect to the magnetic flux which leaks from the motor 200. Accordingly, the magnetic flux which leaks from the motor 200 is unlikely to reach the magnetic sensor 40 or the like. As a result, compared to a case where the base portion 110a is made of a non-magnetic material such as aluminum or the like having a low magnetic permeability, for example, it is possible to reduce a deterioration in the detection accuracy of the magnetic sensor which detects the rotation angle or the rotation quantity of the gear.

Embodiment 2

Figure 10:
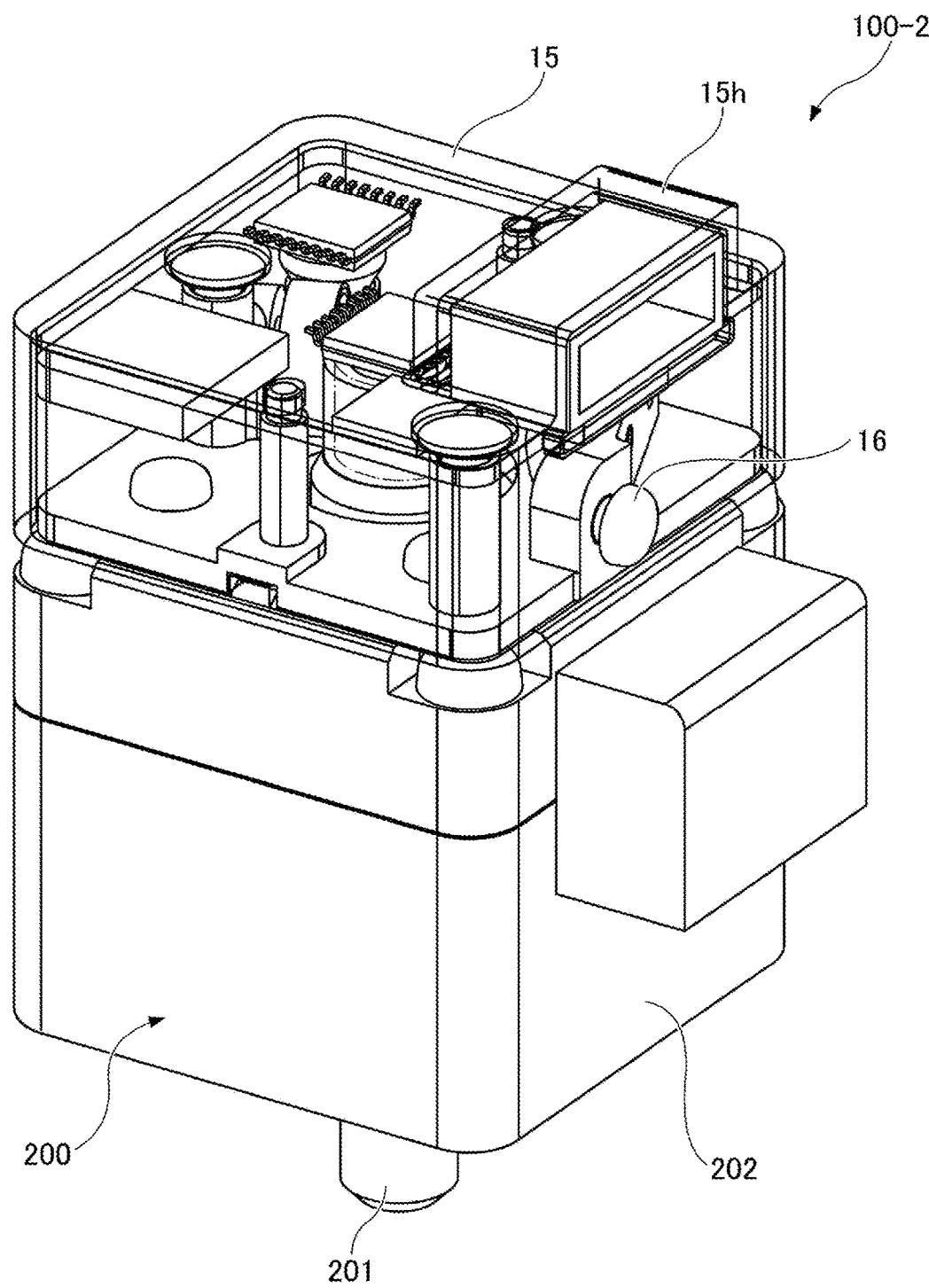
FIG. 10 is a perspective view illustrating a state in which an absolute encoder 100-2 according to an embodiment 2 of the present invention is attached to the motor 200.

FIG. 10 is a perspective view illustrating a state in which the absolute encoder 100-2 according to an embodiment 2 of the present invention is attached to the motor 200. Similar to the embodiment 1, the description hereinafter will be based on the XYZ orthogonal coordinate system. The X-axis direction corresponds to the horizontal left and right direction, the Y-axis direction corresponds to the horizontal front and rear direction, and the Z-axis direction corresponds to the vertical up and down direction. The Y-axis direction and the Z-axis direction are perpendicular to the X-axis direction, respectively. The X-axis direction may be referred to as the left direction or the right direction, the Y-axis direction may be referred to as the front direction or the rear direction, and the Z-axis direction may be referred to as the up direction or the down direction. In FIG. 10, a state viewed from above in the Z-axis direction is referred to as the plan view, a state viewed from the front in the Y-axis direction is referred to as the front view, and states viewed from the left and right in the X-axis direction are referred to as the side views. Such designations of the directions do not limit the orientation in which the absolute encoder 100-2 is used, and the absolute encoder 100-2 may be used in a desired orientation. In FIG. 10, components provided inside the case 15 of the absolute encoder 100-2 are illustrated transparently. In addition, the illustration of a gear profile is omitted in the drawings.

Figure 11:
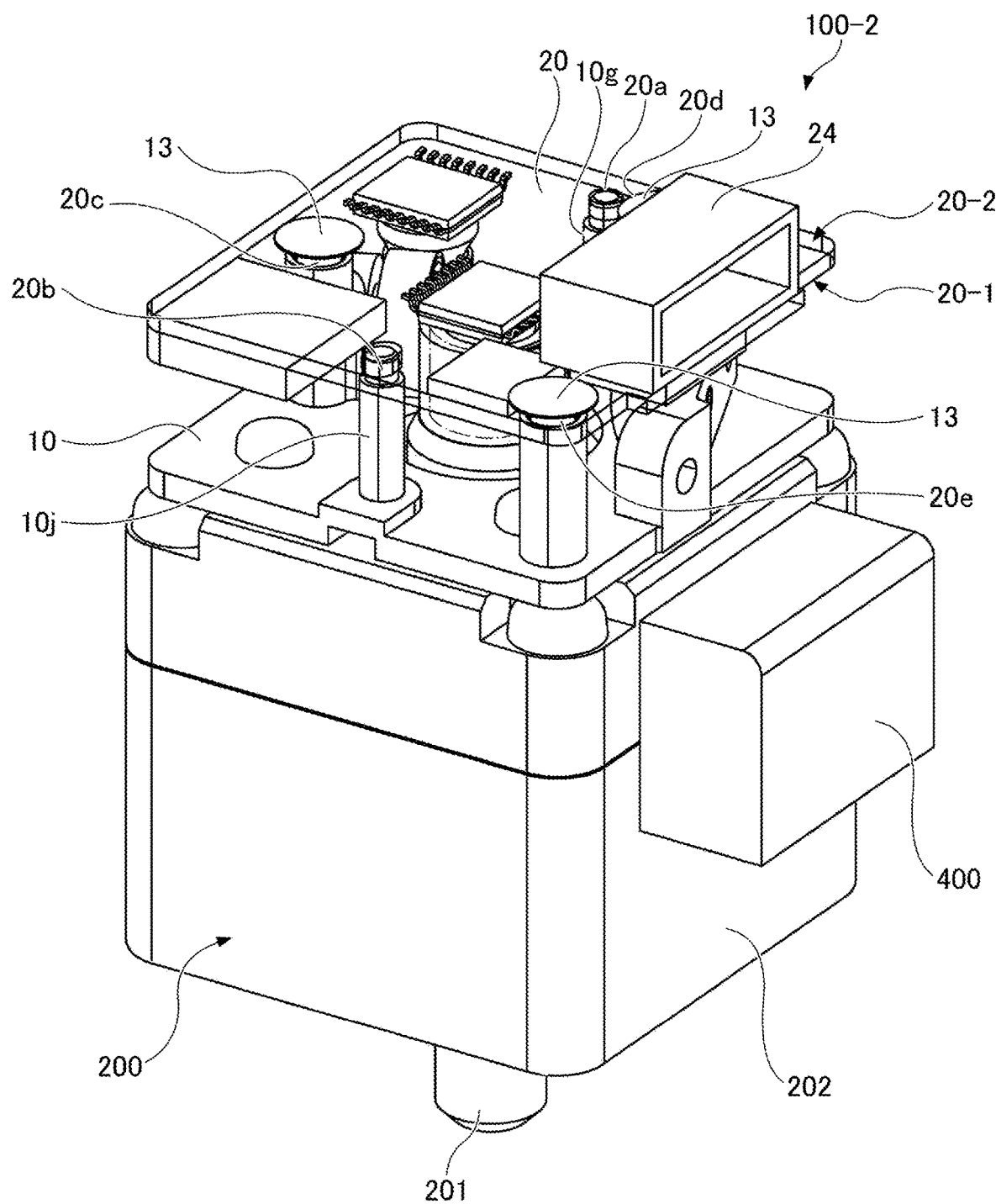
FIG. 11 is a perspective view illustrating a state in which a case 15 and attaching screws 16 are removed from the absolute encoder 100-2 illustrated in FIG. 10.
Figure 12:
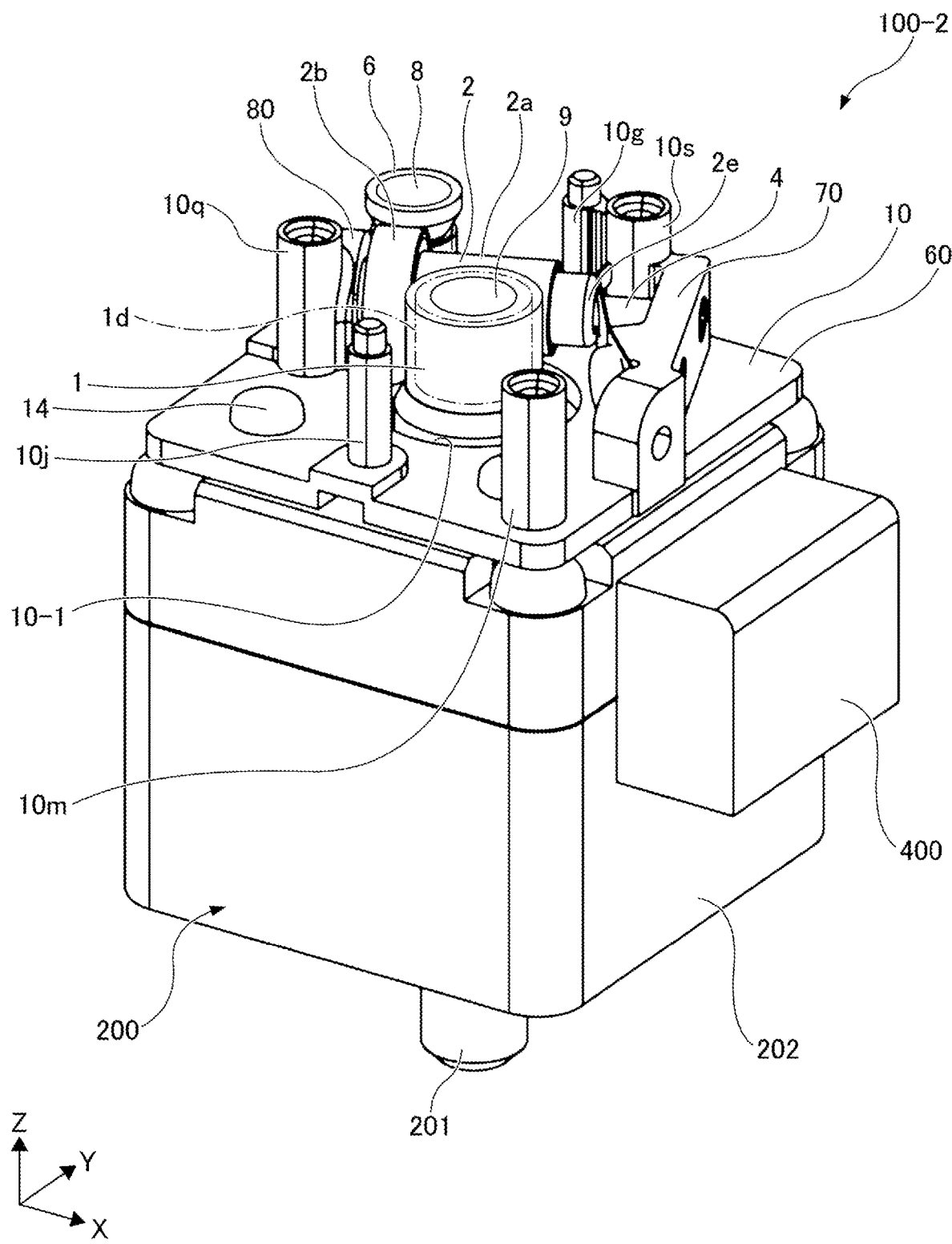
FIG. 12 is a perspective view illustrating a state in which a substrate 20 and substrate attaching screws 13 are removed from the absolute encoder 100-2 illustrated in FIG. 11.
Figure 13:
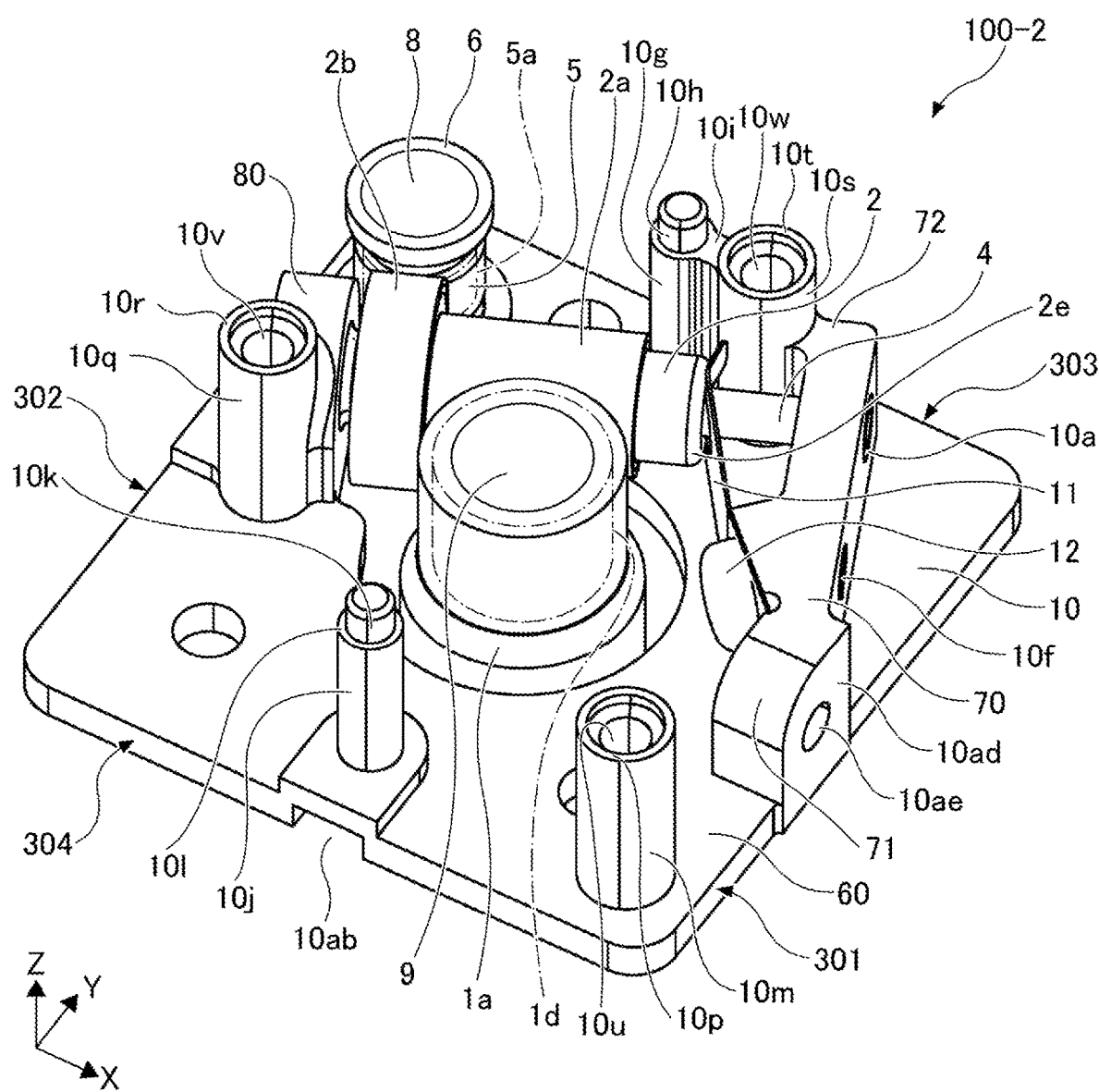
FIG. 13 is a perspective view illustrating a state in which the motor 200 and screws 14 are removed from the perspective view of the state in which the motor 200 is attached to the absolute encoder 100-2 illustrated in FIG. 12.
Figure 14:
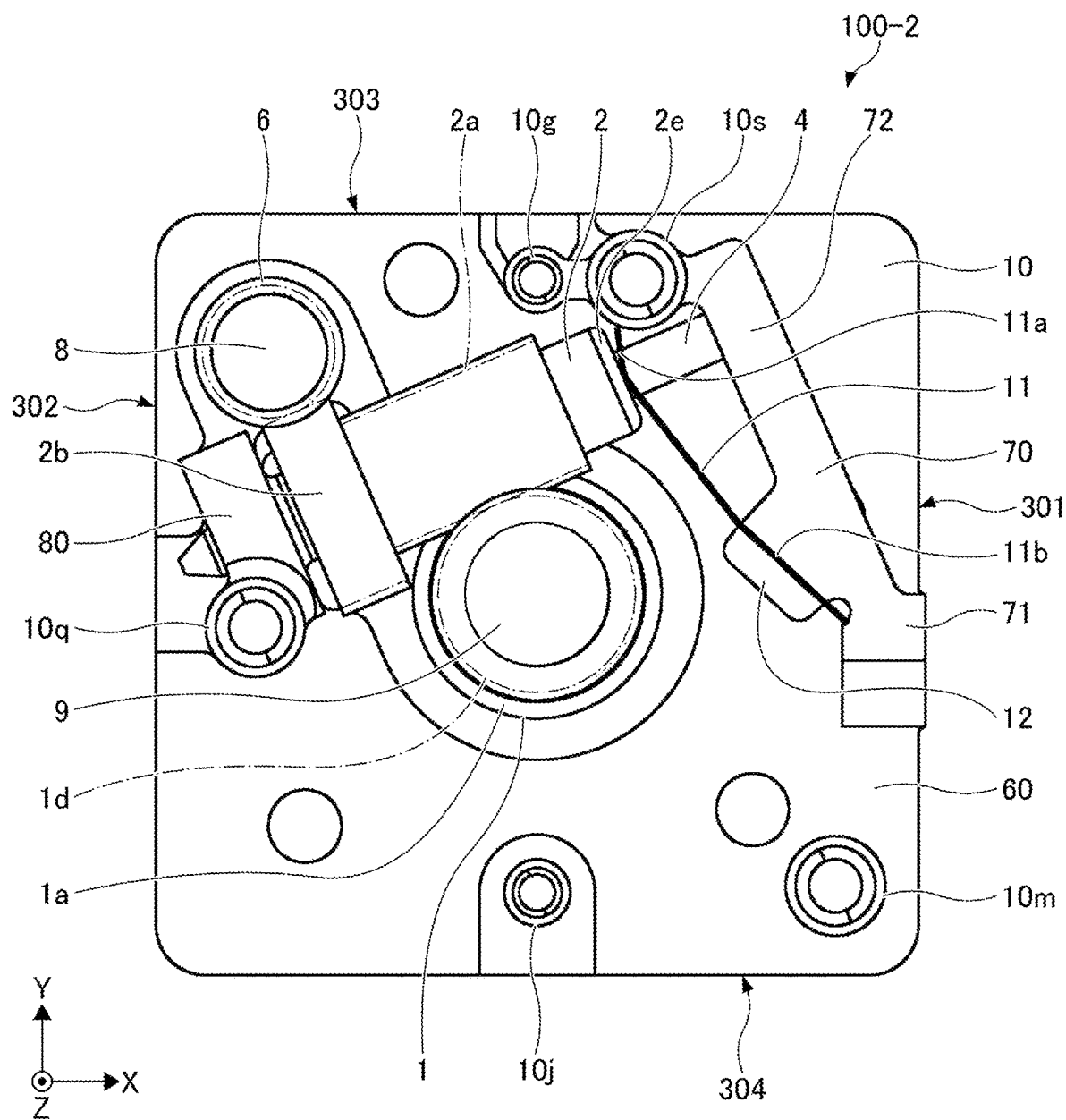
FIG. 14 is a diagram illustrating a state in which a main base 10, an intermediate gear 2, and the like illustrated in FIG. 13 are viewed in a plan view.
Figure 15:
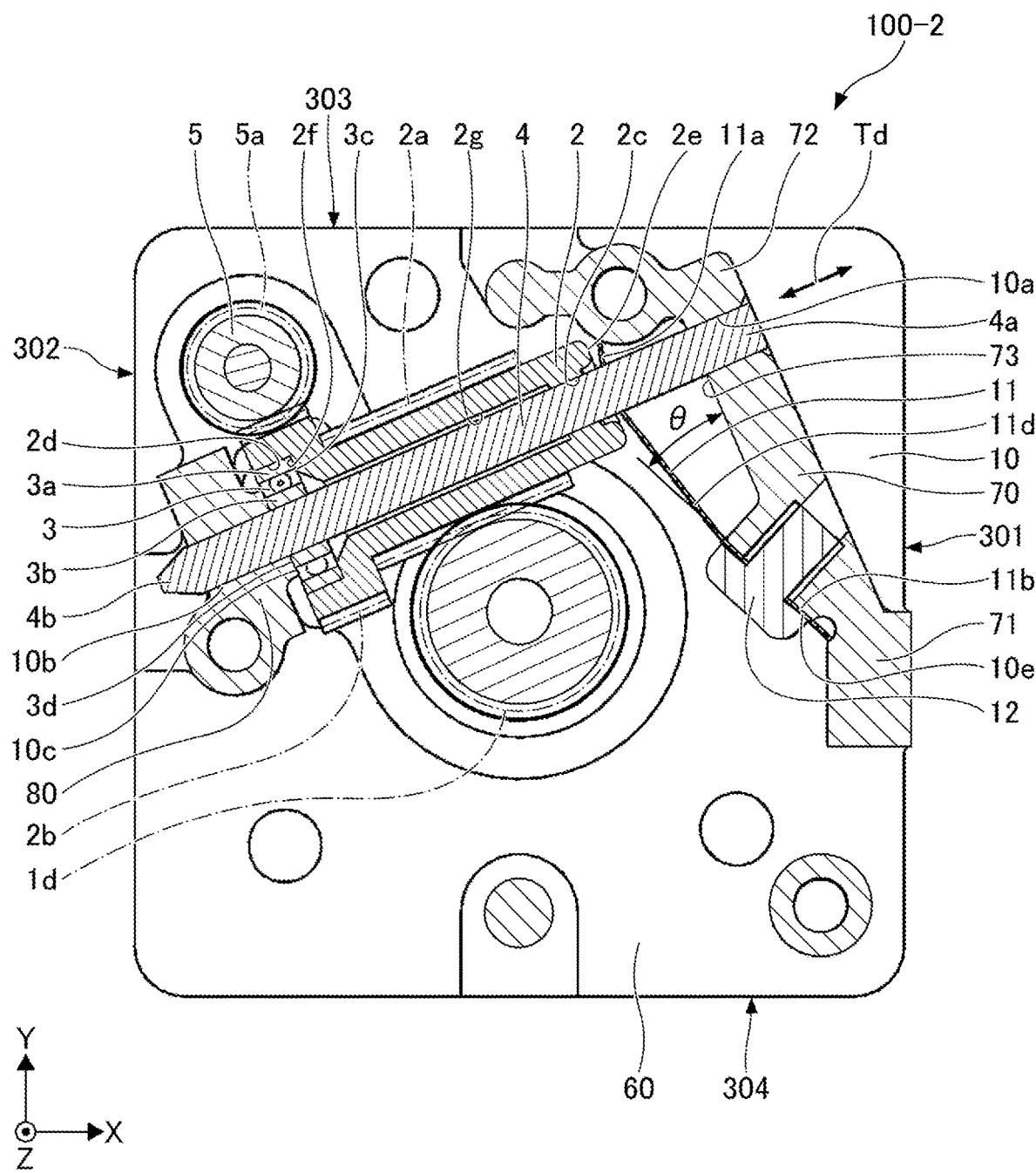
FIG. 15 is a cross sectional view of the absolute encoder 100-2 illustrated in FIG. 14 cut along a plane passing through a center of the intermediate gear 2 and parallel to an X-Y plane.

FIG. 11 is a perspective view illustrating a state in which the case 15 and the attaching screws 16 are removed from the absolute encoder 100-2 illustrated in FIG. 10. In FIG. 11, a plurality of components provided on the bottom surface 20-1 of the substrate 20 are illustrated in a perspective. FIG. 12 is a perspective view illustrating a state in which the substrate 20 and the substrate attaching screws 13 are removed from the absolute encoder 100-2 illustrated in FIG. 11. FIG. 13 is a perspective view illustrating a state in which the motor 200 and the screws 14 are removed from the perspective view of the state in which the motor 200 is attached to the absolute encoder 100-2 illustrated in FIG. 12. FIG. 14 is a diagram illustrating a state in which the main base 10, the intermediate gear 2, or the like illustrated in FIG. 13 are viewed in the plan view. FIG. 15 is a cross sectional view of the absolute encoder 100-2 illustrated in FIG. 14 cut along a plane passing through the center of the intermediate gear 2 and parallel to the X-Y plane.

Figure 16:
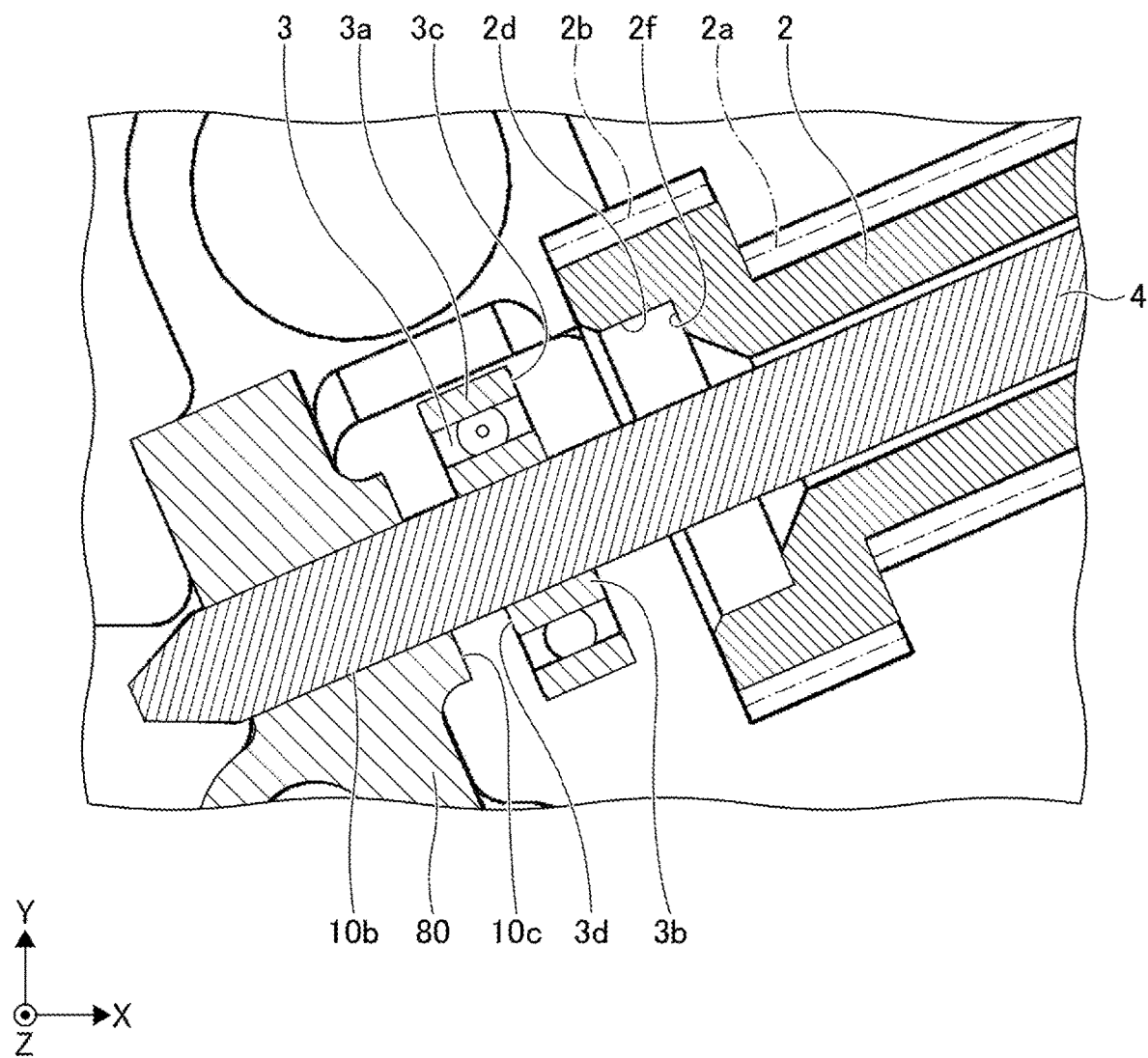
FIG. 16 is a partial cross sectional view on an enlarged scale illustrating a state in which a bearing 3 illustrated in FIG. 15 is removed from the intermediate gear 2.

FIG. 16 is a partial cross sectional view on an enlarged scale illustrating a state in which the bearing 3 illustrated in FIG. 15 is removed from the intermediate gear 2. In FIG. 16, the bearing 3 is separated from a press-fitting portion 2d of the intermediate gear 2 in order to facilitate the understanding of an arrangement relationship between the bearing 3 and the press-fitting portion 2d formed on the intermediate gear 2. In addition, in FIG. 16, the bearing 3 is separated from the wall 80 in order to facilitate the understanding of an arrangement relationship between the bearing 3 and the wall 80 provided on a base portion 60 of the main base 10.

Figure 17:
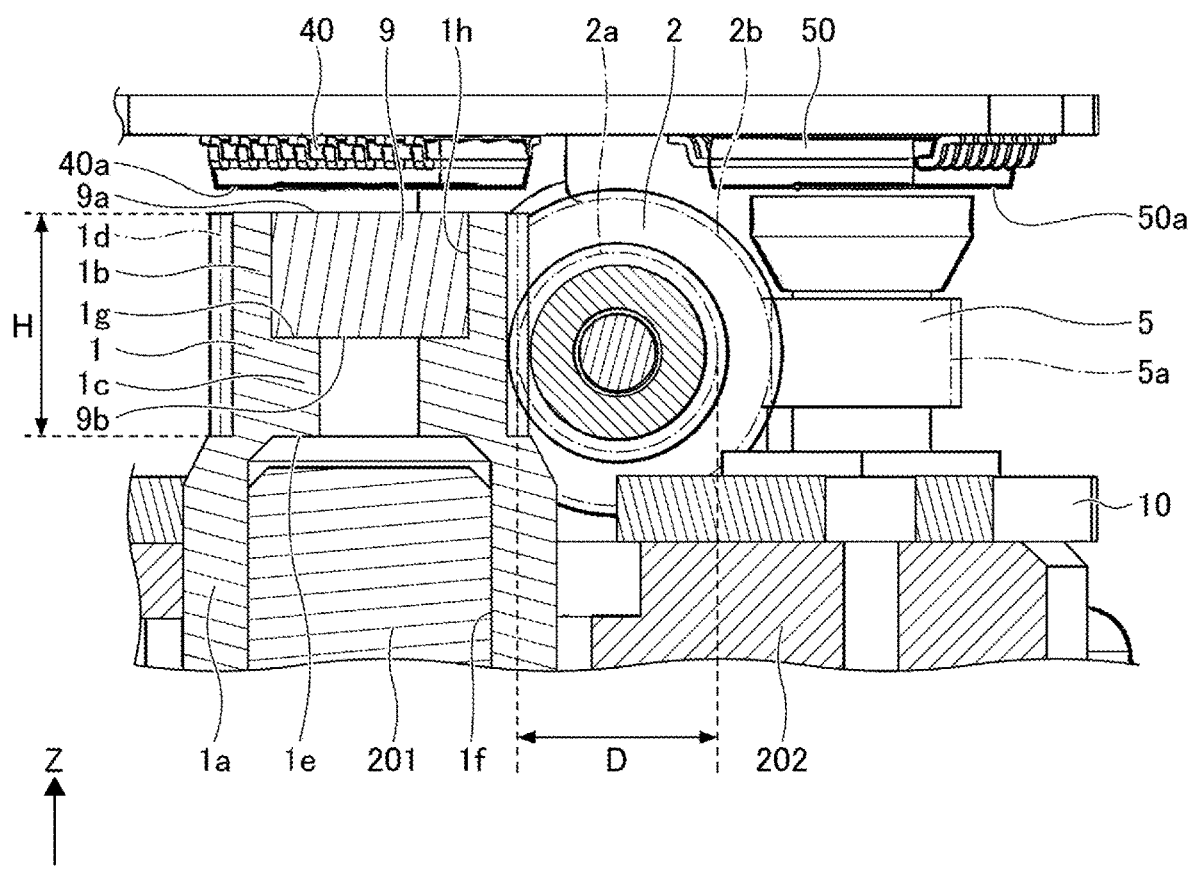
FIG. 17 is a cross sectional view of the absolute encoder 100-2 illustrated in FIG. 11 cut along a plane passing through a center of a spindle gear 1 illustrated in FIG. 14 and perpendicular to a center line of the intermediate gear 2, where the substrate 20 and a magnetic sensor 40 are not illustrated in cross section.

FIG. 17 is a cross sectional view of the absolute encoder 100-2 illustrated in FIG. 11 cut along a plane passing through the center of the spindle gear 1 illustrated in FIG. 14 and perpendicular to the center line of the intermediate gear 2. However, the substrate 20 and the magnetic sensor 40 are not illustrated in cross section. FIG. 17 illustrates an attached state of the permanent magnet 9 to the spindle gear 1, and an attached state of the spindle gear 1 to the motor shaft 201. In addition, FIG. 17 illustrates a state in which the worm gear portion 1d of the spindle gear 1 engages a worm wheel portion 2a of the intermediate gear 2. According to FIG. 17, it may be seen that a top surface 9a of the permanent magnet 9 provided on the spindle gear 1 is located at a position separated from the magnetic sensor 40 by a predetermined distance along the Z-axis direction.

Figure 18:
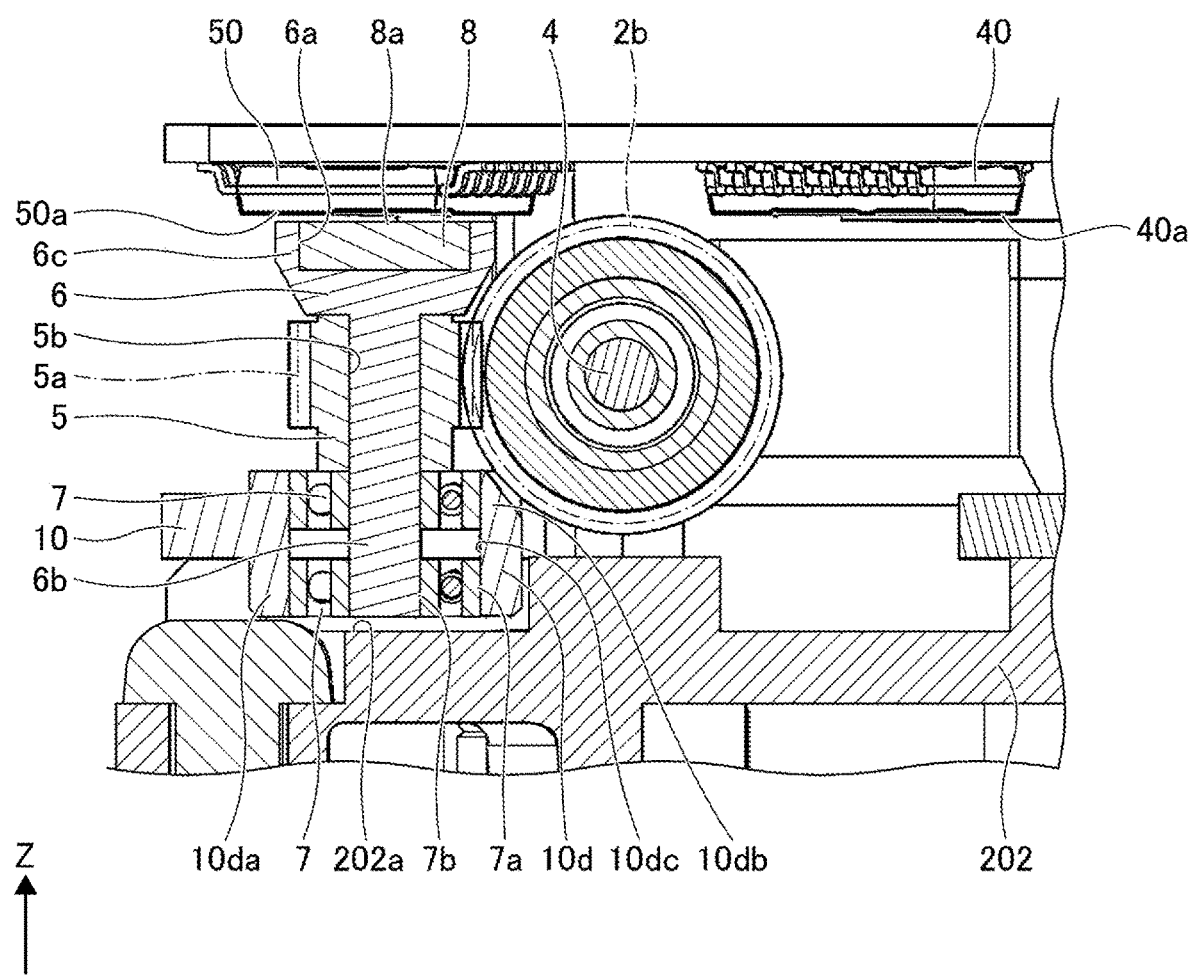
FIG. 18 is a cross sectional view of the absolute encoder 100-2 illustrated in FIG. 11 cut along a plane passing through the center of a layshaft gear 5 illustrated in FIG. 15 and perpendicular to the center line of the intermediate gear 2, where the substrate 20 and a magnetic sensor 50 are not illustrated in cross section.

FIG. 18 is a cross sectional view of the absolute encoder 100-2 illustrated in FIG. 11 cut along a plane passing through the center of the layshaft gear 5 illustrated in FIG. 15 and perpendicular to the center line of the intermediate gear 2. However, the substrate 20 and the magnetic sensor 50 are not illustrated in cross section. FIG. 18 illustrates a state in which a worm wheel portion 5a engages a worm gear portion 2b. Further, FIG. 18 illustrates a state in which a shaft portion 6b of the magnet holder 6 is held by the two bearings 7, and a state in which the permanent magnet 8 is held by the magnet holder 6. Moreover, FIG. 18 illustrates a state in which a surface of a head 6c provided in the magnet holder 6, on the outer side in the radial direction, is separated from a tip circle of the worm gear portion 2b. Further, according to FIG. 18, it may be seen that a surface 8a of the permanent magnet 8 provided in the magnet holder 6 is located at a position separated from the magnetic sensor 50 by a predetermined distance along the Z-axis direction. FIG. 18 also illustrates the cross sectional shape of a bearing holder portion 10d of the main base 10.

Figure 19:
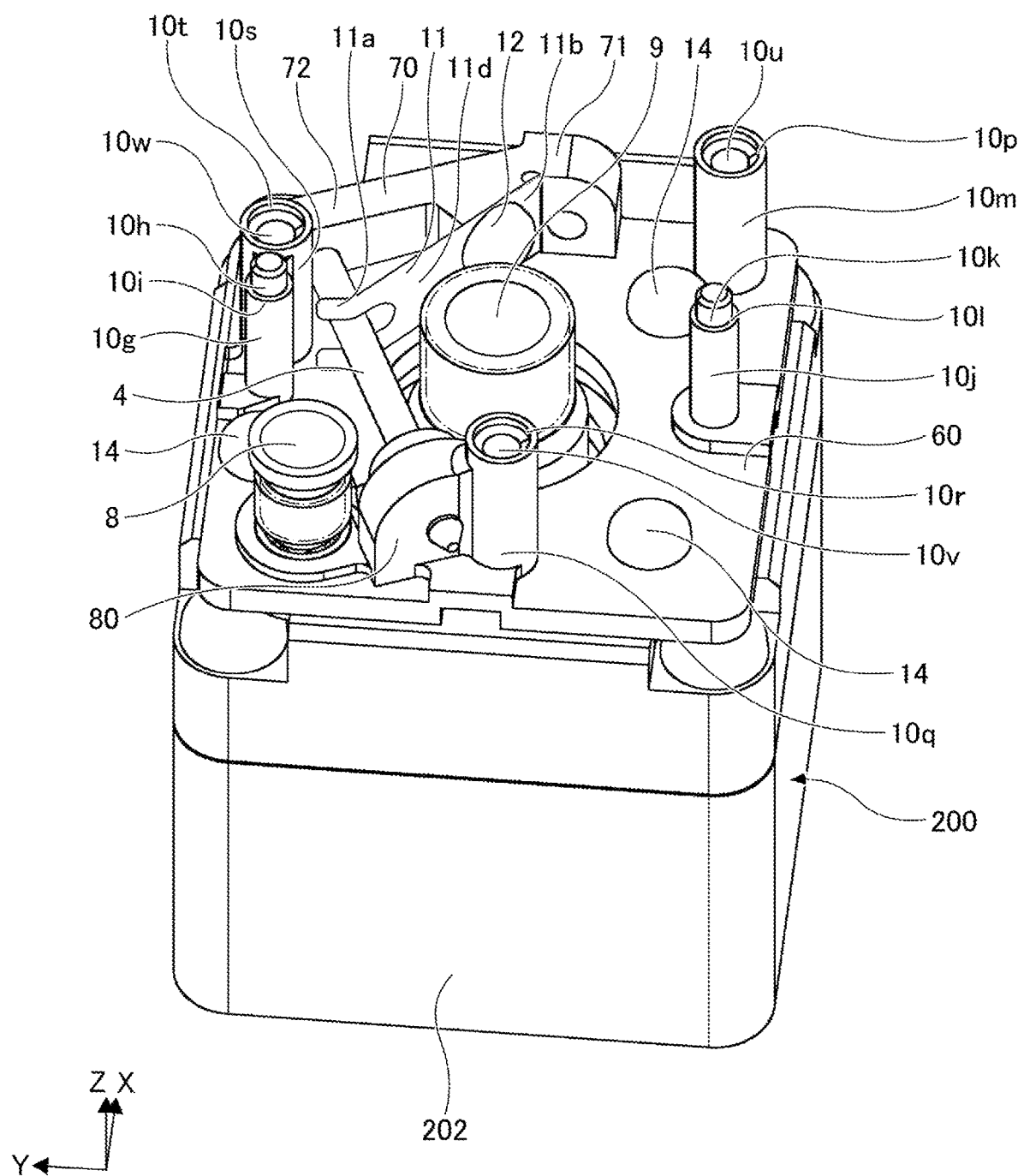
FIG. 19 is a perspective view illustrating a state in which the intermediate gear 2 is removed from a plurality of components illustrated in FIG. 12.
Figure 20:
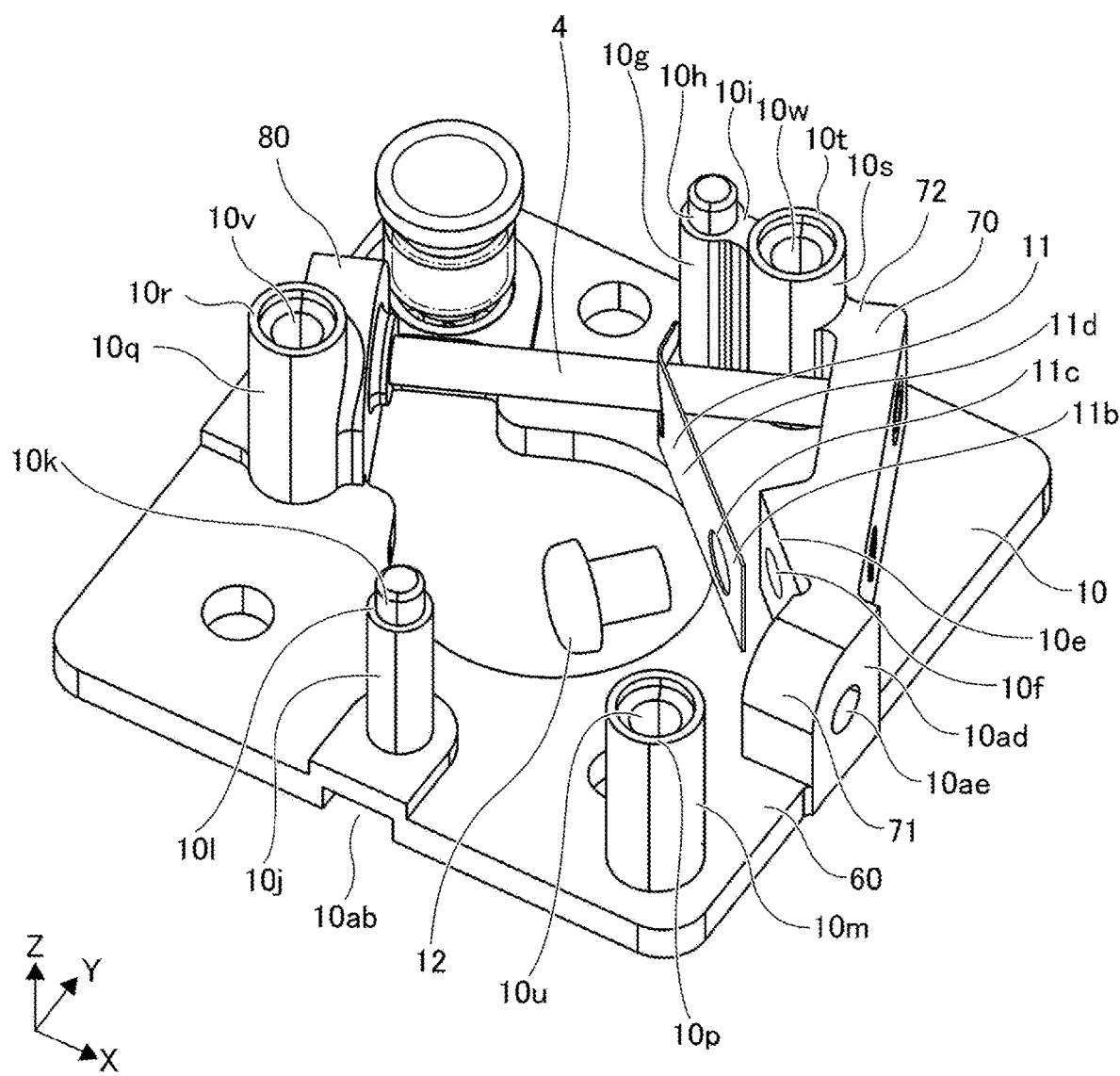
FIG. 20 is a perspective view illustrating a state in which a screw 12 is removed from a wall 70 illustrated in FIG. 19, a state of a leaf spring 11 after the screw 12 is removed, and the wall 70 provided with a leaf spring attaching surface 10e facing the leaf spring 11, where the motor 200 and the spindle gear 1 are not illustrated.

FIG. 19 is a perspective view illustrating a state in which the intermediate gear 2 is removed from the plurality of components illustrated in FIG. 12. FIG. 20 is a perspective view illustrating a state in which the screw 12 is removed from the wall 70 illustrated in FIG. 19, a state of the leaf spring 11 after the screw 12 is removed, and the wall 70 provided with the leaf spring attaching surface 10e facing the leaf spring 11. However, the motor 200 and the spindle gear 1 are not illustrated.

Figure 21:
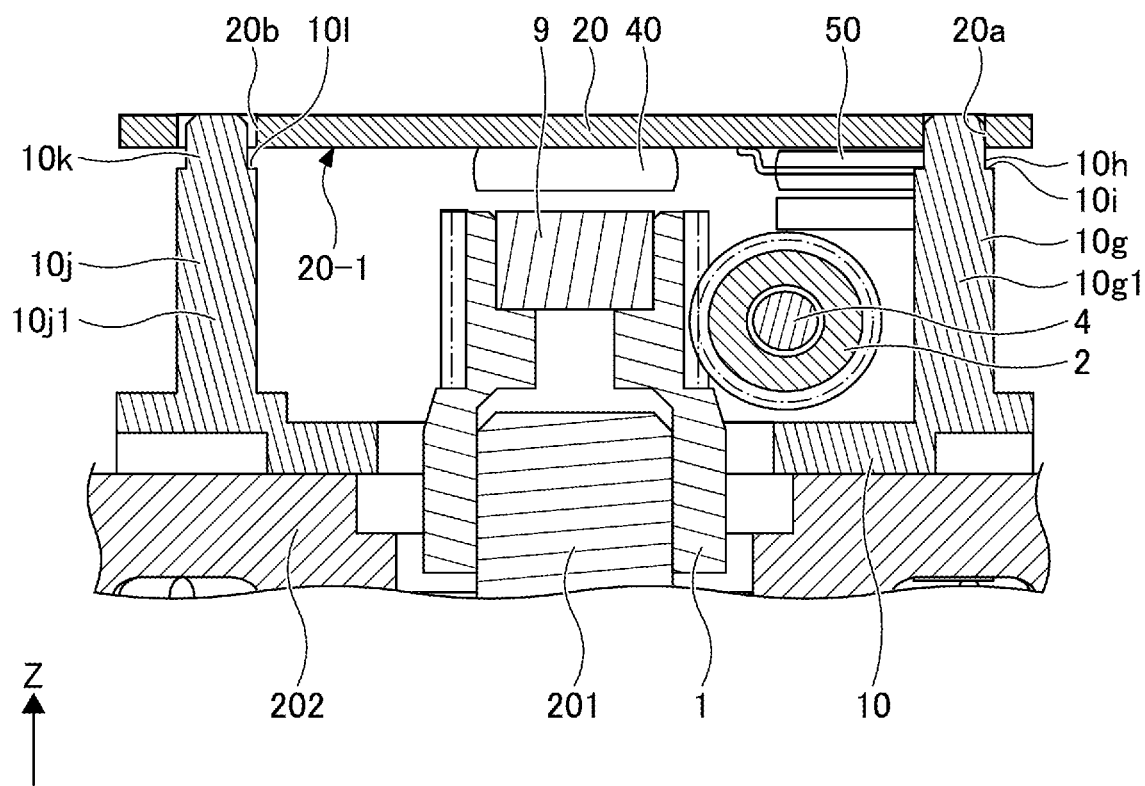
FIG. 21 is a cross sectional view of the absolute encoder 100-2 illustrated in FIG. 11 cut along a plane passing through a center of a substrate positioning pin 10g and a center of a substrate positioning pin 10j illustrated in FIG. 14, and parallel to the Z-axis direction, where the magnetic sensor 40 is not illustrated in cross section.

FIG. 21 is a cross sectional view of the absolute encoder 100-2 illustrated in FIG. 11 cut along a plane passing through the center of the substrate positioning pin 10g and the center of the substrate positioning pin 10j illustrated in FIG. 14, and parallel to the Z-axis direction. However, the magnetic sensor 40 is not in cross section.

Figure 22:
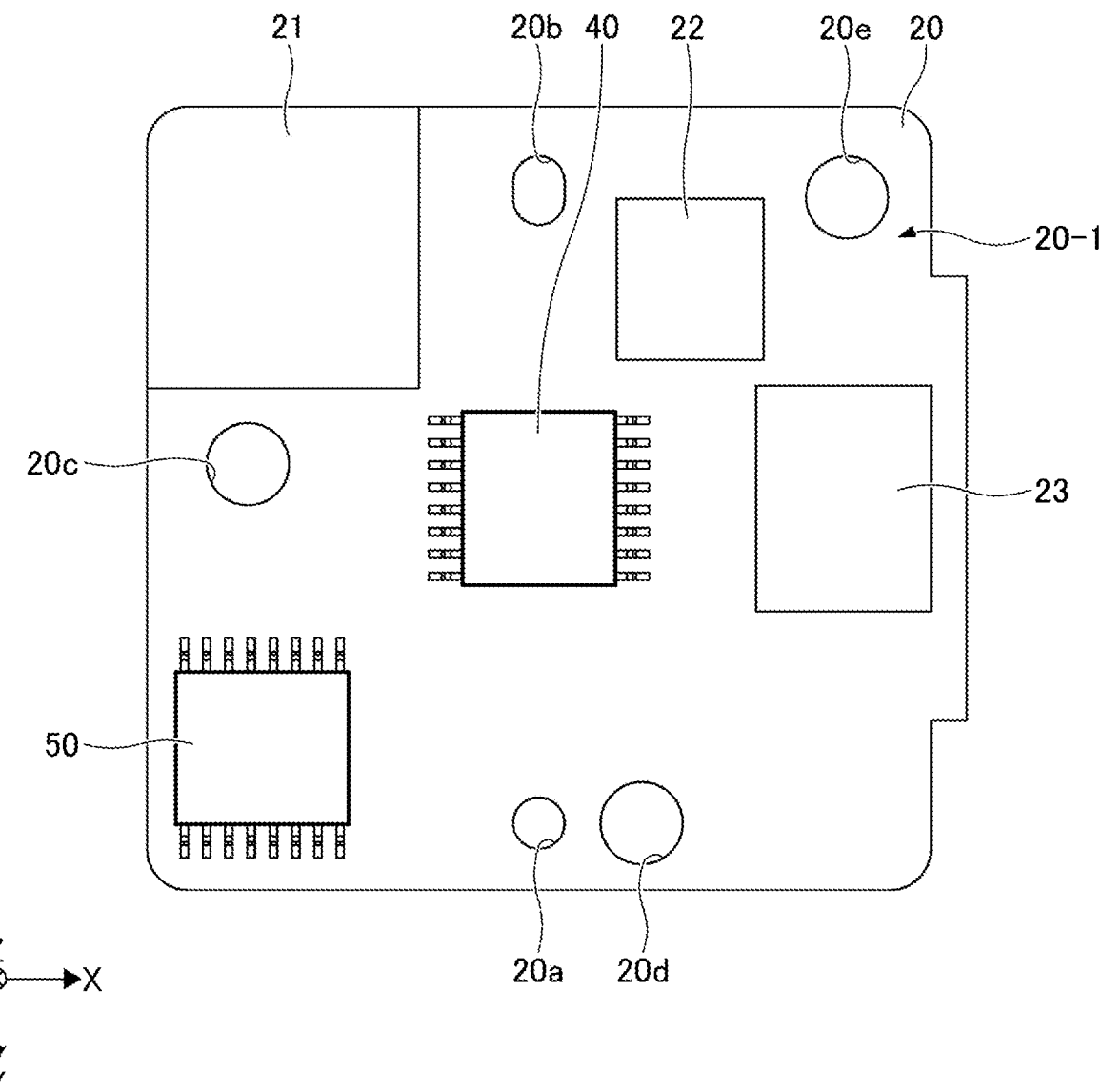
FIG. 22 is a diagram illustrating the substrate 20 illustrated in FIG. 11 viewed from the side of a bottom surface 20-1.
Figure 23:
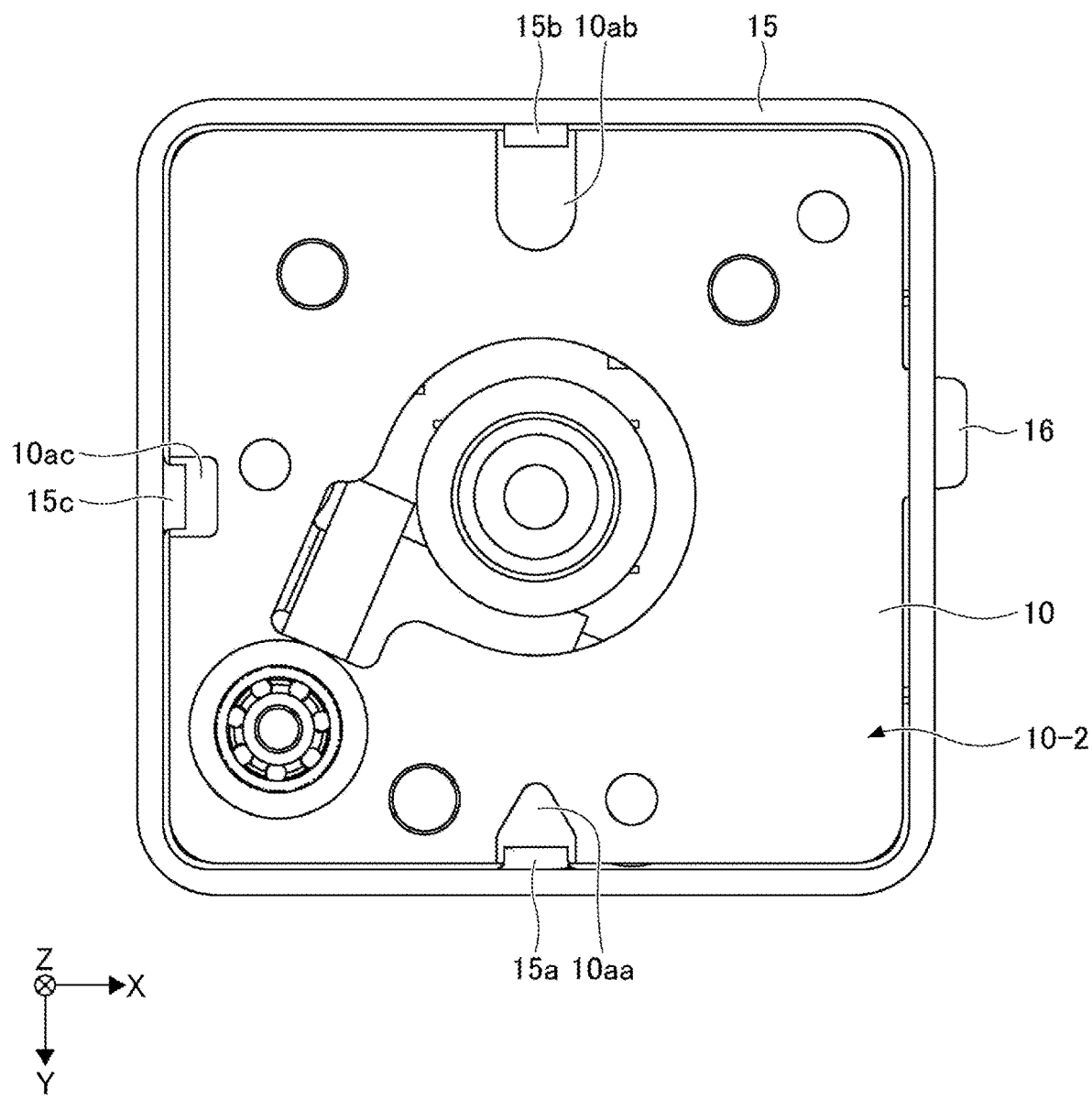
FIG. 23 is a diagram illustrating a state in which the motor 200 is removed from the state of FIG. 10 and viewed from the side of a bottom surface 10-2 of the main base 10.
Figure 24:
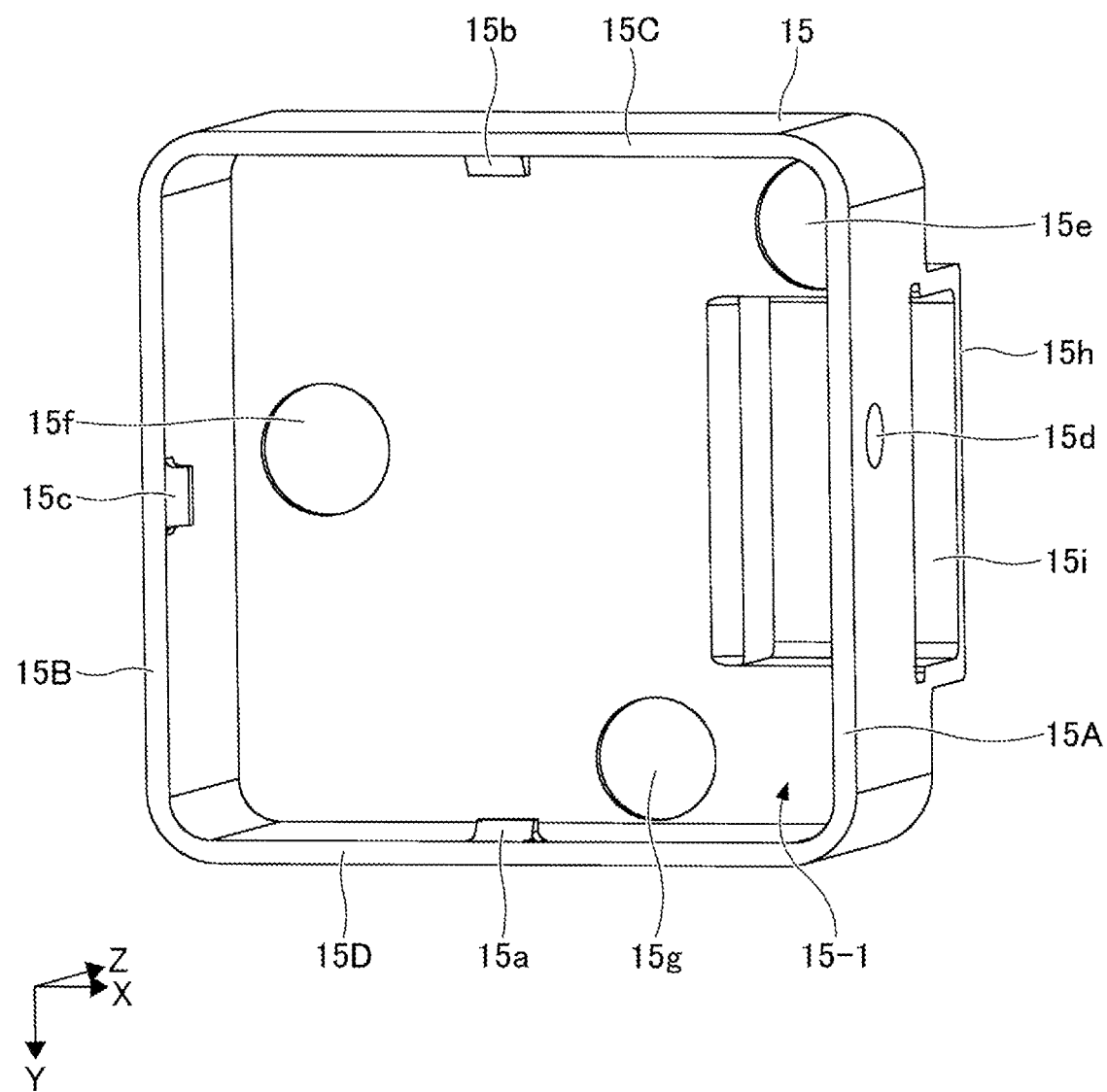
FIG. 24 is a perspective view of the case 15 illustrated in FIG. 10.

FIG. 22 is a diagram illustrating the substrate 20 illustrated in FIG. 11 viewed from the side of a bottom surface 20-1. FIG. 23 is a diagram illustrating a state in which the motor 200 is removed from the state of FIG. 10 and viewed from the side of the bottom surface 10-2 of the main base 10. The bottom surface 10-2 of the main base 10 is a surface on the opposite side of the top surface of the main base 10 illustrated in FIG. 20. The bottom surface 10-2 of the main base 10 is the surface opposing the motor 200. FIG. 24 is a perspective view of the case 15 illustrated in FIG. 10.

Figure 25:
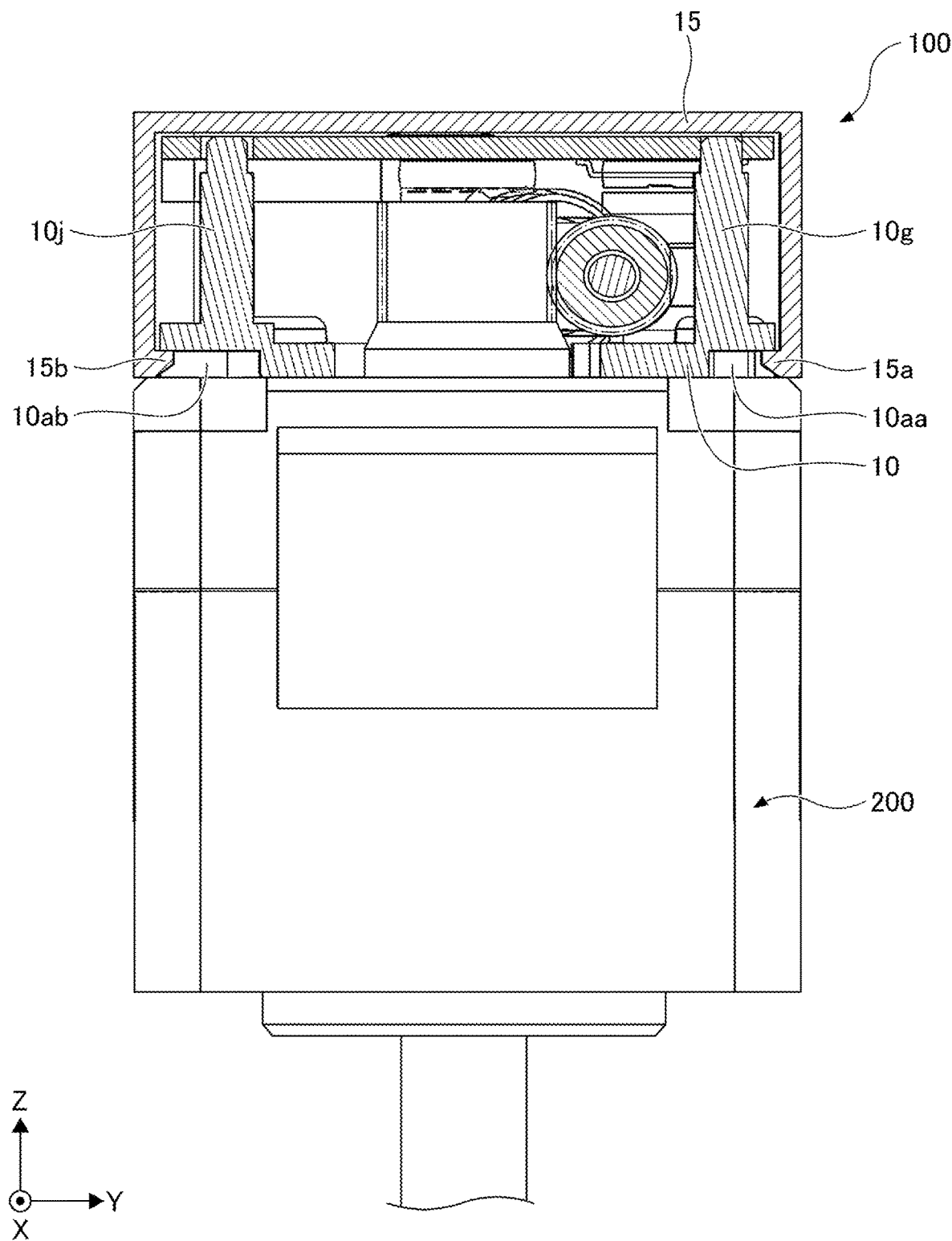
FIG. 25 is a cross sectional view of the absolute encoder 100-2 illustrated in FIG. 10 cut along a plane passing through the center of substrate positioning pin 10g and the center of substrate positioning pin 10j illustrated in FIG. 12, and parallel to the Z-axis direction, where the motor 200 and the spindle gear 1 are not illustrated in cross section.
Figure 26:
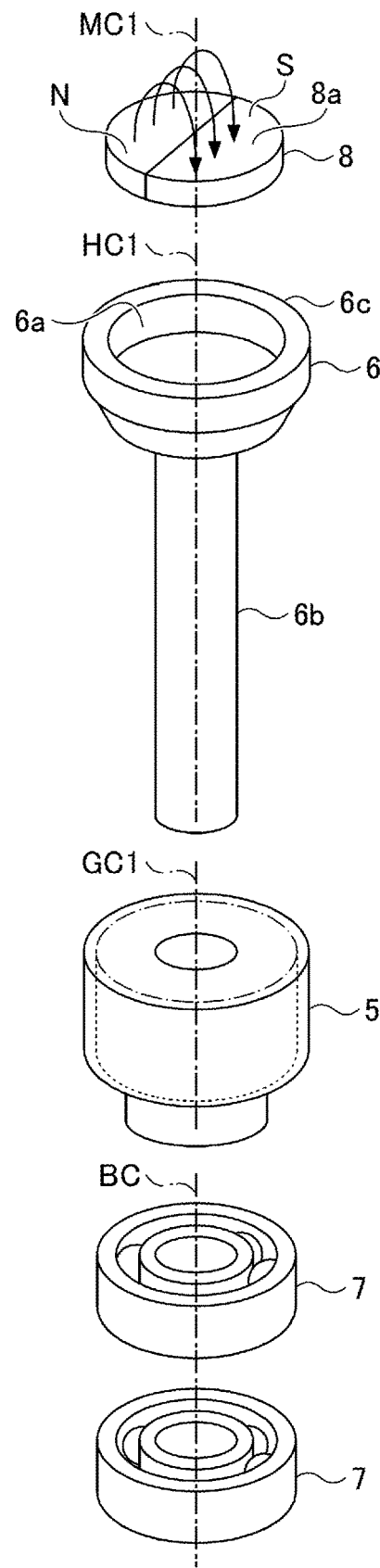
FIG. 26 is an exploded perspective view of a permanent magnet 8, a magnet holder 6, the layshaft gear 5, and the bearing 7 illustrated in FIG. 18.
Figure 27:
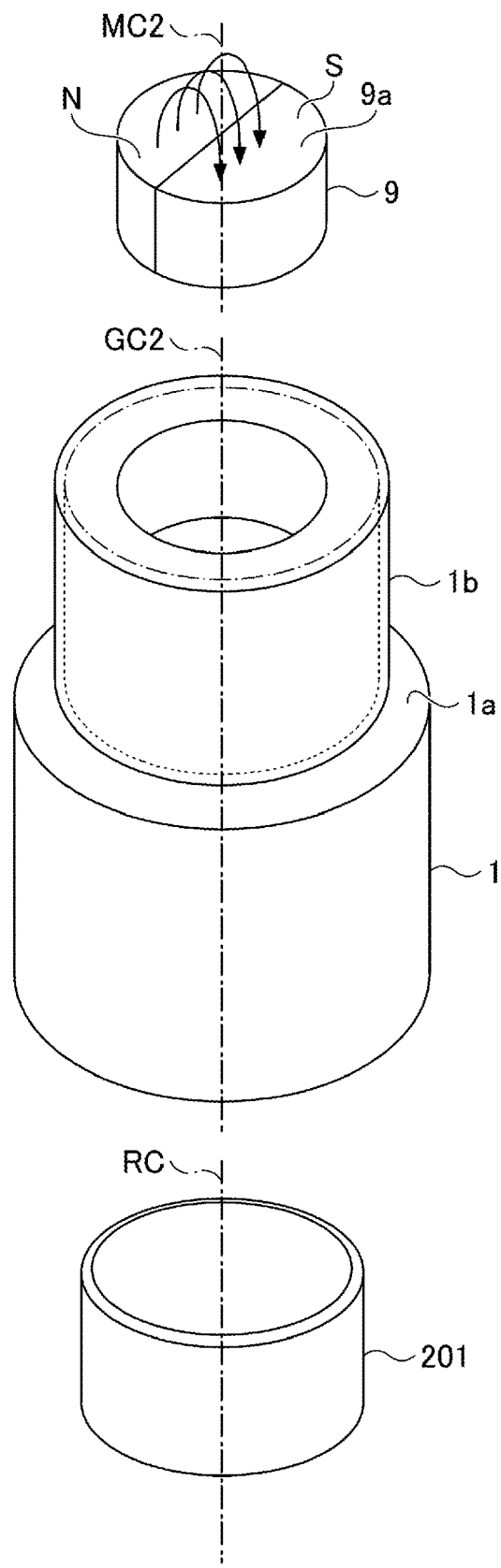
FIG. 27 is an exploded perspective view of a permanent magnet 9, the spindle gear 1, and the motor shaft 201 illustrated in FIG. 17.

FIG. 25 is a cross sectional view of the absolute encoder 100-2 illustrated in FIG. 10 cut along a plane passing through the center of substrate positioning pin 10g and the center of substrate positioning pin 10j illustrated in FIG. 12, and parallel to the Z-axis direction. However, the motor 200 and the spindle gear 1 are not illustrated in cross section. FIG. 25 illustrates a state in which a tab 15a provided on the case 15 engages a recess 10aa provided in the main base 10, and a state in which a tab 15b provided on the case 15 engages a recess 10ab provided in the main base 10. FIG. 26 is an exploded perspective view of the permanent magnet 8, the magnet holder 6, the layshaft gear 5, and the bearing 7 illustrated in FIG. 18. FIG. 27 is an exploded perspective view of the permanent magnet 9, the spindle gear 1, and the motor shaft 201 illustrated in FIG. 17.

Hereinafter, the configuration of the absolute encoder 100-2 will be described in detail. with reference to FIG. 10 through FIG. 27. The absolute encoder 100-2 includes the spindle gear 1, the intermediate gear 2, the bearing 3, the shaft 4, the layshaft gear 5, the magnet holder 6, the bearing 7, the permanent magnet 8, the permanent magnet 9, the main base 10, the leaf spring 11, the screw 12, the substrate attaching screw 13, the screw 14, the case 15, the attaching screw 16, the substrate 20, the microcomputer 21, a bidirectional driver 22, a line driver 23, a connector 24, the magnetic sensor 40, and the magnetic sensor 50.

The motor 200 may be a stepping motor, a DC brushless motor, or the like, for example. As an example, the motor 200 may be applied as the driving source which drives the industrial robot or the like via the deceleration mechanism, such as the harmonic gearing device or the like. The motor 200 includes the motor shaft 201. As illustrated in FIG. 17, one end of the motor shaft 201 protrudes in the Z-axis positive direction from a housing 202 of the motor 200. In addition, as illustrated in FIG. 10, the other end of the motor shaft 201 protrudes in the Z-axis negative direction from the housing 202 of the motor 200. Moreover, the motor shaft 201 is an example of the spindle.

An external shape of the motor 200 in the plan view is a square shape, for example. Each of the 4 sides forming the external shape of the motor 200 is 25 mm, for example. Among the 4 sides forming the external shape of the motor 200, the first side, and the second side parallel to the first side, respectively are parallel to the Y-axis. Among the 4 sides, the third side adjacent to the first side, and the fourth side parallel to the third side, respectively are parallel to the X-axis. Further, the absolute encoder 100-2, provided on the motor 200, has a square shape with each side of 25 mm in the plan view, to match the external shape of the motor 200 having the square shape with each side of 25 mm.

Next, each of the plurality of components provided in the absolute encoder 100-2 will be described.

As illustrated in FIG. 17, the spindle gear 1 is a cylindrical member which is provided coaxially with the motor shaft 201. The spindle gear 1 includes the first cylindrical portion 1a, and the second cylindrical portion 1b which is provided coaxially with the first cylindrical portion 1a on the side of the Z-axis positive direction of the first cylindrical portion 1a. In addition, the spindle gear 1 includes a communicating portion 1c, which is provided on the inner side of the second cylindrical portion 1b along the radial direction and connects the first cylindrical portion 1a and the second cylindrical portion 1b, and a worm gear portion 1d provided on the outer side of the second cylindrical portion 1b along the radial direction. By forming the communicating portion 1c in this manner, the communicating portion 1c functions as an air release passage when the spindle gear 1 is press fit into the motor shaft 201. An inner diameter of the communicating portion 1c is smaller than an inner diameter of the first cylindrical portion 1a and an inner diameter of the second cylindrical portion 1b. A space surrounded by a bottom surface 1e, which is an end surface of the communicating portion 1c on the Z-axis negative direction, and an inner peripheral surface of the first cylindrical portion 1a, forms a press-fitting portion 1f for fixing the spindle gear 1 to the end of the motor shaft 201. The press-fitting portion 1f is a recess which caves in from an end of the first cylindrical portion 1a on the Z-axis negative direction toward the Z-axis positive direction. The motor shaft 201 is press fit into the press-fitting portion 1f, and the spindle gear 1 rotates unitarily with the motor shaft 201. The worm gear portion 1d is a gear portion of the spindle gear 1.

A space surrounded by a bottom surface 1g, which is an end surface of the communicating portion 1c on the Z-axis positive direction, and an inner peripheral surface of the second cylindrical portion 1b, forms a magnet holding portion 1h which fixes the permanent magnet 9. The magnet holding portion 1h is a recess which caves in from an end of the second cylindrical portion 1b on the Z-axis positive direction toward the Z-axis negative direction. The permanent magnet 9 is press fit into the magnet holding portion 1h. An outer peripheral surface of the permanent magnet 9 which is press fit into the magnet holding portion 1h makes contact with the inner peripheral surface of the second cylindrical portion 1b, and a bottom surface 9b of the permanent magnet 9 makes contact with the bottom surface 1g. Accordingly, the permanent magnet 9 is positioned in the axial direction, and also positioned in the direction perpendicular to the axial direction. The axial direction of the permanent magnet 9 is equal to the center axis direction of the motor shaft 201.

As illustrated in FIG. 13 through FIG. 15, and FIG. 17, the worm gear portion 1d includes helically formed teeth, and engages with the worm wheel portion 2a of the intermediate gear 2. The worm wheel portion 2a is a gear portion of the intermediate gear 2. The illustration of the gear profile is omitted in FIG. 17. The worm gear portion 1d is formed of a polyacetal resin, for example. The worm gear portion 1d is an example of the first driving gear.

As illustrated in FIG. 13 through FIG. 16 or the like, the intermediate gear 2 is rotatably supported by the shaft 4 on the top surface of the main base 10. The center axis of the intermediate gear 2 is parallel to the X-Y plane. In addition, the center axis of the intermediate gear 2 is not parallel to each of the X-axis and the Y-axis in the plan view. In other words, the center axis direction of the intermediate gear 2 is inclined with respect to the directions in which the X-axis and the Y-axis respectively extend. The center axis direction of the intermediate gear 2 being inclined with respect to the directions in which the X-axis and the Y-axis respectively extend, means that the center axis of the intermediate gear 2 extends obliquely to the four sides of the main base 10. As illustrated in FIG. 13 and FIG. 14, the four sides of the main base 10 includes a first side 301 parallel to the Y-Z plane, a second side 302 parallel to the first side 301, a third side 303 parallel to the X-Z plane adjacent to the first side 301, and a fourth side 304 parallel to the third side 303. The first side 301 is the side provided on the X-axis positive direction of the main base 10. The second side 302 is the side provided on the X-axis negative direction of the main base 10. The third side 303 is the side provided on the Y-axis positive direction of the main base 10. The fourth side 304 is the side provided on the Y-axis negative direction of the main base 10.

The dimensions of the absolute encoder 100-2, viewed in the plan view, are adjusted to the dimensions of the motor

200 which is a square having the side of 25 mm, for example. For this reason, the dimensions of the absolute encoder 100-2 in the horizontal direction can be made small, by providing the intermediate gear 2, which is arranged parallel to the X-Y plane, to extend obliquely to the four sides of the main base 10. The horizontal direction is equal to the direction perpendicular to the center axis of the motor shaft 201, and is also equal to the direction parallel to the X-Y plane.

As illustrated in FIG. 12 through FIG. 16 or the like, the intermediate gear 2 includes the worm wheel portion 2*a*, the worm gear portion 2*b*, a bearing portion 2*c*, a press-fitting portion 2*d*, a sliding portion 2*e*, a bottom surface 2*f*, and a through hole 2*g*. The intermediate gear 2 is a cylindrical member having the through hole 2*g* penetrating the intermediate gear 2 along the center axis, and the shaft 4 is inserted into the through hole 2*g*. The through hole 2*g* is a space surrounded by an inner peripheral surface of the intermediate gear 2. The intermediate gear 2 is a member integrally molded from a metal, a resin, or the like, and in this example, the intermediate gear 2 is formed of a polyacetal resin.

The worm wheel portion 2*a* is a gear to which the worm gear portion 1*d* of the spindle gear 1 engages with the worm wheel portion 2*a* is an example of the first driven gear, and is a gear portion of the intermediate gear 2. The worm wheel portion 2*a* is provided at a position near a center of the axial direction of the intermediate gear 2, along the axial direction of the intermediate gear 2. In addition, the worm wheel portion 2*a* is formed by a plurality of teeth provided on an outer peripheral portion of the cylindrical portion of the intermediate gear 2.

An outer diameter of the worm wheel portion 2*a* is smaller than an outer diameter of the worm gear portion 1*d*. Because a center axis of the worm wheel portion 2*a* is parallel to the top surface of the main base 10, the outer diameter of the worm wheel portion 2*a* can be made small, thereby enabling the size of the absolute encoder 100-2 to be reduced in the Z-axis direction (height direction).

The worm gear portion 2*b* is formed by a helically formed teeth portion, and is provided adjacent to and coaxially with the worm wheel portion 2*a*. In addition, the worm gear portion 2*b* is provided on the outer periphery of the cylindrical portion of the intermediate gear 2. When the worm gear portion 2*b* engages with the worm wheel portion 5*a* provided on the layshaft gear 5, a rotary force of the intermediate gear 2 is transmitted to the layshaft gear 5. The worm gear portion 2*b* is an example of the second driving gear, and is a gear portion of the intermediate gear 2. The worm wheel portion 5*a* is a gear portion of the layshaft gear 5. A center line of the worm wheel portion 5*a*, and a center line of the worm gear portion 2*b*, are perpendicular are perpendicular to each over when viewed from a direction which is perpendicular to the center line of the worm wheel portion 5*a* and also perpendicular to the center line of the worm gear portion 2*b*.

The outer diameter of the worm gear portion 2*b* is set to a small value within a range possible, so that the size of the absolute encoder 100-2 can be reduced in the Z-axis direction (height direction).

As illustrated in FIG. 15, the bearing portion 2*c* is provided on an inner peripheral surface of the intermediate gear 2 on the inner side along the radial direction, on the side of the intermediate gear 2 opposite to the press-fitting portion 2*d*, that is, on the side of the sliding portion 2*e* of the intermediate gear 2. The shaft 4 is slidably inserted into the bearing portion 2*c*, and the intermediate gear 2 is rotatably supported on the shaft 4.

The press-fitting portion 2*d* is a recess which caves in from the end surface of the intermediate gear 2 toward the center of the axial direction Td of the intermediate gear 2, on the inner side of the worm gear portion 2*b*, and communicates to the through hole 2*g*. The press-fitting portion 2*d* may be regarded as an end of the through hole 2*g* having an opening with the increased diameter. An outer ring 3*a* of the bearing 3 is press fit and fixed to the press-fitting portion 2*d*.

As illustrated in FIG. 13 through 15, FIG. 19, and FIG. 20, the sliding portion 2*e* of the intermediate gear 2 is provided on one end of the intermediate gear 2, that is, on the side of the intermediate gear 2 opposite to the worm gear portion 2*b* along the axial direction Td. The sliding portion 2*e* of the intermediate gear 2 makes contact with a sliding portion 11*a* of the leaf spring 11. The leaf spring 11 is an example of a resilient member, and is made of a metal, for example. The sliding portion 11*a* of the leaf spring 11 is formed by a forked member having two portions branching from a base portion 11*d* of the leaf spring 11. Of the entire leaf spring 11, the base portion 11*d* of the leaf spring 11 is a plate shaped member provided between an attaching portion 11*b* and the sliding portion 11*a*.

A gap larger than the diameter of the shaft 4 is formed between the two branching portions forming the sliding portion 11*a* of the leaf spring 11. For this reason, the two branching portions straddle the shaft 4, and the attaching portion 11*b* of the leaf spring 11 is fixed by the screw 12 to the leaf spring attaching surface 10*e* disposed on the wall section 72 of the main base 10, so that the two branching portions do not make contact with the shaft 4.

The sliding portion 11*a* of the leaf spring 11 is provided at a position opposing the sliding portion 2*e* of the intermediate gear 2, after assembling the intermediate gear 2. The sliding portion 2*e* of the intermediate gear 2 makes contact with and is pressed by the sliding portion 11*a* of the leaf spring 11, thereby being biased in a direction from one end 4*a* of the shaft 4 to the other end 4*b* of the shaft 4 along the center axis of the shaft 4. When the intermediate gear 2 rotates in this state, the sliding portion 2*e* of the intermediate gear 2 slides while making contact with the sliding portion 11*a* of the leaf spring 11.

The bottom surface 2*f* of the intermediate gear 2 is positioned adjacent to the press-fitting portion 2*d*, and makes contact with a side surface 3*c* of the outer ring 3*a* of the bearing 3. The outer ring 3*a* is press fit into the press-fitting portion 2*d* until the side surface 3*c* of the outer ring 3*a* makes contact with the bottom surface 2*f*.

The through hole 2*g* of the intermediate gear 2 penetrates the intermediate gear 2 along the center axis of the intermediate gear 2, from the bearing portion 2*c* toward the press-fitting portion 2*d*, and is arranged coaxially with the shaft 4. Because the inner diameter of the through hole 2*g* is larger than the outer diameter of the shaft 4, a space is secured between the through hole 2*g* and the outer peripheral surface of the shaft 4.

As illustrated in FIG. 15 and FIG. 16, the bearing 3 includes the outer ring 3*a*, an inner ring 3*b*, the side surface 3*c*, and a side surface 3*d*. The side surface 3*c* of the bearing 3 is the side surface of the outer ring 3*a* in the axial direction Td of the shaft 4 indicated by an arrow in FIG. 15, and the side surface 3*d* of the bearing 3 is the side surface of the inner ring 3*b* in this axial direction Td. In the embodiment of the present invention, the (center) axial direction of the intermediate gear 2 or the shaft 4 is indicated by Td.

The outer ring 3a of the bearing 3 is press fit and fixed to the press-fitting portion 2d, and the side surface 3c makes contact with and is fixed to the bottom surface 2f. The shaft 4 is inserted on the inner side of the inner ring 3b. As illustrated in FIG. 15, the side surface 3d of the inner ring 3b makes contact with a contact surface 10c of the wall 80 of the main base 10. The contact surface 10c restricts the position of the intermediate gear 2 along the axial direction Td. As described above, because the intermediate gear 2 is biased by the leaf spring 11 in the axial direction Td from the one end 4a of the shaft 4 toward the other end 4b of the shaft 4, the side surface 3c of the outer ring 3a of the bearing 3, which makes contact with the bottom surface 2f of the intermediate gear 2, is also biased in the same direction. Accordingly, the inner ring 3b of the bearing 3 is also biased in the same direction, so that the side surface 3d of the inner ring 3b of the bearing 3 makes contact with the contact surface 10c of the wall 80. As a result, a biasing force is transmitted to the contact surface 10c of the wall 80, and the intermediate gear 2 is stably supported in the axial direction Td of the shaft 4. Details of the biasing force will be described later.

The outer ring 3a of the bearing 3 is rotatably provided with respect to the inner ring 3b. For this reason, the intermediate gear 2 is rotatably supported by the shaft 4 at two positions, namely, the bearing portion 2c of the intermediate gear 2 and the bearing 3 illustrated in FIG. 15. The shaft 4 is formed of stainless steel, for example.

As illustrated in FIG. 15, the wall 70 and the wall 80 are examples of a holding portion which rotatably holds the intermediate gear 2 through the shaft 4. The wall 80 is integrally provided on the top surface of the base portion 60 to form a pair with the wall 70, and extends in the Z-axis positive direction from the top surface of the base portion 60. Of the entire top surface of the base portion 60, the wall 80 is provided in a region closer to the second side 302 than the center along the X-axis direction, and closer to the third side 303 than the center along the Y-axis direction. Of this region, the wall 80 is provided at a position closer to the second side 302, and closer to the center along the Y-axis direction. The wall 70, the wall 80, and the shaft 4 function as a holding portion which rotatably holds the intermediate gear 2. The shaft 4 is a cylindrical member having the one end 4a and the other end 4b. The other end 4b of the shaft 4 is press fit into and fixed to the hole 10b formed in the wall 80 of the main base 10. On the other hand, the one end 4a of the shaft 4 need only be inserted into and positioned in the hole 10a formed in the wall 70, and the one end 4a of the shaft 4 does not need to be press fit into the hole 10a. Thus, because the one end 4a of the shaft 4 is inserted into the hole 10a rather than being press fit therein, the assembling of the shaft 4 is facilitated compared to a case where the one end 4a of the shaft 4 is press fit into the hole 10a.

As illustrated in FIG. 14 or the like, in the absolute encoder 100-2, the layshaft gear 5 is provided on the side of the intermediate gear 2 opposite to the spindle gear 1. For example, of the region surrounded by the four sides of the main base 10, the layshaft gear 5 is arranged in a region near a corner portion of the main base 10. The corner portion is where the second side 302 and the third side 303 illustrated in FIG. 14 intersect, for example. As described above, the layshaft gear 5 and the spindle gear 1 are arranged to sandwich the intermediate gear 2, using a limited region on the main base 10. Hence, compared to a case where the layshaft gear 5 and the spindle gear 1 are arranged adjacent to each other without sandwiching the intermediate gear 2 therebetween, it is possible to increase the distance from the layshaft gear 5 to the spindle gear 1.

The magnetic sensor 40 can detect the rotation angle of the corresponding spindle gear 1, by detecting a change in the magnetic flux generated from the permanent magnet 9 due to rotation of the permanent magnet 9 which rotates together with the spindle gear 1. On the other hand, the magnetic sensor 50 can detect the rotation angle of the corresponding layshaft gear 5, by detecting a change in the magnetic flux generated from the permanent magnet 8 due to the rotation of the permanent magnet 8 which rotates together with the layshaft gear 5.

Next, in a case where the spindle gear 1 and the layshaft gear 5 are arranged adjacent to each other, for example, a portion of the magnetic flux generated from each of the permanent magnet 8 and the permanent magnet 9 affects the magnetic sensor which does not correspond to each of the permanent magnet 8 and the permanent magnet 9, to generate the so-called magnetic interference which will be described hereinafter.

FIG. 28 is a diagram conceptually illustrating the waveform (A) detected by the magnetic sensor 40 which detects the magnetic flux of the permanent magnet 9 provided on the spindle gear 1, the waveform (B) detected by the magnetic sensor 50 which detects the magnetic flux of the permanent magnet 8 provided on the layshaft gear 5, and the magnetic interference waveform (C) detected by the magnetic sensor 40 which detects the state in which the portion of the magnetic flux of the permanent magnet 8 is superimposed on the magnetic flux of the permanent magnet 9 as the leakage magnetic flux, when the spindle gear 1 rotates. The ordinate indicates the magnetic flux, and the abscissa indicates the rotation angle of the spindle gear 1. As described above, in the magnetic sensor 40, it is desirable to detect the waveform of (A), but when the magnetic interference is generated, the waveform illustrated in (C) is formed, so that it is impossible to detect the accurate waveform.

Similarly, FIG. 29 is a diagram conceptually illustrating the waveform (A) detected by the magnetic sensor 50 which detects the magnetic flux of the permanent magnet 8 provided on the layshaft gear 5, the waveform (B) detected by the magnetic sensor 40 which detects the magnetic flux of the permanent magnet 9 provided on the spindle gear 1, and the magnetic interference waveform (C) detected by the magnetic sensor 50 which detects the state in which the portion of the magnetic flux of the permanent magnet 9 is superimposed on the magnetic flux of the permanent magnet 8 as the leakage magnetic flux, when the spindle gear 1 rotates. The ordinate indicates the magnetic flux, and the abscissa indicates the rotation angle of the layshaft gear 5. As described above, in the magnetic sensor 50, it is desirable to detect the waveform of (A), but when the magnetic interference is generated, the waveform illustrated in (C) is formed, and it is impossible to detect the accurate waveform.

According to the absolute encoder 100-2 of the embodiment 2, however, because the spindle gear 1 and the permanent magnets 9, and the layshaft gear 5 and the permanent magnets 8, are arranged with a separation to sandwich the intermediate gear 2 therebetween, it is possible to reduce the generation of the magnetic interference in which the portion of the magnetic flux generated from each of the permanent magnet 8 and the permanent magnet 9 affects the magnetic sensor that does not correspond to each of the permanent magnet 8 and the permanent magnet 9. For example, it is possible to reduce the portion of the magnetic flux generated from the permanent magnet 9 provided on the spindle gear 1, from interfering with the magnetic sensor 50 originally provided for the purpose of detecting the change in the magnetic flux generated from the permanent magnet 8 provided on the layshaft gear 5, as the leakage magnetic flux. In addition, it is possible to reduce the portion of the magnetic flux generated from the permanent magnet 8 provided on the layshaft gear 5, from interfering with the magnetic sensor 40 originally provided for the purpose of detecting the change in the magnetic flux generated from the permanent magnet 9, as the leakage magnetic flux.

Thus, according to the absolute encoder 100-2 of the embodiment 2, it is possible to prevent the detection accuracy of the magnetic sensor 50 which detects the rotation angle or the rotation quantity of the layshaft gear 5 from deteriorating, while making the size of the absolute encoder 100-2 relatively small in the plan view. In addition, according to the absolute encoder 100-2, it is possible to prevent the detection accuracy of the magnetic sensor 40 which detects the rotation angle or the rotation quantity of the spindle gear 1 from deteriorating, while making the size of the absolute encoder 100-2 relatively small in the plan view.

As illustrated in FIG. 18, the layshaft gear 5 is a cylindrical member which is press fit and fixed to the shaft portion 6*b* of the magnet holder 6. The layshaft gear 5 includes a worm wheel portion 5*a*, and a through hole 5*b*. The layshaft gear 5 is a member integrally molded from a metal or a resin, and in this example, the layshaft gear 5 is formed of a polyacetal resin, for example.

The worm wheel portion 5*a* is a gear which engages with the worm gear portion 2*b*. The worm wheel portion 5*a* is an example of the second driven gear. The worm wheel portion 5*a* formed by a plurality of teeth provided on the outer periphery of the cylindrical portion of the layshaft gear 5. In FIG. 13, when the intermediate gear 2 rotates, the rotary force of the intermediate gear 2 is transmitted to the layshaft gear 5 via the worm gear portion 2*b* and the worm wheel portion 5*a*.

The through hole 5*b* is a hole which penetrates the cylindrical layshaft gear 5 along the center axis thereof. The shaft portion 6*b* of the magnet holder 6 is press fit into the through hole 5*b*, and the layshaft gear 5 rotates unitarily with the magnet holder 6.

As illustrated in FIG. 18 and FIG. 26, the magnet holder 6 includes a magnet holding portion 6*a*, the shaft portion 6*b*, and the head 6*c*. The magnet holder 6 is a member integrally molded from a metal or a resin, and in this example, the magnet holder 6 is formed of non-magnetic stainless steel, for example.

An outer ring 7*a* of the two bearings 7 are press fit into an inner peripheral surface 10*dc* of the bearing holder portion 10*d* formed on the main base 10. Each of the two bearings 7 includes the outer ring 7*a*, and an inner ring 7*b*.

The shaft portion 6*b* of the magnet holder 6 is a cylindrical member, and is press fit into the through hole 5*b* of the layshaft gear 5, and a lower portion of the shaft portion 6*b* is inserted into the inner ring 7*b* of the two bearings 7. Hence, the magnet holder 6 is rotatably supported by the two bearings 7, with respect to the main base 10, and rotates unitarily with the layshaft gear 5.

In addition, the head 6*c* is provided on an upper end of the magnet holder 6. The head 6*c* is a cylindrical member with a bottom. The magnet holding portion 6*a* is formed in the head 6*c*. The magnet holding portion 6*a* is a recess which caves in from a top end surface of the head 6*c* toward a downward direction. The outer peripheral surface of the permanent magnet 8 arranged in the magnet holding portion 6*a* makes contact with the inner peripheral surface of the head 6*c*. Thus, the permanent magnet 8 is fixed to the magnet holding portion 6*a* of the head 6*c*.

Because the shaft portion 6*b* of the magnet holder 6 is rotatably supported by the two bearings 7 disposed in the bearing holder portion 10*d* formed on the main base 10, it is possible to prevent the magnet holder 6 from tilting. Therefore, if the two bearings 7 are arranged as far apart as possible in the axial direction of the shaft portion 6*b*, the effect of more positively preventing the tilting of the magnet holder 6 may be expected.

As illustrated in FIG. 18, an upper portion 10*db* of the bearing holder portion 10*d* is an upper region of the bearing holder portion 10*d* in the Z-axis direction, of the entire bearing holder portion 10*d*. One bearing 7 is provided on the inner side of the upper portion 10*db* of the bearing holder portion 10*d*. In addition, a lower portion 10*da* of the bearing holder section 10*d* is a lower region of the bearing holder portion 10*d* in the Z-axis direction, of the entire bearing holder portion 10*d*. One bearing 7 is provided on the inner side the lower portion 10*da* of the bearing holder portion 10*d*.

As illustrated in FIG. 18, a cutout portion 202*a* is provided in a portion of the housing 202 of the motor 200. The cutout portion 202*a* is a recess which caves in toward the Z-axis negative direction. Because the protruding lower portion 10*da* of the bearing holder portion 10*d* is provided on the main base 10, the cutout portion 202*a* is provided in the housing 202 of the motor 200 to prevent interference between each other. The lower portion 10*da* of the bearing holder portion 10*d* is a lower region of the bearing holder portion 10*d* in the Z-axis direction, of the entire bearing holder portion 10*d*. One bearing 7 is provided on the inner side the lower portion 10*da* of the bearing holder portion 10*d*. As described above, by providing the cutout portion 202*a* in the housing 202 of the motor 200, it is possible to provide the two bearings 7 apart from each other in the Z-axis direction, when compared to a case where the cutout portion 202*a* is not provided. Moreover, the upper portion 10*db* of the bearing holder portion 10*d* is an upper region of the bearing holder portion 10*d* in the Z-axis direction, of the entire bearing holder portion 10*d*.

When the bearing 7 are arranged at a position near the magnet holding portion 6*a* and the permanent magnet 8 in the axial direction of the shaft portion 6*b* of the magnet holder 6, it is possible to reduce axial runout during rotation of the magnet holder 6 and the permanent magnet 8. On the other hand, because the outer diameter of the upper portion 10*db* of the bearing holder portion 10*d* is near the intermediate gear 2, it is possible to provide the bearing 7 at a position closer to the magnet holding portion 6*a* and the permanent magnet 8, while preventing interference with the tip circle of the intermediate gear 2, by forming a slope on the upper portion 10*db* of the bearing holder portion 10*d*.

The magnetic sensor 40 can detect the rotation angle of the corresponding spindle gear 1, by detecting the change in the magnetic flux generated from the permanent magnet 9 due to rotation of the permanent magnet 9 which rotates together with the spindle gear 1. On the other hand, the magnetic sensor 50 can detect the rotation angle of the corresponding layshaft gear 5, by detecting the change in the magnetic flux generated from the permanent magnet 8 due to the rotation of the permanent magnet 8 which rotates together with the layshaft gear 5.

As illustrated in FIG. 18 and FIG. 26, the permanent magnet 8 has a surface 8*a*. The permanent magnet 8 has an approximately cylindrical shape, and a center axis MC1 of the permanent magnet 8 (an axis indicating the center of the permanent magnet 8, or an axis passing through the center of a boundary of the magnetic poles) coincides with a center axis HC1 of the magnet holder 6, a center axis GC1 of the layshaft gear 5, and a center axis BC of the bearing 7. The surface 8a of the permanent magnet 8 opposes a surface 50a of the magnetic sensor 50, with a predetermined separation therebetween. By making each of these center axes coincide with each other in this manner, it is possible to detect the rotation angle or rotation quantity with a higher accuracy.

In this embodiment, as illustrated in FIG. 26, the two magnetic poles (N/S) of the permanent magnet 8 are formed adjacent to each other on a plane (X-Y plane) perpendicular to the center axis MC1 of the permanent magnet 8. In other words, on the center axis MC1, the center of rotation of the permanent magnet 8 and the center of the boundary of the magnetic poles desirably coincide. In this case, it is possible to further improve the detection accuracy of the rotation angle or rotation quantity.

As illustrated in FIG. 17 and FIG. 27, the permanent magnet 9 is a permanent magnet having an approximately cylindrical shape which is press fit into the magnet holding portion 1h of the spindle gear 1, and includes the top surface 9a and the bottom surface 9b. The top surface 9a opposes the surface 40a of the magnetic sensor 40, with a predetermined separation therebetween. The bottom surface 9b makes contact with the bottom surface 1g of the magnet holding portion 1h of the spindle gear 1, and restricts the position (position in the Z-axis direction) of the spindle gear 1 in a direction of a center axis GC2. A center axis MC2 of the permanent magnet 9 (an axis indicating the center of the permanent magnet 9, or an axis passing through the center of the boundary of the magnetic poles) coincides with the center axis GC2 of the spindle gear 1, and a center axis RC of the motor shaft 201. By making each of these center axes coincide with each other in this manner, it is possible to detect the rotation angle or rotation quantity with an even higher accuracy.

In this embodiment, as illustrated in FIG. 27, the two magnetic poles (N/S) of the permanent magnet 9 are desirably formed adjacent to each other on a plane (X-Y plane) perpendicular to the center axis MC2 of the permanent magnet 9. In this case, it is possible to further improve the detection accuracy of the rotation angle or rotation quantity.

Each of the permanent magnet 8 and the permanent magnet 9 is formed of a magnetic material, such as a ferrite-based material, a Nd(neodymium)-Fe(iron)-B(boron)-based material, or the like, for example. Each of the permanent magnet 8 and the permanent magnet 9 may be a bonded magnet or a rubber magnet including a resin binder, for example.

FIG. 22 illustrates a positioning hole 20a, a positioning hole 20b, a hole 20c, a hole 20d, and a hole 20e, which are through holes formed in the substrate 20. The shape of the wall forming the positioning hole 20a is a circle, for example. The shape of the wall forming the positioning hole 20b is an ellipse, for example. Each of the holes 20c, 20d, and 20e is a through hole used to fix the substrate 20 to the main base 10 by substrate attaching screws 13 illustrated in FIG. 11. The shape of the wall forming each of the holes 20c, 20d, and 20e is a circle, for example. A diameter of the wall forming each of the holes 20c, 20d, and 20e is larger than a diameter of a male thread portion of the substrate attaching screw 13, and smaller than a diameter of a head of the substrate attaching screw 13.

As illustrated in FIG. 12 through FIG. 15, FIG. 19 through FIG. 21, or the like, the main base 10 includes the hole 10a, the hole 10b, the contact surface 10c, the bearing holder portion 10d, the leaf spring attaching surface 10e, the base portion 60, the wall 70, the wall 80, an opening 10-1, and a threaded hole 10f. The main base 10 includes the substrate positioning pin 10g, the substrate positioning pin 10j, a tip end 10h, a tip end 10k, a post 10m, a post 10q, a post 10s, a threaded hole 10u, a threaded hole 10v, and a threaded hole 10w. The substrate positioning pin 10g, the substrate positioning pin 10j, the post 10m, the post 10q, and the post 10s are examples of columnar member. A stepped portion 10i is formed between the tip end 10h of the substrate positioning pin 10g extending in the Z-axis direction from the main base 10, and a base portion 10g1 of the substrate positioning pin 10g. When the tip end 10h of the substrate positioning pin 10g is inserted into the positioning hole 20a formed in the substrate 20, a gap is formed between the bottom surface 20-1 of the substrate 20 and the stepped portion 10i. Similarly, a stepped portion 101 is formed between the tip end 10k of the substrate positioning pin 10j extending in the Z-axis direction from the main base 10, and a base portion 10j1 of the substrate positioning pin 10j. When the tip end 10k of the substrate positioning pin 10j is inserted into the positioning hole 20b formed in the substrate 20, a gap is formed between the bottom surface 20-1 of the substrate 20 and the stepped portion 101. Thus, when the two substrate positioning pins 10g and 10j are used, the position of the substrate 20 is restricted in the direction perpendicular to the Z-axis direction. However, because the gap is formed between the substrate 20 and each of the stepped portion 10i and the stepped portion 101, the position of the substrate 20 in the Z-axis direction is not restricted by the two substrate positioning pins 10g and 10j.

The base portion 60 of the main base 10 is a member integrally formed by aluminum die casting, for example, and has an approximately square shape in the plan view. The base portion 60 is an example of a plate portion. The base portion 60 is attached to the top surface of the motor 200.

The opening 10-1 illustrated in FIG. 12 penetrates the base portion 60 in a thickness direction (Z-axis direction). The spindle gear 1 is inserted into the opening 10-1. The opening 10-1 is an example of a first through hole.

As illustrated in FIG. 13, FIG. 14, FIG. 19, FIG. 20, or the like, the wall 70 includes a wall section 71, and a wall section 72. The wall 70 functions to support the shaft 4 and fix the leaf spring 11. The wall section 71 is integrally provided on the top surface of the base portion 60, and extends in the Z-axis positive direction from the base portion 60. In the plan view, of the entire top surface of the base portion 60, the wall 70 is provided in a region closer to the first side 301 than the center along the X-axis direction, and closer to the fourth side 304 than the center along the Y-axis direction. The wall section 71 includes an attaching surface 10ad positioned on the side of the X-axis positive direction, and a threaded hole 10ae penetrating the wall section 71 in the X-axis positive direction. As illustrated in FIG. 10, FIG. 23, and FIG. 24, the attaching screw 16 is inserted through a hole 15d in the case 15 and screwed into the threaded hole 10ae, so that the inner surface of the case 15 makes contact with and is fixed to the attaching surface 10ad of the wall section 71.

As illustrated in FIG. 14, in the plan view, of the entire top surface of the base portion 60, the wall section 72 is provided in a region closer to the first side 301 than the center along the X-axis direction, and closer to the third side 303 than the center along the Y-axis direction. The wall section 72 is connected to the wall section 71, and extends from the wall section 71 toward a vicinity of the center of the third side 303. An end of the wall section 72 near the third side 303 is connected to the post 10s. The post 10s, connected to the wall section 72, is provided at a position near the center along the X-axis direction of the main base 10, and near the third side 303 of the main base 10. Thus, the wall section 72 extends from the wall section 71 toward the post 10s. In other words, in the plan view, the wall section 72 extends in an oblique direction with respect to each of the X-axis and the Y-axis.

As illustrated in FIG. 20, the screw 12 is inserted through the hole 11c formed in the attaching portion lib of the leaf spring 11, and is screwed into the threaded hole 10f formed in the wall section 72 of the main base 10. Accordingly, the attaching portion 11b of the leaf spring 11 makes contact with the leaf spring attaching surface 10e formed on the wall section 72, and the leaf spring 11 is fixed to the wall section 72. The wall section 72 functions as a fixing portion to which the leaf spring 11 is fixed. In this state, as illustrated in FIG. 14 and FIG. 15, the sliding portion 11a of the leaf spring 11 makes contact with the sliding portion 2e of the intermediate gear 2 which is inserted with the shaft 4.

An attaching angle θ illustrated in FIG. 15 will be described. Because the worm gear portion 1d of the spindle gear 1 engages with the worm wheel portion 2a, a first thrust force is generated at the intermediate gear 2 in the direction from the other end 4b of the shaft 4 toward the one end 4a of the shaft 4, or in the direction from the one end 4a of the shaft 4 toward the other end 4b of the shaft 4, as the worm gear portion 1d of the spindle gear 1 rotates. Further, because the worm gear portion 2b engages with the worm wheel portion 5a of the layshaft gear 5, a second thrust force is generated at the intermediate gear 2 in the direction from the other end 4b of the shaft 4 toward the one end 4a of the shaft 4, or in the direction from the one end 4a of the shaft 4 toward the other end 4b of the shaft 4. Even when the first thrust force and the second thrust force are generated in this manner, it is necessary to reduce the movement of the intermediate gear 2 in the axial direction Td of the shaft 4, in order to accurately transmit the rotation quantity of the worm gear portion 1d of the spindle gear 1 to the worm wheel portion 5a of the layshaft gear 5. The leaf spring 11 applies a biasing force to the intermediate gear 2, in the direction from the one end 4a of the shaft 4 toward the other end 4b of the shaft 4. The biasing force generated by the leaf spring 11 is set to a value higher than a sum of the first thrust force and the second thrust force in the direction from the other end 4b of the shaft 4 toward one end 4a of the shaft 4.

In FIG. 15, the attaching angle θ is equal to an angle formed by the base portion 11d of the leaf spring 11 which is fixed to the wall section 72 of the main base 10, and a side surface 73 on the side of the intermediate gear 2 of the surface forming the hole 10a of the wall section 72 in which the one end 4a of the shaft 4 is inserted is formed, in which the intermediate gear 2 is not inserted into the shaft 4. The side surface 73 and the shaft 4 in this embodiment are at right angles, but the angle is not particularly limited. The attaching angle θ is set to such an angle that, when the intermediate gear 2 is assembled onto the shaft 4, the sliding portion 11a of the leaf spring 11 makes contact with the sliding portion 2e of the intermediate gear 2 to bend the leaf spring 11 by a predetermined amount, the biasing force in the axial direction Td of the shaft 4 is appropriately applied with respect to the intermediate gear 2. Hence, the intermediate gear 2 is biased in the direction from the one end 4a of the shaft 4 toward the other end 4b of the shaft 4 by the leaf spring 11, to thereby reduce the movement of the intermediate gear 2 caused by the combined force of the first thrust force and the second thrust force in the direction from the other end 4b of the shaft 4 toward the one end 4a of the shaft 4. As a result, it is possible to prevent the rotation accuracy of the layshaft gear 5 from deteriorating. The larger the biasing force becomes, the larger the sliding resistance becomes when the intermediate gear 2 illustrated in FIG. 15 rotates. For this reason, it is desirable to set the attaching angle θ to an appropriate value so that a sufficient biasing force can be generated to reduce the movement of the intermediate gear caused by the thrust force, while making the sliding resistance when the intermediate gear 2 rotates to a requisite minimum. In order to set the attaching angle θ to such an appropriate value, it is necessary to improve a profile irregularity of the leaf spring attaching surface 10e to which the leaf spring 11 is attached, and to reduce an error in the attaching angle of the wall 70 with respect to the base portion 60.

In the absolute encoder 100-2 according to the embodiment 2, because the main base 10 is formed by the aluminum die casting, the error in the attaching angle of the wall 70 with respect to the base portion 60 can be made small, and the profile irregularity of the leaf spring attaching surface 10e can be improved, when compared to a case where the base portion 60 and the wall 70 made separately by the sheet metal work are combined, for example. As a result, the error in the attaching angle 9 of the leaf spring 11 with respect to the wall section 72 becomes small, and management of the biasing force is facilitated.

As illustrated in FIG. 19, the main base 10 is fixed by 3 screws 14 inserted through holes formed at 3 locations of the main base 10, and screwed into threaded holes formed in the motor 200. The threaded hole 10v, the threaded hole 10u, and the threaded hole 10w are formed at tip ends on the Z-axis positive direction side of the post 10q, the post 10m, and the post 10s extending in the Z-axis positive direction from the main base 10. The substrate attaching screws 13 inserted through the hole 20c, the hole 20e, and the hole 20d formed in the substrate 20 illustrated in FIG. 11 are screwed into the threaded hole 10v, the threaded hole 10u, and the threaded hole 10w, respectively. Accordingly, a top end surface 10r, a top end surface 10p, and a top end surface 10t of the post 10q, the post 10m, and the post 10s make contact with the bottom surface 20-1 of the substrate 20 illustrated in FIG. 21. The bottom surface 20-1 of the substrate 20 is the surface opposing the main base 10, of the two substrate surfaces in the Z-axis direction of the substrate 20. As a result, the position of the substrate 20 in the Z-axis direction is defined.

As illustrated in FIG. 10, FIG. 23, FIG. 25, or the like, the case 15 is a box-shaped member having one surface that is open, and includes the top surface 15-1, a first side surface 15A, a second side surface 15B, a third side surface 15C, and a fourth side surface 15D. The case 15 is an integrally molded member made of a resin, for example. The top surface 15-1 corresponds to the bottom of the box-shaped member. The top surface 15-1 is the surface opposing the top surface 20-2 of the substrate 20 illustrated in FIG. 11. The top surface 20-2 of the substrate 20 is the substrate surface opposite to the bottom surface 20-1 of the substrate 20. The first side surface 15A is a plate shaped member extending in the Z-axis negative direction from an edge of the top surface 15-1 on the side of the X-axis positive direction. The second side surface 15B is a plate shaped member extending in the Z-axis negative direction from an edge of the top surface 15-1 on the side of the X-axis negative direction. The third side surface 15C is a plate shaped member extending in the Z-axis negative direction from an edge of the top surface 15-1 on the side of the Y-axis negative direction. The fourth side surface 15D is a plate shaped member extending in the Z-axis negative direction from an edge of the top surface 15-1 on the side of the Y-axis positive direction. The shape of the case 15 in the plan view is a rectangular shape corresponding to the shape of the motor 200 in the plan view. A plurality of components of the absolute encoder 100-2 is accommodated in an interior space of the case 15.

As illustrated in FIG. 24, the case 15 includes the tab 15a, the tab 15b, a tab 15c, the hole 15d, a recess 15e, a recess 15f, a recess 15g, a connector case 15h, and an opening 15i. The tab 15a is provided near the end of the fourth side surface 15D in the Z-axis negative direction. The tab 15a extends in the Y-axis negative direction from the fourth side surface 15D so as to oppose the third side surface 15C. The tab 15a engages with the recess 10aa provided in the main base 10 illustrated in FIG. 23. The tab 15b is provided near the end of the third side surface 15C in the Z-axis negative direction. The tab 15b extends in the Y-axis positive direction from the third side surface 15C so as to oppose the fourth side surface 15D. The tab 15b engages with the recess 10ab provided in the main base 10 illustrated in FIG. 23. The tab 15c is provided near the end of the second side surface 15B in the Z-axis negative direction. The tab 15c extends in the X-axis negative direction from the second side surface 15B so as to oppose the first side surface 15A. The tab 15c engages with the recess 10ac provided in the main base 10 illustrated in FIG. 23.

The recess 15e, the recess 15f, and the recess 15g illustrated in FIG. 24 are formed so that portions of the top surface 5-1 of the case 15 cave in toward the Z-axis positive direction, to avoid interference with the respective heads of the 3 substrate attaching screws 13 illustrated in FIG. 11.

The connector case 15h is formed so that a portion of the top surface 5-1 of the case 15 caves in toward the Z-axis positive direction, to cover the connector 24 illustrated in FIG. 11. A bottom surface of the connector case 15h has a rectangular shape in the plan view. The connector case 15h is provided in a region of the top surface 5-1, near the first side surface 15A than the center along the X-axis direction, and near the center along the Y-axis direction. In addition, the connector case 15h is provided in the region of the top surface 5-1, near the first side surface 15A.

The opening 15i is formed between the bottom surface of the connector case 15h and the first side surface 15A. The connector 24 illustrated in FIG. 11 is arranged so as to oppose the bottom surface of the connector case 15h. The connector 24 is a female connector, for example, and a male connector provided on one end of an external wiring is inserted into the connector 24. The male connector is inserted through the opening 15i illustrated in FIG. 24, into the connector 24 arranged on the connector case 15h. Accordingly, conductive terminals provided on the connector 24 are electrically connected to conductive terminals of the male connector provided on the one end of the external wiring. As a result, an external device connected to the other end of the external wiring, and the connector 24, are electrically connected, so that signals can be transmitted between the absolute encoder 100-2 and the external device.

Further, because the connector case 15h is provided at a position near the first side surface 15A, the position of the connector 24 in the plan view becomes the same as the position of the connector 400 in the plan view of the motor 200, as illustrated in FIG. 11. By configuring the absolute encoder 100-2 in this manner; the position where the external wiring, which is to be electrically connected to the conductive terminals provided on the connector 24, is drawn out, can be brought closer to the position where an external wiring, which is to be electrically connected to conductive pins provided on the connector 400, is drawn out. Accordingly, these external wires can be bundled into one near the absolute encoder 100-2 and the motor 200, to facilitate such a group of bundled wires to be routed to the external device.

As illustrated in FIG. 22, the magnetic sensor 40, the magnetic sensor 50, the microcomputer 21, the bidirectional driver 22, and the line driver 23 are provided on the bottom surface 20-1 of the substrate 20. The bottom surface 20-1 of the substrate 20 is the attaching surface on which the magnetic sensor 40 and the magnetic sensor 50 are attached. As described above, the top end surface 10r of the post 10q, the top end surface 10p of the post 10m, and the top end surface 10t of the post 10s make contact with the bottom surface 20-1 of the substrate 20. In addition, as illustrated in FIG. 13, the post 10q, the post 10m, and the post 10s are provided on the main base 10 so as to reduce the difference in the separation distances of one another in the plan view of the main base 10. For example, the post 10q is provided near the second side 302 in the vicinity of the center along the Y-axis direction of the main base 10. The post 10q is integral with the wall 80. The post 10m is provided near the corner where the first side 301 and the fourth side 304 intersect. The post 10s is provided near the third side 303 in the vicinity of the center along the X-axis direction of the main base 10. The post 10s is integral with the wall 70 and the substrate positioning pin 10g. By providing the post 10q, the post 10m, and the post 10s in this manner, it is possible to accurately restrict the positions of the magnetic sensor 40 and the magnetic sensor 50 provided on the substrate 20, respectively, along the Z-axis direction. When the post 10q, the post 10m, and the post 10s are formed at locations on the main base 10 as far as possible from one another in the X-Y plane direction, it is possible to more stably hold the position of the substrates 20.

In the absolute encoder 100-2 according to the embodiment 2, the main base 10 is formed by die casting. For this reason, it is possible to improve the positioning accuracy of each of the components, when compared to a case where the base portion 60 of the main base 10 is made by sheet metal work, for example, and the post 10q, the post 10m, the post 10s, the substrate positioning pin 10g, the substrate positioning pin 10j, the wall 70, the wall 80, or the like are made separately and then assembled. Further, because the number of parts at the time of manufacturing becomes small, the configuration of the absolute encoder 100-2 can be simplified, and the assembling can be facilitated to shorten the manufacturing time, thereby increasing the reliability of the absolute encoder 100-2.

The magnetic sensor 40 is an example of a spindle angle sensor. The magnetic sensor 40 is positioned directly above the permanent magnet 9 with a predetermined separation. The magnetic sensor 40 detects and determines the rotation angle of the corresponding spindle gear 1, by detecting the change in the magnetic flux generated from the permanent magnet 9 due to the rotation of the permanent magnet 9 which rotates together with the spindle gear 1, and outputs the angle information indicating the determined rotation angle, as the digital signal.

The magnetic sensor 50 is an example of an angle sensor. In addition, the layshaft gear 5 is a rotating body which rotates according to the rotation of the worm wheel portion 5a which is the second driven gear. The magnetic sensor 50 is positioned directly above the permanent magnet 8 with a predetermined separation. The magnetic sensor 50 detects and determines the rotation angle of the corresponding layshaft gear 5, by detecting the change in the magnetic flux generated from the permanent magnet 8 due to the rotation of the permanent magnet 8 which rotates together with the layshaft gear 5, and outputs the angle information indicating the determined rotation angle, as the digital signal.

Each of the magnetic sensor 40 and the magnetic sensor 50 includes a sensing element which senses the change in the magnetic flux, and a computing circuit which outputs the digital signal indicating the rotation angle based on the output of the sensing element. The sensing element may be a combination of a plurality of magnetic field sensing elements, such as Hall elements, GMR (Giant Magneto Resistive) elements, or the like, for example. The number of magnetic field sensing elements is 4, for example.

When the number of threads of the worm gear portion 1d of the spindle gear 1 is 4, and the number of teeth of the worm wheel portion 2a of the intermediate gear 2 is 20, the reduction gear ratio is 5. In other words, when the spindle gear 1 makes 5 revolutions, the intermediate gear 2 makes 1 revolution. Moreover, when the number of threads of the worm gear portion 2b of the intermediate gear 2 is 1, and the number of teeth of the worm wheel portion 5a of the layshaft gear 5 is 18, the reduction gear ratio is 18. In other words, when the intermediate gear 2 makes 18 revolutions, the layshaft gear 5 makes 1 revolution. Accordingly, when the spindle gear 1 makes 90 revolutions, the intermediate gear 2 makes 90÷5=18 revolutions, and the layshaft gear 5 makes 18÷18=1 revolution.

The spindle gear 1 and the layshaft gear 5 are provided with the permanent magnet 9 and the permanent magnet 8 which rotate unitarily therewith, respectively. For this reason, the rotation quantity of the motor shaft 201 can be determined when the corresponding magnetic sensor 40 and the magnetic sensor 50 detect the rotation angles of the spindle gear 1 and the layshaft gear 5, respectively. When the spindle gear 1 makes 1 revolution, the layshaft gear 5 makes 1/90 revolution, that is, rotates by 4°. Hence, when the rotation angle of the layshaft gear 5 is less than 4°, the rotation quantity of the spindle gear 1 is less than 1 revolution, and when the rotation angle of the layshaft gear 5 is more than 4° or more and less than 8° degrees, the rotation quantity of the spindle gear 1 is 1 revolution or more and less than 2 revolutions. As described above, in the absolute encoder 100-2, the rotation speed of the spindle gear 1 can be determined according to the rotation angle of the layshaft gear 5. In particular, the absolute encoder 100-2 can utilize the reduction gear ratio of the worm gear portion 1d and the worm wheel portion 2a, and the reduction gear ratio of the worm gear portion 2b and the worm wheel portion 5a, to determine the rotation speed of the spindle gear 1 even if the rotation speed of the spindle gear 1 amounts to a plurality of revolutions.

The microcomputer 21, the bidirectional driver 22, the line driver 23, and the connector 24 are attached to the substrate 20. The microcomputer 21, the bidirectional driver 22, the line driver 23, and the connector 24 are electrically connected by interconnect patterns on the substrate 20.

The microcomputer 21 is configured by a Central Processing Unit (CPU), acquires the digital signals indicating the rotation angles output from the magnetic sensor 40 and the magnetic sensor 50, respectively, and computes the rotation quantity of the spindle gear 1.

The bidirectional driver 22 performs bidirectional communication with the external device which is connected to the connector 24. The bidirectional driver 22 converts data, such as an operation signal, into a differential signal, and communicates with the external device. The line driver 23 converts the data indicating the rotation quantity into a differential signal, and outputs the differential signal in real time to the external device which is connected to the connector 24. The connector 24 is connected to the connector of the external device.

Figure 30:
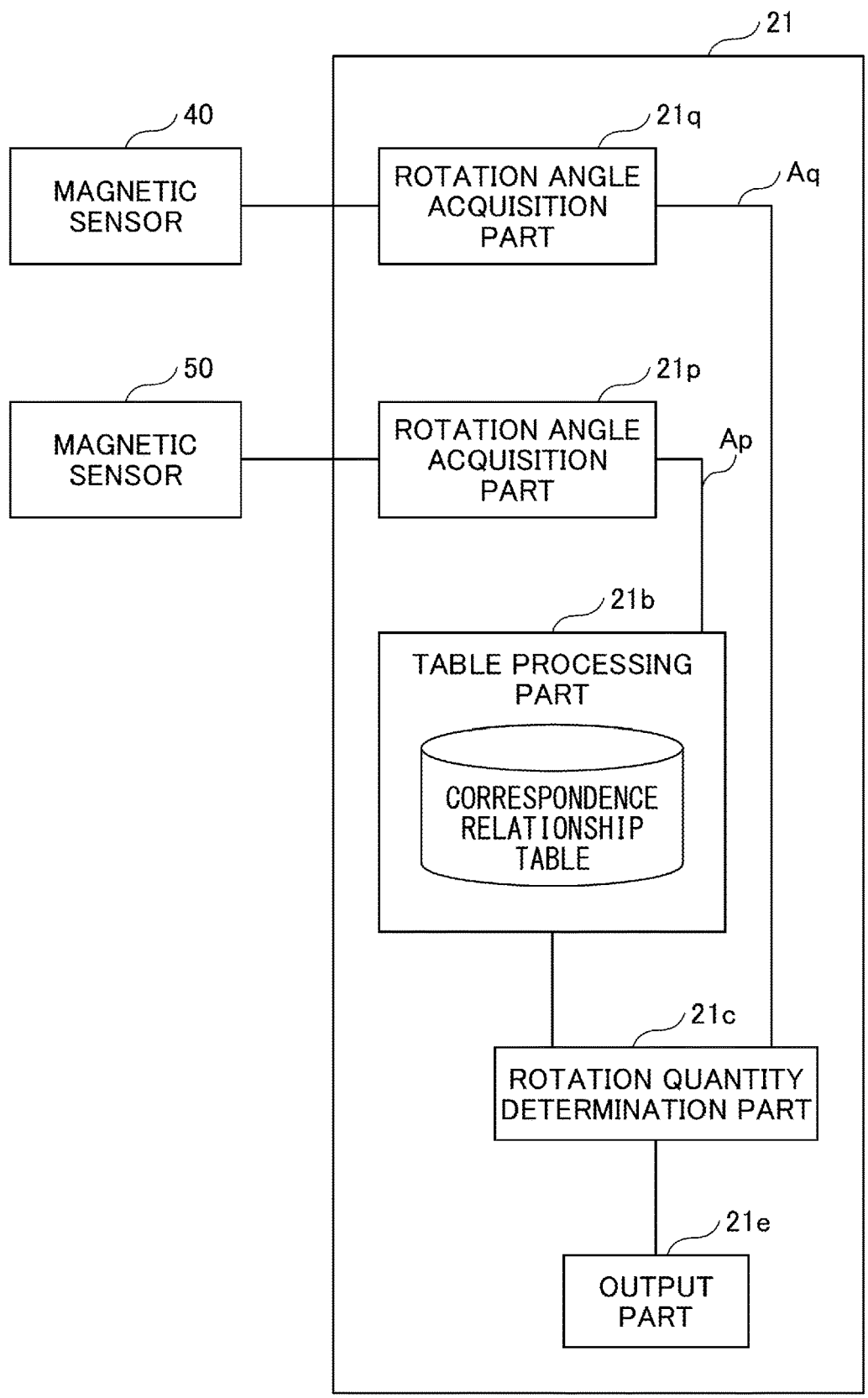
FIG. 30 is a diagram illustrating a functional configuration of a microcomputer 21 provided in the absolute encoder 100-2 according to the embodiment 2 of the present invention.

FIG. 30 is a diagram illustrating a functional configuration of the microcomputer 21 provided by the absolute encoder 100-2 according to the embodiment 2 of the present invention. Each block of the microcomputer 21 illustrated in FIG. 30 represents a function (facility) which is achieved when the CPU forming the microcomputer 21 executes a program.

The microcomputer 21 includes a rotation angle acquisition part 21p, a rotation angle acquisition part 21q, a table processing part 21b, a rotation quantity determination part 21c, and an output part 21e. The rotation angle acquisition part 21q acquires the rotation angle Aq of the spindle gear 1, based on the signal output from the magnetic sensor 40. The rotation angle Aq is the angle information indicating the rotation angle of the spindle gear 1. The rotation angle acquisition part 21p acquires the rotation angle Ap of the layshaft gear 5, based on the signal output from the magnetic sensor 50. The rotation angle Ap is the angle information indicating the rotation angle of the layshaft gear 5. The table processing part 21b determines the rotation speed of the spindle gear 1 corresponding to the acquired rotation angle Ap, by referring to a correspondence relationship table which stores the rotation angle Ap and the rotation speed of the spindle gear 1 corresponding to the rotation angle Ap. The rotation quantity determination part 21c determines a rotation quantity over multiple revolutions of the spindle gear 1, according to the rotation speed of the spindle gear 1 determined by the table processing part 21b, and the acquired rotation angle Aq. The output part 21e converts the rotation quantity over the multiple revolutions of the spindle gear 1 determined by the rotation quantity determination part 21c into information indicating the rotation quantity, and outputs the converted information.

As described above, in the absolute encoder 100-2 according to the embodiment 2, because the layshaft gear 5 is provided on the side of the intermediate gear 2 opposite to the spindle gear 1, as illustrated in FIG. 14 or the like, the generation of magnetic interference which affects the magnetic sensor not corresponding to each of the permanent magnet 8 and the permanent magnet 9 can be reduced. Thus, the size of the absolute encoder 100-2 in the plan view can be made relatively small, by employing the configuration which can reduce the generation of the magnetic interference. Accordingly, it is possible to prevent the detection accuracy of the magnetic flux by the magnetic sensor 40 and the magnetic sensor 50 from deteriorating, while reducing the size of the absolute encoder 100-2.

Moreover, in the absolute encoder 100-2 according to the embodiment 2, the intermediate gear 2 arranged parallel to the top surface of the main base 10 extends obliquely with respect to the four sides of the main base 10, and further, the spindle gear 1 and the layshaft gear 5 are respectively provided on the opposite side with respect to the intermediate gear 2. Thus, of the entire region of the top surface of the main base 10, the spindle gear 1, the intermediate gear 2, and the layshaft gear 5 can be arranged in a small portion, thereby reducing the size of the absolute encoder 100-2 with respect to the horizontal direction.

In addition, in the absolute encoder 100-2 according to the embodiment 2, the outer diameter of the worm wheel portion 2a and the outer diameter of the worm gear portion 2b are set to a small value within a range possible. Hence, the size of the absolute encoder 100-2 in the Z-axis direction (height direction) can be made small.

As described above, according to the absolute encoder 100-2 of the embodiment 2, it is possible to obtain an effect in that the size in the Z-axis direction and the size in the direction perpendicular to the Z-axis direction can be reduced, while preventing the detection accuracy of the rotation quantity of the spindle gear 1 from deteriorating.

Further, in the absolute encoder 100-2 according to the embodiment 2, although the intermediate gear 2 is supported, that is, rotatably supported, by the shaft 4 which is fixed or inserted to the wall 80 and the wall section 72, the supporting method of the intermediate gear 2 is not limited thereto as long as the intermediate gear 2 can be rotatably supported.

For example, the absolute encoder 100-2 is configured so that the one end 4a of the shaft 4 is inserted into the hole 10a formed in the wall section 72, and the other end 4b of the shaft 4 is press fit into the hole 10b formed in the wall 80. The absolute encoder 100-2 may be configured so that the outer ring 3a of the bearing 3 is press fit to the press-fitting portion 2d formed on the intermediate gear 2, and the shaft 4 is press fit to the inner ring 3b of the bearing 3. In this case, it is possible to restrict the movement of the intermediate gear 2, which is fixed to the shaft 4, in the axial direction Td. Even when the absolute encoder 100-2 is configured as described above, the intermediate gear 2 is rotatably supported on the shaft 4. Furthermore, the wall section 72 and wall 80 restrict the movement of the shaft 4 in the axial direction Td, and the inner ring 3b of the bearing 3 which is fixed to the shaft 4 restricts the movement of the intermediate gear 2 in the axial direction. Accordingly, the leaf spring 11 may be omitted.

Alternatively, the absolute encoder 100-2 may be configured so that the shaft 4 is rotatably supported by a bearing, which is not illustrated and is provided on at least one of the wall section 72 and the wall 80, for example, in a state in which the intermediate gear 2 is fixed to the shaft 4, without using the bearing 3 illustrated in FIG. 15.

When an outer ring of the bearing, which is not illustrated, is fixed to the wall section 72 or the wall 80, and the one end 4a or the other end 4b of the shaft 4 is inserted into an inner ring, the shaft 4 can rotate unitarily with the intermediate gear 2, because the intermediate gear 2 is fixed to the shaft 4 and the shaft 4 is rotatably supported on the bearing which is not illustrated. In this case, the shaft 4 is not fixed to the inner ring of the bearing, and merely inserted into the inner ring, so that the shaft 4 can move in the axial direction Td together with the intermediate gear 2. For this reason, the leaf spring 11, which restricts the position of the intermediate gear 2 by urging the intermediate gear 2 in the axial direction Td, is required.

Alternatively, the outer ring of the bearing, which is not illustrated, may be fixed to the wall section 72 or the wall 80, and the one end 4a or the other end 4b of the shaft 4 may be press fit into the inner ring, which is not illustrated. In this state, the movement of the intermediate gear 2 fixed to the shaft 4 in the axial direction Td is restricted. For this reason, not only is the intermediate gear 2 fixed to the shaft 4 rotatably supported by the bearing, which is not illustrated, but the movement of the shaft 4 in the axial direction Td is also restricted, thereby restricting the movement of the intermediate gear 2 in the axial direction Td. Accordingly, the leaf spring 11 may be omitted.

As illustrated in FIG. 17, the magnetic sensor 40 detects the change in the magnetic flux from the permanent magnet 9 which rotates together with the spindle gear 1, and detects and determines the rotation angle of the spindle gear 1. As illustrated in FIG. 18, the magnetic sensor 50 detects the change in the magnetic flux of the permanent magnet 8 which rotates together with the layshaft gear 5, and detects and determines the rotation angle of the layshaft gear 5. The absolute encoder 100-2 of the embodiment 2 can reduce the effects of the magnetic flux from the permanent magnet 8 on the magnetic sensor 40 by employing the configuration which reduces the generation of the magnetic interference as described above. In addition, the effects of the magnetic flux from the permanent magnet 9 on the magnetic sensor 50 can be reduced. In other words, it is possible to prevent the rotation accuracy from deteriorating due to the magnetic interference between the spindle gear 1 and the layshaft gear 5.

As illustrated in FIG. 10, the absolute encoder 100-2 is attached to the motor 200, but the motor 200 includes a permanent magnet and a driving coil therein. Accordingly, the motor 200 generates a magnetic flux even when the motor shaft 201 is not rotating. Further, when a driving signal is supplied to the motor 200 from the outside to rotate the motor shaft 201, the generated magnetic flux increases further. The magnetic flux generated by the motor 200 may adversely affect the magnetic sensor 40 and the magnetic sensor 50 provided inside the absolute encoder 100-2, resulting in reduced detection accuracy. When there is an influence of unwanted magnetic flux from the motor 200, the influence of magnetic flux from the motor 200 can be reduced if the main base 10 is formed of a ferromagnetic material, such as iron.

Figure 31:
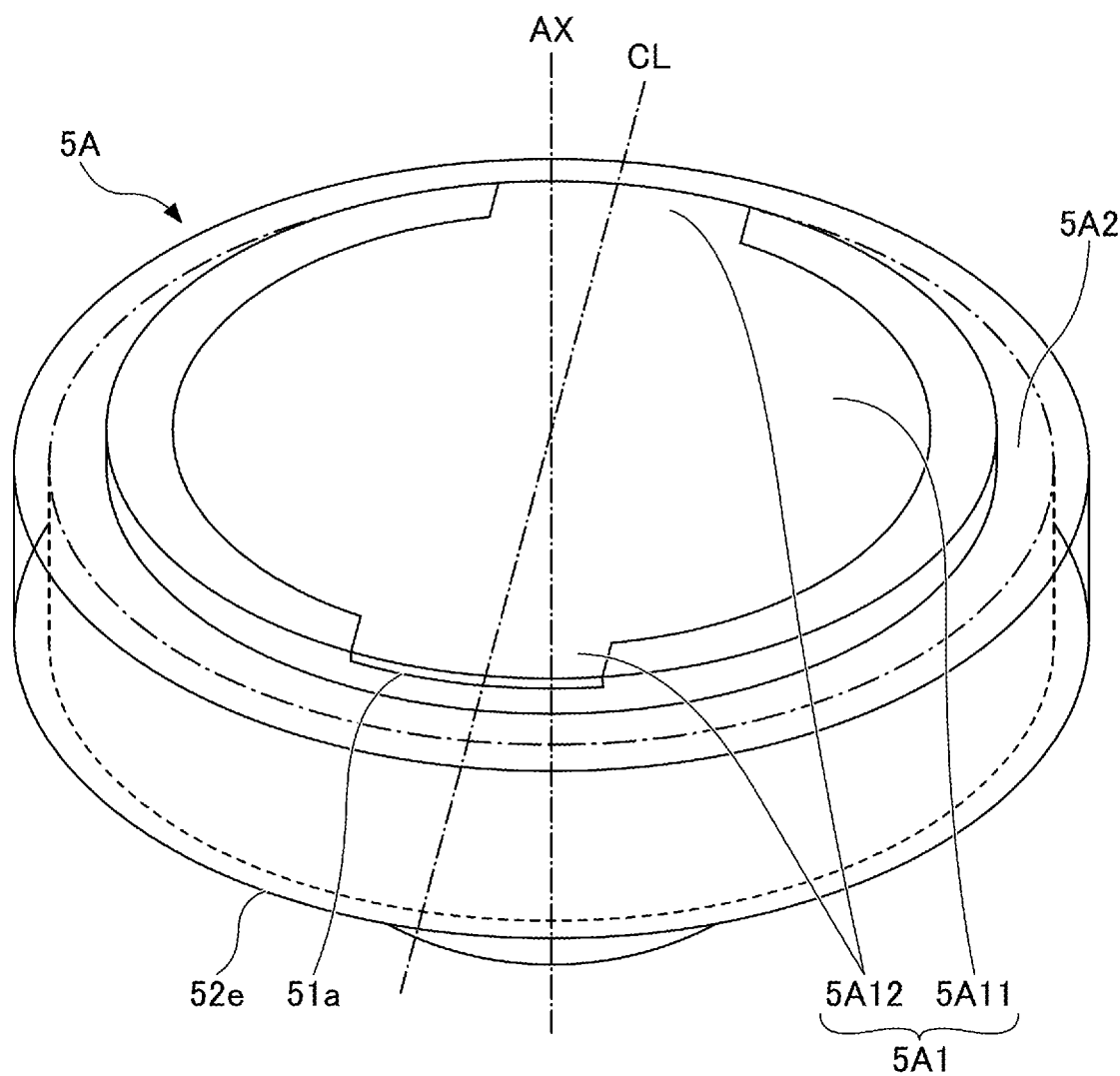
FIG. 31 is a perspective view of a layshaft gear 5A included in an absolute encoder 100-2 according to a first modification of the embodiment 2.
Figure 32:
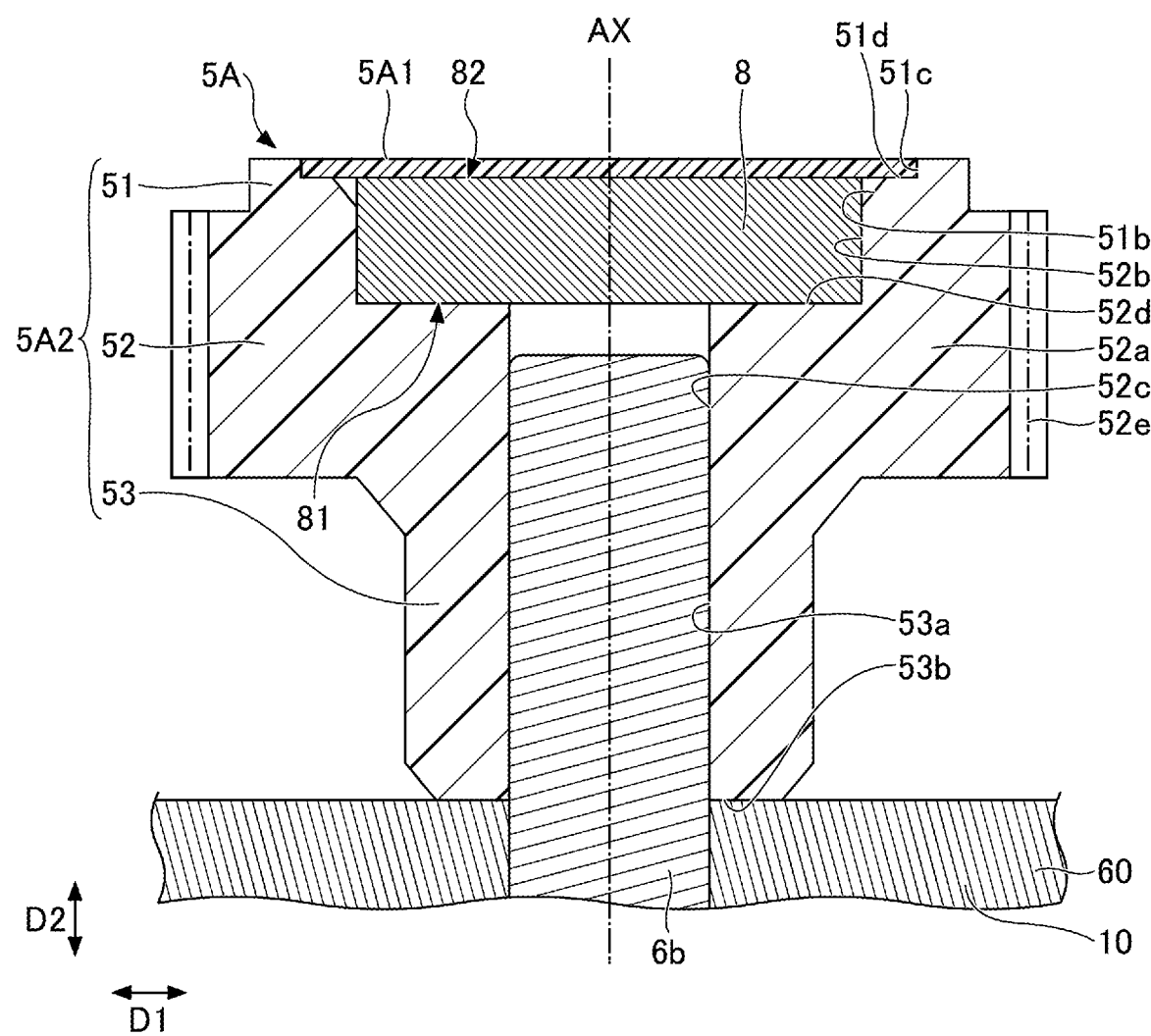
FIG. 32 is a cross sectional view of the layshaft gear 5A illustrated in FIG. 31.

FIG. 31 is a perspective view of a layshaft gear 5A included in an absolute encoder 100-2 according to a first modification of the embodiment 2. FIG. 32 is a cross sectional view of the layshaft gear 5A illustrated in FIG. 31. The layshaft gear 5A is a cylindrical member in which a worm wheel portion 52e, which is a second driven gear, is formed. The worm wheel portion 52e corresponds to the worm wheel portion 5a described above and is a second driven gear. The layshaft gear 5A includes a resin sheet 5A1 and a resin gear portion 5A2. The resin sheet 5A1 and the resin gear portion 5A2 are formed of, for example, a polyacetal resin. The resin gear portion 5A2 is an annular portion that surrounds the outer peripheral surface of the permanent magnet 8.

The resin sheet 5A1 is a plate shaped member that closes the opening formed in the resin gear portion 5A2 so as to face the axial end surface of the permanent magnet 8. The resin sheet 5A1 includes a circular plate shaped lid 5A11 that closes the opening and a pair of brim portions 5A12 that are provided at the outer peripheral portion of the lid 5A11. The brim portions 5A12 are provided on the secant line CL at the outer peripheral portion of the lid 5A11. The secant line CL is a line that is orthogonal to the center axis AX of the layshaft gear 5A and crosses with two points on the outer peripheral portion of the lid 5A11. In the following, the center axis AX may simply be referred to as the center axis. Each of the pair of brim portions 5A12 is a protrusion radially extending from the outer peripheral portion the lid 5A11 toward the center axis. The radial direction is a direction that is illustrated in FIG. 32 with the arrow D1.

The resin gear portion 5A2 is a cylindrical member in which a cavity is formed inside in the radial direction. The cavity formed inside in the radial direction is a space surrounded by the inner peripheral surface of the resin gear portion 5A2 which varies stepwise in the center axis direction. The center axis direction is illustrated in FIG. 32 by the arrow D2 and may be referred to as the axial direction.

The resin gear portion 5A2 includes a first annular portion 51, a second annular portion 52, and a third annular portion 53 that are coaxially disposed with the shaft portion 6b. The first annular portion 51, the second annular portion 52, and the third annular portion 53 are arranged, in the axial direction, in the order of the first annular portion 51, the second annular portion 52, and the third annular portion 53.

The first annular portion 51 includes a groove 51a into which each of the pair of brim portions 5A12 is fitted and a first inner peripheral surface 51b of a first inner diameter facing the outer peripheral surface of the permanent magnet 8. The first annular portion 51 includes a second inner peripheral surface 51c facing the outer peripheral surface of the resin sheet 5A1 and having a second inner diameter larger than the first inner diameter and a first stepped portion 51d disposed at a boundary portion between the first inner peripheral surface 51b and the second inner peripheral surface 51c. The groove 51a is a portion formed so that a portion of the axial end surface of the first annular portion 51 protrudes from the first annular portion 51 toward the second annular portion 52. The groove 51a is a portion formed so that a portion of the axial end surface of the first annular portion 51 is recessed from the first annular portion 51 toward the second annular portion 52. The first annular portion 51 is provided with the two grooves 51a. It should be noted that the number of the grooves 51a and brim portions 5A12 is not limited to two, but may be three or more. The first inner peripheral surface 51b is an inclined surface inclined with respect to the center axis and is formed so that the first inner diameter is narrowed from the first annular portion 51 toward the second annular portion 52. By providing the first inner peripheral surface 51b that is inclined in this way, when the permanent magnet is attached to the space surrounded by a third inner peripheral surface 52b of the second annular portion 52, the permanent magnet 8 is less likely to be caught on the first stepped portion 51d, and the permanent magnet 8 can be easily attached. The second inner peripheral surface 51c is in contact with the outer peripheral surface of the resin sheet 5A1. The axial end surface of the resin sheet 5A1 is in contact with the first stepped portion 51d.

The second annular portion 52 includes a cylindrical portion 52a which is coaxial with the shaft portion 6b and the third inner peripheral surface 52b having a third inner diameter so as to face the outer peripheral surface of the permanent magnet 8. The second annular portion 52 includes a fourth inner peripheral surface 52c facing the outer peripheral surface of the shaft portion 6b and having a fourth inner diameter smaller than the third inner diameter, a second stepped portion 52d disposed at the boundary between the third inner peripheral surface 52b and the fourth inner peripheral surface 52c, and a worm wheel portion 52e that is a gear portion of the layshaft gear 5A disposed at the radially outer side of the cylindrical portion 52a.

It is preferable that the height from the resin sheet 5A1 to the second stepped portion 52d be less than or equal to the height in the axial direction of the permanent magnet 8. With such a configuration, the permanent magnet 8 can be sandwiched between the second stepped portion 52d and the resin sheet 5A1. When the permanent magnet 8 is sandwiched between the second stepped portion 52d and the resin sheet 5A1, the first end surface 81 in the axial direction of the permanent magnet 8 is in contact with the second stepped portion 52d, and the second end surface 82 opposite to the first end surface 81 of the permanent magnet 8 in the axial direction is in contact with the end surface of the resin sheet 5A1 in the axial direction.

A gap is provided between the third inner peripheral surface 52b of the second annular portion 52 and the outer peripheral surface of the permanent magnet 8. This gap is preferably set so that, when the permanent magnet 8 is attached to the space surrounded by the third inner peripheral surface 52b of the resin gear portion 5A2, the angle error by the magnetic sensor 50 with respect to the change in the center offset value is equal to or less than a defined value. The center offset value is equal to the deviation from the center of the magnetic flux detection region of the magnetic sensor 50 to the radial center of the permanent magnet 8 when viewing the permanent magnet 8 from the axial direction. The error is equal to the angle difference between the actual rotation angle of the rotation angle of the layshaft gear 5A and the rotation angle detected by the magnetic sensor 50. Since it is not necessary to press-fit the permanent magnet 8, the operation of attaching the permanent magnet 8 to the layshaft gear 5A is facilitated, and cracking of the permanent magnet 8 due to press-fitting into the resin gear portion 5A2 is suppressed. Even with such a configuration, since the resin sheet 5A1 functions as a coming-out preventing member for the permanent magnet 8, the permanent magnet 8 is not detached from the resin gear portion 5A2 during the operation of the absolute encoder 100-2.

The third annular portion 53 is provided with a fifth inner peripheral surface 53a facing the outer peripheral surface of the shaft portion 6b and having an inner diameter equal to the fourth inner diameter. The third annular portion 53 also has an end surface 53b in contact with the base portion 60 of the main base 10.

The shaft portion 6b is fixed to the base portion 60 of the main base 10 by caulking or press fitting, and the layshaft gear 5A is rotatably supported to the shaft portion 6b.

Next, the permanent magnet 8 is attached to the space surrounded by the third inner peripheral surface 52b of the resin gear portion 5A2. After the permanent magnet 8 is attached, the resin sheet 5A1 is mounted on the first stepped portion 51d of the resin gear portion 5A2 so as to cover the permanent magnet 8. At this time, the brim portions 5A12 of the resin sheet 5A1 are fitted into the grooves 51a. Thereafter, the surfaces of the resin sheet 5A1 and the first annular portion 51 facing each other are welded by, for example, laser welding or heat welding because they are each made of a resin material and the strength may be insufficient by adhesion with an adhesive. Accordingly, the resin sheet 5A1 fixed to the resin gear portion 5A2 functions as a coming-out preventing member for the permanent magnet 8. When the permanent magnet 8 is fixed by press-fitting to the resin gear portion 5A2, the frictional force between the outer peripheral surface of the permanent magnet 8 and the resin gear portion 5A2 is reduced depending on a manufacturing error of the permanent magnet 8 or the like, and the force of holding the permanent magnet 8 by the resin gear portion 5A2 is not sufficiently obtained. On the other hand, in the absolute encoder 100-2 according to the first modification, the resin sheet 5A1 functions as a coming-out preventing member for the permanent magnet 8, and therefore the permanent magnet 8 can be fixed to the layshaft gear 5A without applying an adhesive to the layshaft gear 5A even when the force of holding the permanent magnet 8 by the resin gear portion 5A2 is not sufficiently obtained.

In addition, since the resin sheet 5A1 functions as a coming-out preventing member for the permanent magnet 8, it is not necessary to press-fit the permanent magnet 8 into the resin gear portion 5A2. Therefore, cracking of the permanent magnet 8 due to press fit into the resin gear portion 5A2 can be suppressed.

Figure 33:
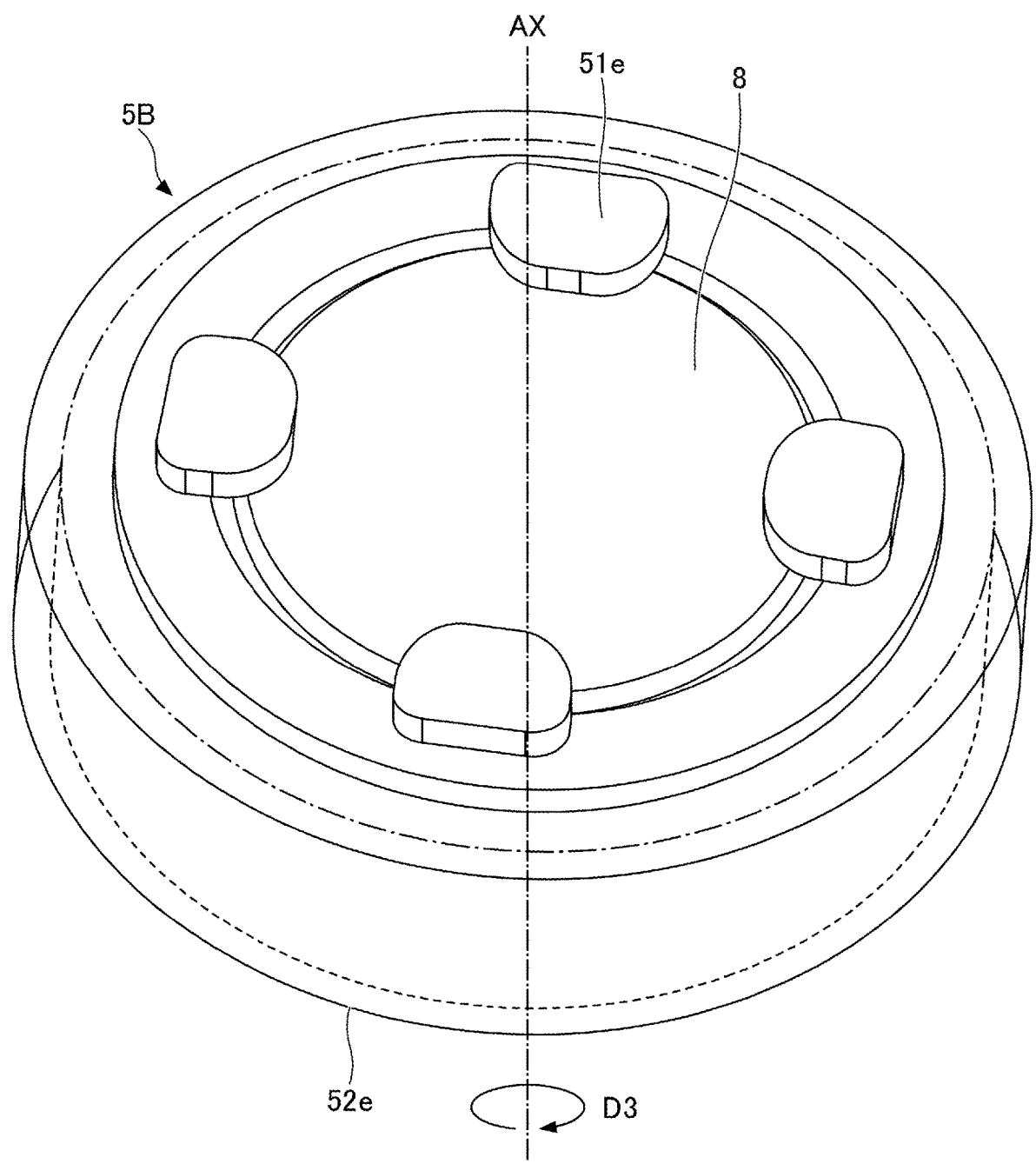
FIG. 33 is a perspective view of a layshaft gear 5B included in an absolute encoder 100-2 according to a second modification of the embodiment 2.
Figure 34:
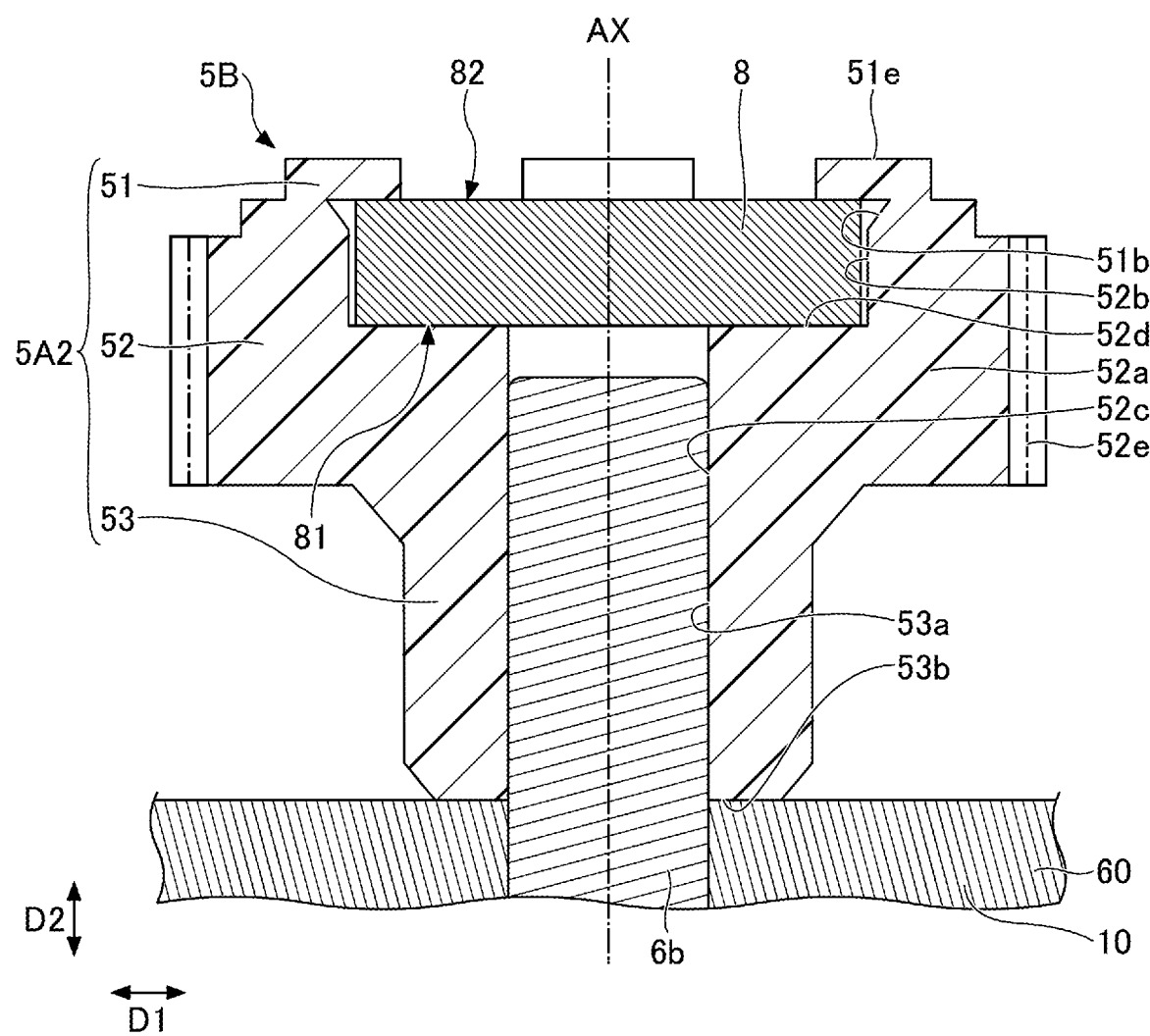
FIG. 34 is a cross sectional view of the layshaft gear 5B illustrated in FIG. 33.

FIG. 33 is a perspective view of a layshaft gear 5B included in an absolute encoder 100-2 according to the second modification of the embodiment 2. FIG. 34 is a cross sectional view of the layshaft gear 5B illustrated in FIG. 33. A plurality of protrusions 51e are provided on the resin gear portion 5A2 of the layshaft gear 5B. The protrusions 51e are protruding members extending from the resin gear portion 5A2, which is an annular portion, toward the radial center of the resin gear portion 5A2 so as to face the end surface of the permanent magnet 8 in the axial direction. In the absolute encoder 100-2 according to the second modification, the description of portions having the same configuration as the first modification is omitted by attaching the same reference numerals.

Each of the plurality of protrusions 51e is provided integrally with the first annular portion 51. The four protrusions 51e are illustrated in FIG. 33. The four protrusions 51e are arranged to be away from each other along the rotational direction so that the distances between the protrusions 51e adjacent to each other in the rotational direction of the resin gear portion 5A2 are equal. The direction of rotation is illustrated by the arrow D3 in FIG. 33, which is equal to the direction in which the layshaft gear 5B rotates. The number of protrusions 51e is not limited to four, as long as the permanent magnet 8 provided in the resin gear portion 5A2 can be prevented from coming out from the resin gear portion 5A2, and may be less than four or may exceed four.

It is preferable that the height of the protrusions 51e from the surface facing the permanent magnet 8 to the second stepped portion 52d is less than or equal to the height of the permanent magnet 8 in the axial direction. Thus, the permanent magnet 8 can be sandwiched between the second stepped portion 52d and the protrusions 51e. When the permanent magnet 8 is sandwiched between the second stepped portion 52d and the protrusions 51e, the first end surface 81 of the permanent magnet 8 is in contact with the second stepped portion 52d, and the second end surface 82 of the permanent magnet 8 is in contact with the surfaces of the protrusions 51e facing the permanent magnet 8.

At the layshaft gear 5B, for example, a protruding member extending in the axial direction from the first annular portion 51 is pressed and deformed by a caulking arrow or the like to form a protrusion 51e as illustrated in FIG. 33 and FIG. 34. That is, the protrusions 51e extending from the first annular portion 51 in the radial direction are formed. Further, each protrusion 51e pressed by a caulking arrow or the like is pressed against the second end surface 82 of the permanent magnet 8, thereby functioning as a coming-out preventing member for the permanent magnet 8. Accordingly, in the absolute encoder 100-2 according to the second modification, the permanent magnet 8 can be fixed without applying an adhesive to the layshaft gear 5B as in the first modification.

Further, in the absolute encoder 100-2 according to the second modification, a member such as the resin sheet 5A1 illustrated in FIG. 32 is not required. Therefore, in comparison to a case where the resin sheet 5A1 and the resin gear portion 5A2 are individually manufactured and then they are combined, the manufacturing of a plurality of components constituting the layshaft gear 5B is simplified, and the assembly time of the layshaft gear 5B is further reduced.

Figure 35:
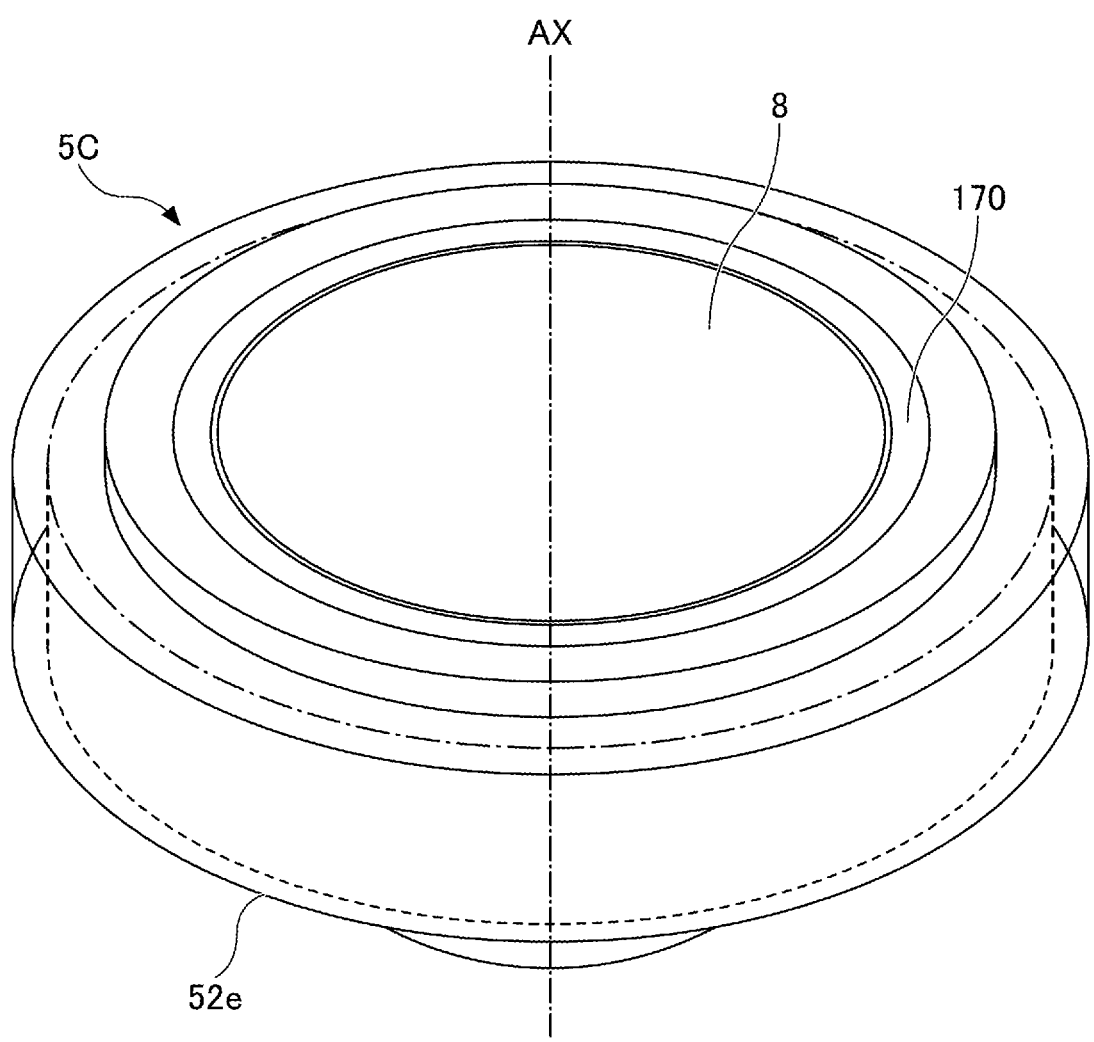
FIG. 35 is a perspective view of a layshaft gear 5C included in an absolute encoder 100-2 according to a third modification of the embodiment 2.
Figure 36:
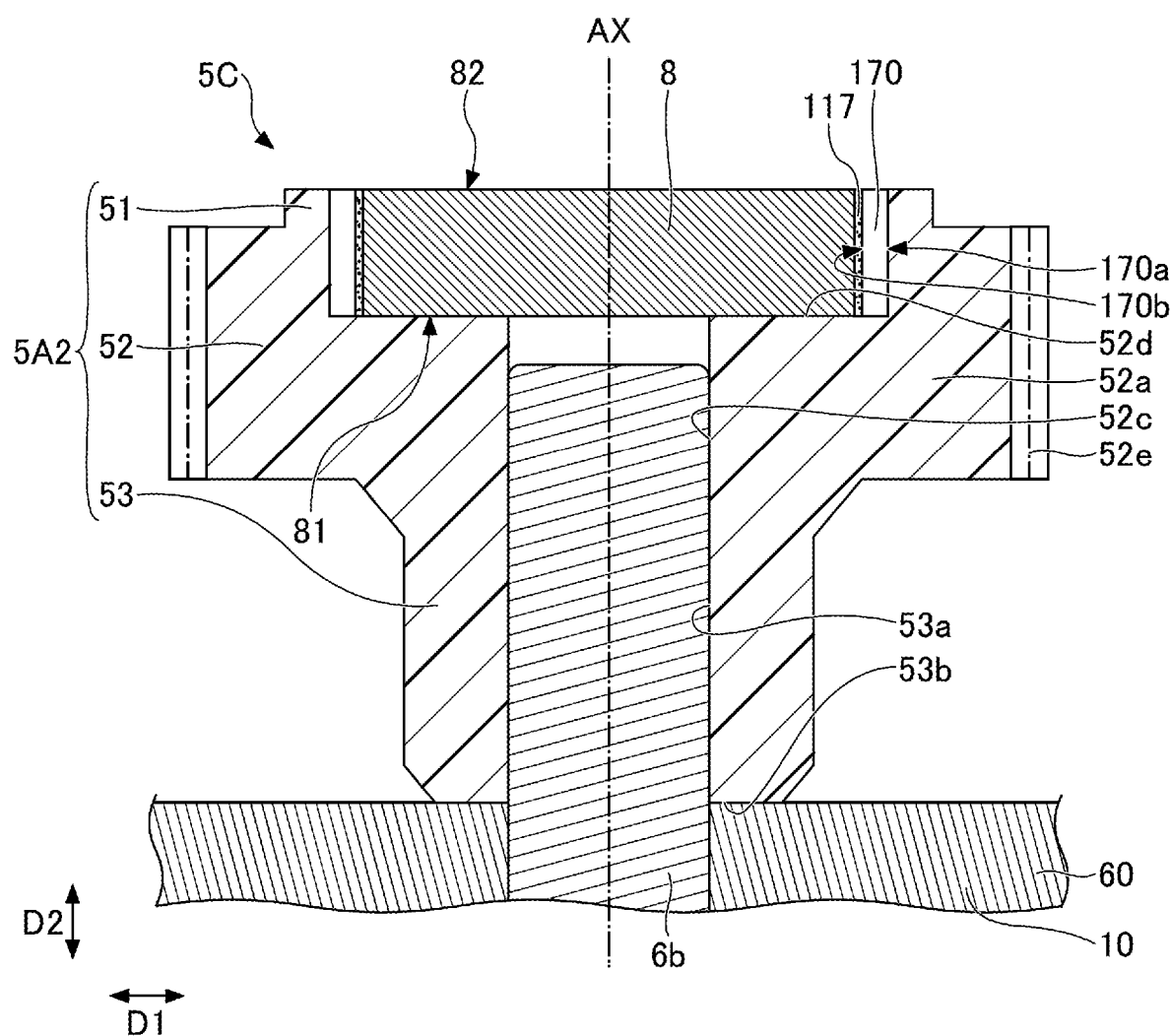
FIG. 36 is a cross sectional view of the layshaft gear 5C illustrated in FIG. 35.

FIG. 35 is a perspective view of a layshaft gear 5C included in an absolute encoder 100-2 according to a third modification of the embodiment 2. FIG. 36 is a cross sectional view of the layshaft gear 5C illustrated in FIG. 35. In the resin gear portion 5A2 of the layshaft gear 50, an intermediate cylindrical portion 170 is used instead of the resin sheet 5A1 illustrated in FIG. 31 and FIG. 32. In the absolute encoder 100-2 according to the third modification, the description of portions having the same configuration as the first modification is omitted by attaching the same reference numerals.

The intermediate cylindrical portion 170 is a member formed in a cylindrical shape using a non-magnetic metal material such as aluminum or copper. The intermediate cylindrical portion 170 is an annular cylindrical portion provided between the inner peripheral surface of the resin gear portion 5A2 and the outer peripheral surface of the permanent magnet 8. The intermediate cylindrical portion 170 is incorporated inside the first annular portion 51 and the second annular portion 52 of the resin gear portion 5A2, for example by insert molding or press fitting. Accordingly, the outer peripheral surface 170a of the intermediate cylindrical portion 170 is fixed to the resin gear portion 5A2.

The permanent magnet 8 is provided in the space surrounded by the inner peripheral surface 170b of the intermediate cylindrical portion 170. There is a gap between the outer diameter of the permanent magnet 8 and the inner diameter of the intermediate cylindrical portion 170, and this gap is preferably such that, when attaching the permanent magnet 8 to the space surrounded by the inner peripheral surface 170b of the intermediate cylindrical portion 170, the angular error by the magnetic sensor 50 with respect to the change in the center offset value is less than or equal to a defined value.

Between the inner peripheral surface 170b of the intermediate cylindrical portion 170 and the permanent magnet 8, an adhesive 117 is provided for fixing the permanent magnet 8 to the intermediate cylindrical portion 170. The adhesive 117 may be one capable of bonding the permanent magnet 8 to the intermediate cylindrical portion 170 and may be, for example, an epoxy-based adhesive, an acrylic-based adhesive, or the like. In the absolute encoder 100-2 of the third modification, the adhesive 117 can be used to fix the permanent magnet 8 to the inner peripheral surface 170b of the intermediate cylindrical portion 170 made of metal. That is, the intermediate cylindrical portion 170 and the adhesive function as a coming-out preventing member for the permanent magnet 8, and the permanent magnet 8 is fixed to the layshaft gear 5C.

In the absolute encoder 100-2 according to the third modification, the intermediate cylindrical portion 170 is incorporated into the resin gear portion 5A2 by insert molding or press fitting. Therefore, the assembly operation of the permanent magnet 8 is simplified and the assembly time of the layshaft gear 5C is shortened compared to a case where the resin sheet 5A1 illustrated in FIG. 32 is combined with the resin gear portion 5A2.

Figure 37:
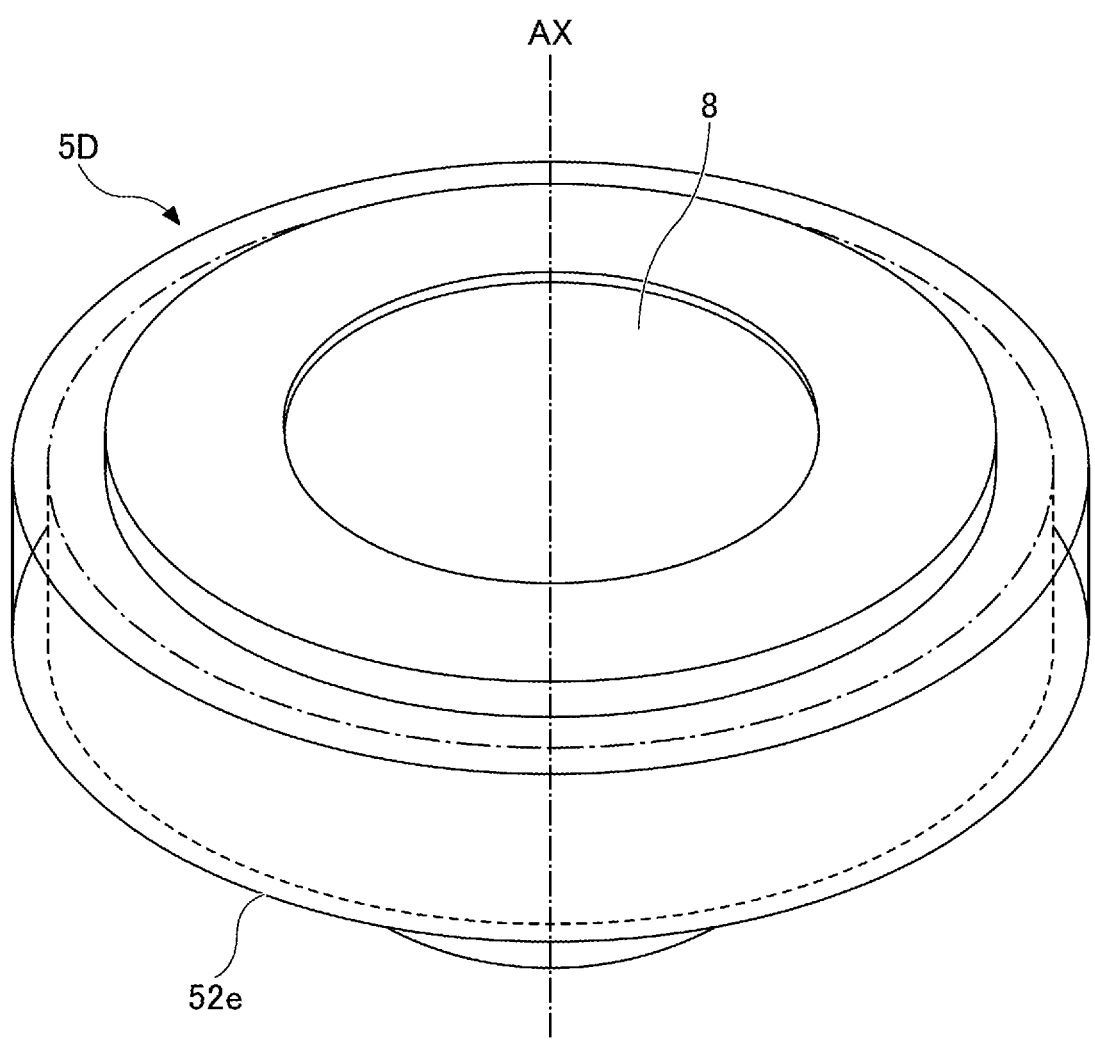
FIG. 37 is a perspective view of a layshaft gear 5D included in an absolute encoder 100-2 according to a fourth modification of the embodiment 2.
Figure 38:
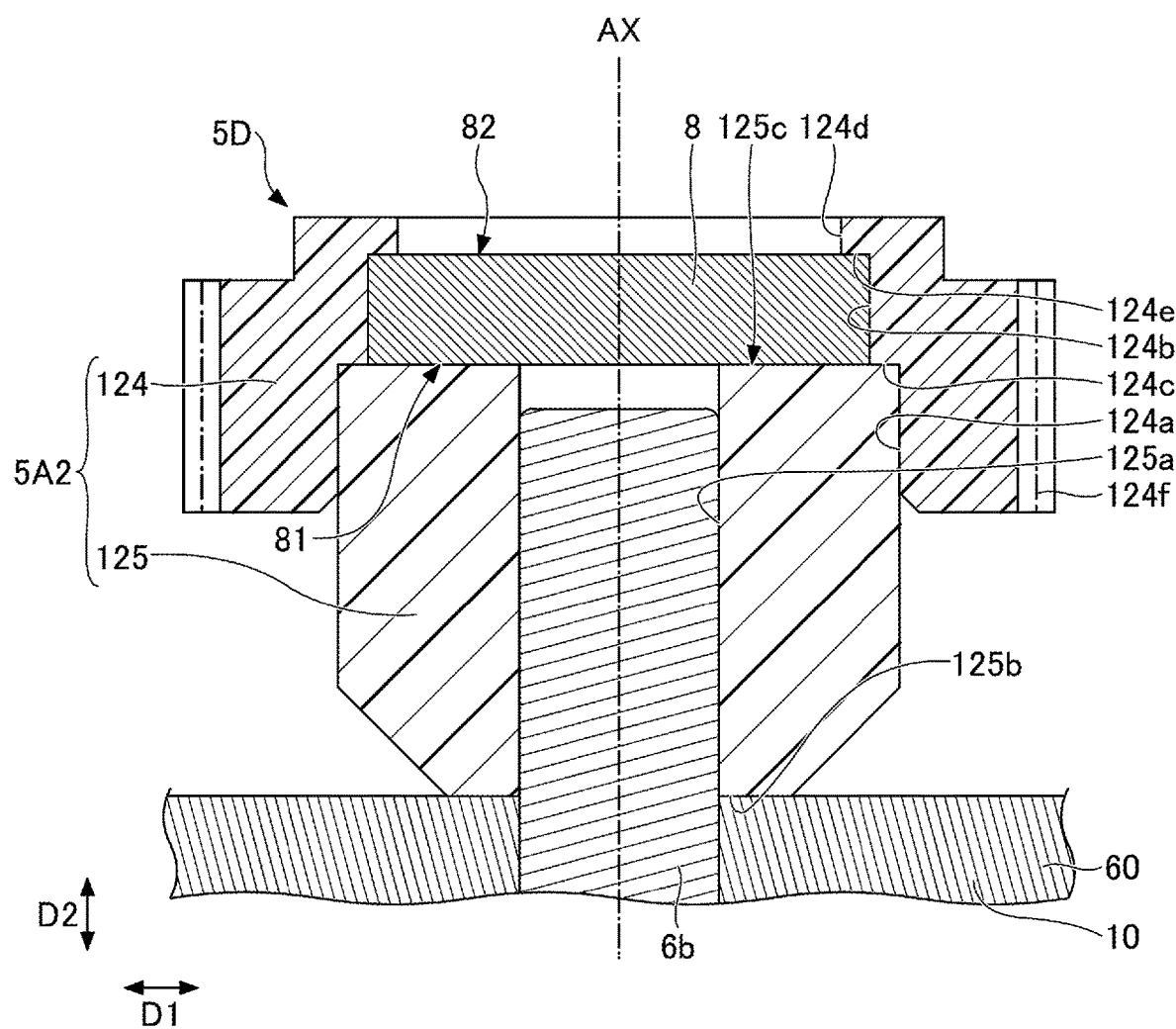
FIG. 38 is a cross sectional view of the layshaft gear 5D illustrated in FIG. 37.

FIG. 37 is a perspective view of a layshaft gear 5D included in an absolute encoder 100-2 according to a fourth modification of the embodiment 2. FIG. 38 is a cross sectional view of the layshaft gear 5D illustrated in FIG. 37. The resin gear portion 5A2 of the layshaft gear 5D includes an annular portion 124 and a cylindrical portion 125. The annular portion 124 and the cylindrical portion 125 are formed of, for example, a polyacetal resin. In the absolute encoder 100-2 according to the fourth modification, the description of portions having the same configuration as the first modification is omitted by attaching the same reference numerals.

The annular portion 124 includes a first inner peripheral surface 124a having a first inner diameter and in contact with the outer peripheral surface of the cylindrical portion 125, a second inner peripheral surface 124b having a second inner diameter smaller than the first inner diameter, and a first stepped portion 124c disposed at a boundary between the first inner peripheral surface 124a and the second inner peripheral surface 124b and facing an end portion 125c in the axial direction of the cylindrical portion 125. The annular portion 124 also includes a third inner peripheral surface 124d having a third inner diameter smaller than the second inner diameter. The annular portion 124 includes a second stepped portion 124e provided at the boundary between the second inner peripheral surface 124b and the third inner peripheral surface 124d and facing the second end surface 82 of the permanent magnet 8 and a worm wheel portion 124f that is a gear portion of the layshaft gear 5D disposed at the radially outer side of the annular portion 124. The first inner diameter of the first inner peripheral surface 124a is set to be smaller than the outer diameter of the cylindrical portion 125.

Between the second inner peripheral surface 124b of the annular portion 124 and the outer peripheral surface of the permanent magnet 8, when the permanent magnet 8 is attached to the space surrounded by the second inner peripheral surface 124b of the resin gear portion 5A2, there is a gap such that the angular error by the magnetic sensor 50 with respect to the change in the center offset value is less than or equal to a defined value.

It is preferable that the height of the first stepped portion 124c to the second stepped portion 124e of the annular portion 124 is less than or equal to the height of the permanent magnet 8 in the axial direction. With such a configuration, the permanent magnet 8 can be sandwiched between the second stepped portion 124e and the cylindrical portion 125. When the permanent magnet 8 is sandwiched between the second stepped portion 124e and the cylindrical portion 125, the first end surface 81 of the permanent magnet 8 is in contact with the end portion 125c of the cylindrical Portion 125 and the second end surface 82 of the permanent magnet 8 is in contact with the second stepped portion 124e of the annular portion 124.

When the layshaft gear 5D is attached to the shaft portion 6b, the permanent magnet 8 is first attached in the space surrounded by the second inner peripheral surface 124b of the annular portion 124 and then the cylindrical portion 125 is press-fitted. At this time, the annular portion 124 is pushed in the axial direction the end portion 125c of the cylindrical portion 125 contacts the first stepped portion 124c. This results in the permanent magnet 8 being sandwiched between the annular portion 124 and the cylindrical portion 125.

Thus, in the absolute encoder 100-2 according to the fourth modification, the permanent magnet 8 is sandwiched by the cylindrical portion 125 facing the first end surface 81 of the permanent magnet 8 in the axial direction and by the annular portion 124 facing the second end surface 82 of the permanent magnet 8 and in which the cylindrical portion 125 is fitted. Therefore, in the absolute encoder 100-2 according to the fourth modification, the annular portion 124 and the cylindrical portion 125 function as a coming-out preventing member for the permanent magnet 8. Accordingly, the absolute encoder 100-2 according to the fourth modification enables to fix the permanent magnet 8 to the layshaft gear 5D without applying an adhesive to the layshaft gear 5D. For example, the second stepped portion 124e illustrated in FIG. 38 may be formed by deforming an annular member extending in the axial direction from the annular portion 124 with a caulking arrow or the like, similar to the protrusions 51e illustrated in FIG. 34.

Figure 39:
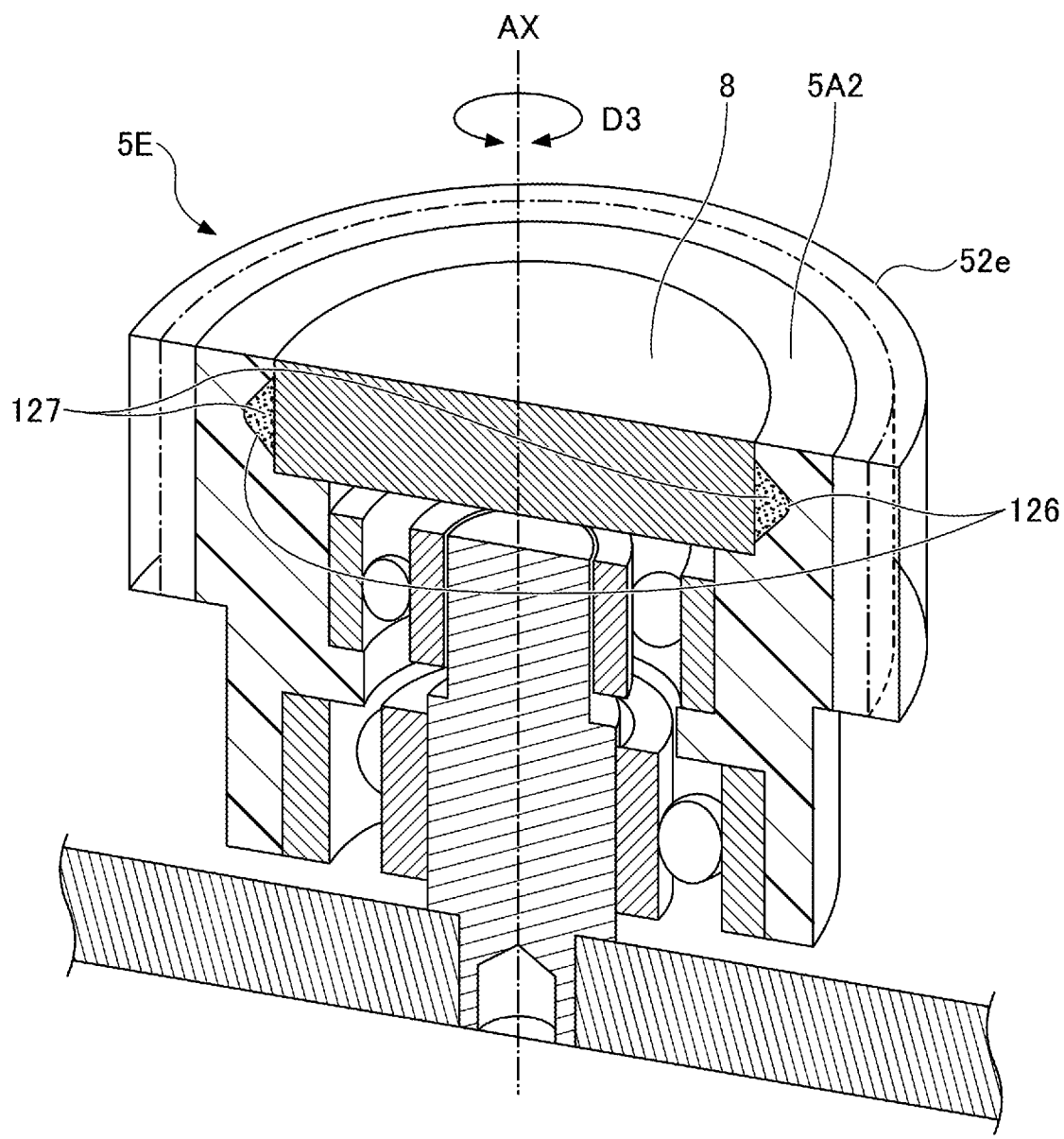
FIG. 39 is a cross sectional perspective view of a layshaft gear 5E included in an absolute encoder 100-2 according to a fifth modification of the embodiment 2.
Figure 40:
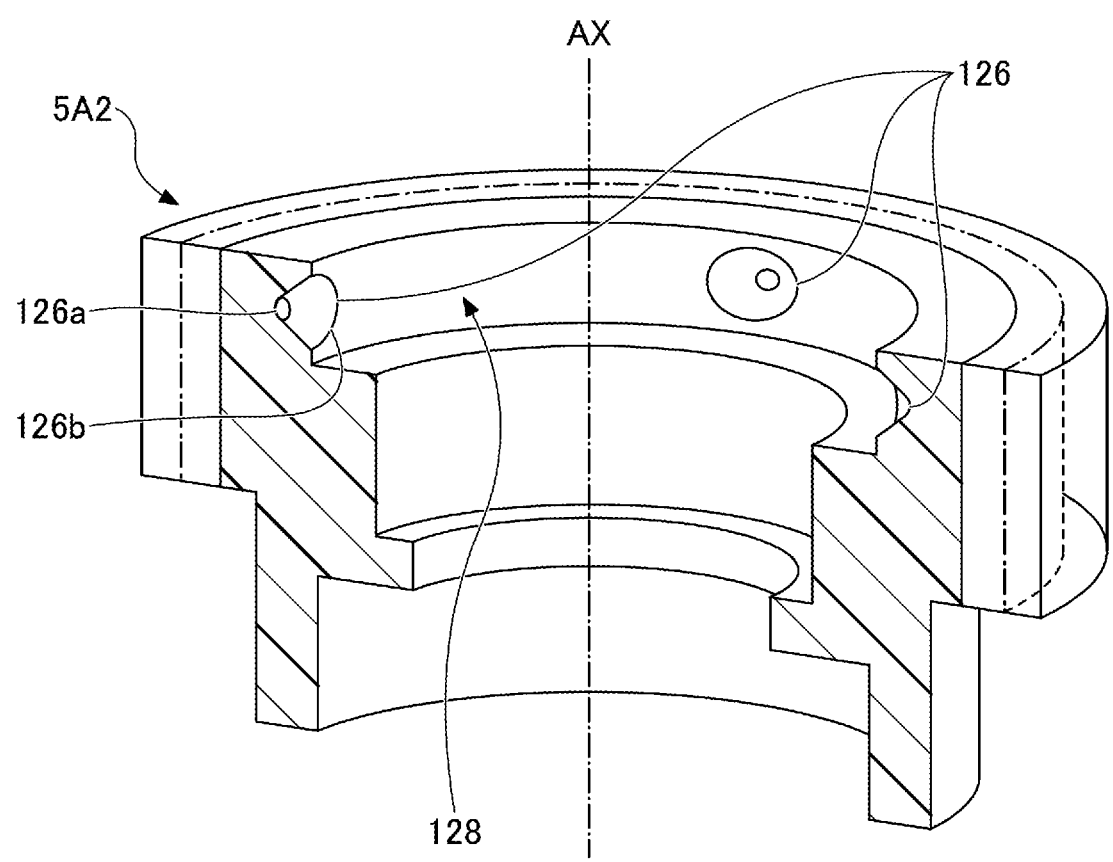
FIG. 40 is a cross sectional perspective view of a resin gear portion included in the layshaft gear 5E illustrated in FIG. 39.

FIG. 39 is a cross sectional perspective view of a layshaft gear 5E included in an absolute encoder 100-2 according to a fifth modification of the embodiment 2. FIG. 40 is a cross sectional perspective view of a resin gear portion 5A2 included in the layshaft gear 5E illustrated in FIG. 39. The inner peripheral surface 128 of the resin gear portion 5A2 is provided with recesses 126 which are depressions for fixing the permanent magnet 8. The recesses 126 are depressions formed to depress radially outward from the center of the resin gear portion 5A2 in the radial direction. The plurality of recesses 126 are provided, for example, along the rotational direction of the resin gear portion 5A2. The plurality of recesses 126 are arranged to be away from each other so that the distances between the recesses 126 adjacent to each other in the rotation direction are equal. An adhesive 127 is provided in each of the plurality of recesses 126. The adhesive 127 is in contact with the outer peripheral surface of the permanent magnet 8. The features of the layshaft gear 5E are that the recesses 126 are provided and that the adhesive 127 is provided in the recesses 126. Therefore, configurations other than these features may be configured in the same manner as the resin gear portion 5A2 illustrated in FIG. 36, for example.

When assembling the layshaft gear 5E, first, each of the plurality of recesses 126 is filled with the adhesive 127. At this time, each recess 126 is filled with the adhesive 127 from the bottom portion 126a of the recess 126 to the boundary portion 126b of the recess 126 with the inner peripheral surface 128 of the resin gear portion 5A2. Next, before the filling adhesive 127 cures, the permanent magnet 8 is attached to the space surrounded by the inner peripheral surface 128 of the resin gear portion 5A2. At this time, the adhesive 127 adheres to the outer peripheral surface of the permanent magnet 8. Thereafter, as the adhesive 127 cures, protrusions that are fitted in the recesses 126 of the resin gear portion 5A2 are formed on the permanent magnet 8. The protrusions each has a shape protruding from the outer peripheral surface of the permanent magnet 8 toward the bottom portion 126a of the recess 126 of the resin gear portion 5A2.

In the absolute encoder 100-2 according to the fifth modification, the recesses 126 formed on the inner peripheral surface 128 of the resin gear portion 5A2 and the adhesive 127 function as a coming-out preventing member for the permanent magnet 8. Thus, since the resin gear portion 5A2 is made of a polyacetal resin, the permanent magnet 8 can be fixed to the layshaft gear 5E even when the adhesive 127 is difficult to adhere to the resin gear portion 5A2.

Further, in the absolute encoder 100-2 according to the fifth modification, a coming-out preventing member such as the resin sheet 5A1 illustrated in FIG. 31, the protrusion 51e illustrated in FIG. 33, the intermediate cylindrical portion 170 illustrated in FIG. 35, or the cylindrical portion 125 illustrated in FIG. 38 is not required, and therefore the manufacturing cost of the absolute encoder 100-2 can be reduced.

Figure 41:
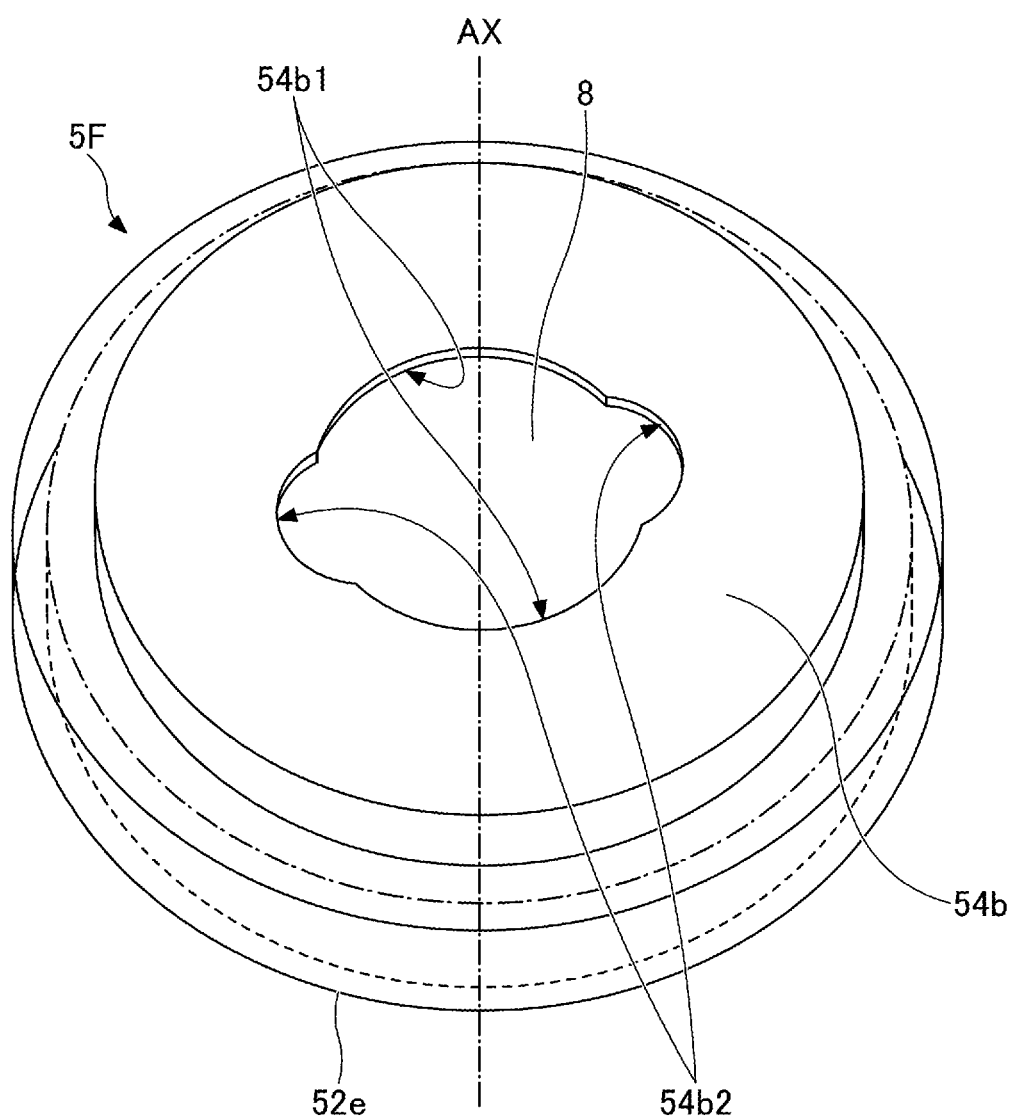
FIG. 41 is a perspective view of a layshaft gear 5F included in an absolute encoder 100-2 according to a sixth modification of the embodiment 2.
Figure 42:
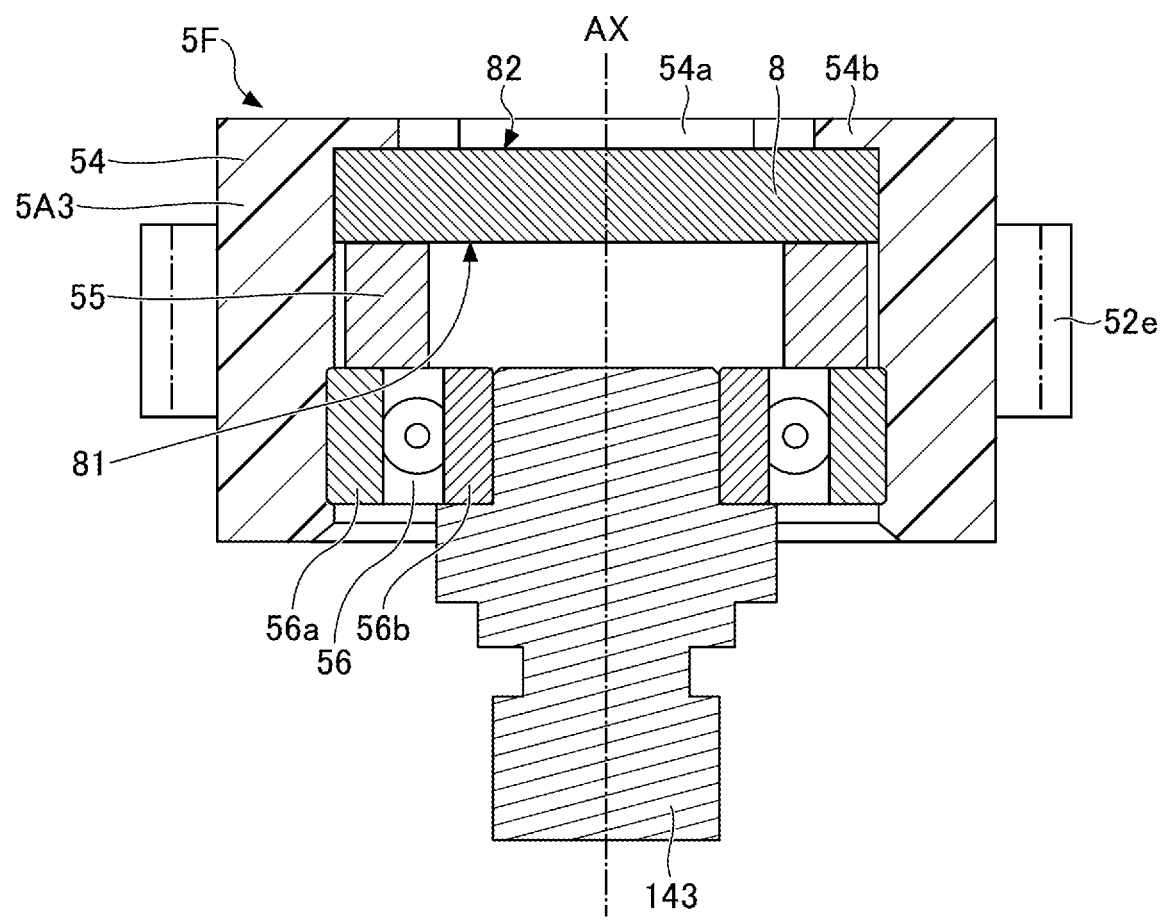
FIG. 42 is a cross sectional view of the layshaft gear 5F illustrated in FIG. 41.

FIG. 41 is a perspective view of a layshaft gear 5F included in an absolute encoder 100-2 according to a sixth modification of the embodiment 2. FIG. 42 is a cross sectional view of the layshaft gear 5F illustrated in FIG. 41. A resin gear portion 5A3 of the layshaft gear 5F includes a bowl-shaped annular portion 54 having a top portion 54b at which an opening 54a is formed, a ring-shaped cylinder 55, and a bearing 56. The cylinder 55 is a first annular portion facing the first end surface 81 of the permanent magnet 8 in the axial direction. The annular portion 54 is a second annular portion. The annular portion 54 is formed from, for example, a polyacetal resin. The permanent magnet 8, the cylinder 55, and the bearing 56 are provided in the space surrounding the inner peripheral surface of the annular portion 54. The permanent magnet 8, the cylinder 55, and the bearing 56 are arranged from the top portion 54b side of the annular portion 54 in the order of the permanent magnet 8, the cylinder 55, and the bearing 56. A feature of the layshaft gear 5F is that the bearing 56 and the cylinder 55 are used to press the permanent magnet 8 toward the top portion 54b of the annular portion 54. The shaft 143 illustrated in FIG. 42 is fixed to the main base 10 of the base portion 60 illustrated in FIG. 32 or the like. At the end of the shaft 143, the inner ring 56b of the bearing 56 is fix by press fit. The inner diameter of the inner peripheral surface of the annular portion 54 is slightly smaller than the outer diameter of the outer ring 56a of the bearing 56. This "slight" means a value that allows the bearing 56 to be press-fitted into the annular portion 54.

The outer diameter of the cylinder 55 is larger than the inner diameter of the outer ring 56a of the bearing 56 and is smaller than the outer diameter of the outer ring 56a. The inner diameter of the cylinder 55 is larger than the outer diameter of the inner ring 56b of the bearing 56. Accordingly, the cylinder 55 adjacent to the bearing 56 in the axial direction is not in contact the inner ring 56b of bearing 56 and but is in contact with the outer ring 56a of bearing 56. Thereby, it is possible to prevent the cylinder 55 from wearing due to the cylinder 55 contacting the inner ring 56b of the bearing 56 at the time of rotation.

When assembling the layshaft gear 5F, the permanent magnet 8 is first attached in the space surrounded by the inner peripheral surface of the annular portion 54, and then the cylinder 55 is attached. Meanwhile, the end portion of the shaft 143 is press fitted into the inner ring 56b of the bearing 56. The assembly of the shaft 143 and the bearing 56 into which the shaft 143 is fitted is press-fitted into the inner peripheral surface of the annular portion 54. At this time, the bearing 56 is pushed in the axial direction to contact the cylinder 55. As a result, the permanent magnet 8 becomes in a state of being sandwiched between the annular portion 54, the top portion 54b, and the cylinder 55. By using the cylinder 55, the distance from the bearing 56 to the permanent magnet 8 can be increased. Further, since the cylinder 55 is made of a non-magnetic metal material such as aluminum or copper, a resin material, or the like, in comparison to a case where the bearing 56 is configured to be in direct contact with the permanent magnet 8, it is possible to suppress the disturbance of the flow of the magnetic flux generated by the permanent magnet 8. It should be noted that the procedure of assembling the layshaft gear 5F is not limited thereto, and for example, after the permanent magnet 8, the cylinder 55, and the bearing 56 are fitted into the space surrounded by the inner peripheral surface of the annular portion 54, the end portion of the shaft 143 may be press-fitted into the inner ring 56b of the bearing 56. As described above, in the absolute encoder 100-2 according to the sixth modification, a coming-out preventing member is configured by the annular portion 54 and the bearing 56 that sandwich the permanent magnet 8 in the axial direction through the cylinder 55.

The opening 54a is formed in the top portion 54b of the annular portion 54 so as to surround the center axis when the annular portion 54 is viewed in the axial direction. The shape of the opening 54a is, for example, a shape obtained by combining a curved surface 54b1 having a first radius of curvature and a curved surface 54b2 having a second radius of curvature smaller than the first radius of curvature. By providing the opening 54a having such a shape, for example, the opening 54a is formed with a first area of a circle surrounding the center axis and a second area formed radially outside the first area. By applying the adhesive to the permanent magnet 8 provided to block the second area, the adhesive cures in a state of being bonded to the permanent magnet 8. Since the cured adhesive is anchored to the wall surface (curved surface 54b2 having the second radius of curvature) that forms the second area, it functions as a rotation stopper for the permanent magnet 8. Thus, by providing the opening 54a and then applying the adhesive, the permanent magnet 8 can rotate together with the layshaft gear 5F with more reliably. For example, even when the pressure force of the permanent magnet 8 in the axial direction by the cylinder 55 is smaller than a defined value, it is possible to suppress a deviation of the rotation angle of the permanent magnet 8 with respect to the rotation angle of the worm wheel portion 52e provided on the annular portion 54, and to suppress a decrease in the detection accuracy of the rotation angle or the rotation quantity of the layshaft gear 5F by the magnetic sensor 50.

The first layshaft gear 105 of the absolute encoder 100-1 according to the embodiment 1 may be configured to be similar to any one of the layshaft gears 5A, 5B, 5C, 5D, 5E, and 5F described in the first to sixth modifications. The second layshaft gear 138 of the absolute encoder 100-1 according to the embodiment 1 may be configured to be similar to any one of the layshaft gears 5A, 5B, 5C, 5D, 5E, and 5F described in the first to sixth modifications. By configuring the absolute encoder 100-1 in this manner, the permanent magnet 17 can be more securely fixed to the first layshaft gear 105 and the second layshaft gear 138.

In the embodiment 1 and 2, even when the fixing by an adhesive cannot be satisfactorily achieved, a magnet coming-out preventing structure that prevents the permanent magnet from coming out from the first layshaft gear 105 (layshaft gear 5), the second layshaft gear 138, or the like has been described. As described above, the reason why a magnet coming-out preventing structure is employed for the first layshaft gear 105 (layshaft gear 5) and the second layshaft gear 138 but is not employed for the spindle gear 101 (spindle gear 1) is as follows. In the first layshaft gear 105 (the layshaft gear 5) or the like, the number of revolutions of the spindle gear 101 (the spindle gear 1) is reduced. Therefore, considering the acceptable errors of the detection angles by the respective angle sensors, the acceptable error of the first layshaft gear 105 (the layshaft gear 5) or the like is larger than that of the spindle gear 101 (the spindle gear 1). Therefore, the acceptable amount of the shaft misalignment in the first layshaft gear 105 (the layshaft gear 5) or the like is higher than the acceptable amount of the shaft misalignment in the spindle gear 101 (the spindle gear 1). Axial misalignment refers, for example, to a state in which the center axis of the permanent magnet 8 is separated from the sensing element of the magnetic sensor 50 corresponding to the permanent magnet 8, for example, when the permanent magnet 8 is viewed in a plan view. The acceptable amount of the shaft misalignment indicates the amount of the shaft misalignment in a range in which the magnetic sensor 50 or the like can detect the magnetic flux and can output an appropriate angle signal even when the amount of the shaft misalignment increases. As described above, in the first layshaft gear 105 (the layshaft gear 5) of which the acceptable amount of the shaft misalignment is high, even when the permanent magnet 8 is attached without being press-fitted, the angle error caused by the magnetic sensor 50 or the like with respect to the change in the center offset value can be kept less than or equal to a defined value. Accordingly, by employing a magnet coming-out preventing structure for the first layshaft gear 105 (layshaft gear 5) or the like, an increase in the error of the rotation angle detected by the magnetic sensor 50 or the like can be suppressed while suppressing cracking of the permanent magnet 8 or the like due to press fit. For the reason as described above, in the first and embodiments 1 and 2, a magnet coming-out preventing structure is employed for the first layshaft gear 105 (layshaft gear 5) or the like but is not employed for the spindle gear 101 (spindle gear 1).

FIG. 43 is a diagram illustrating a permanent magnet 9A applicable to the absolute encoders 100-1 and 100-2 of the embodiments 1 and 2. FIG. 44 is a diagram illustrating a permanent magnet 9B applicable to the absolute encoders 100-1 and 100-2 of the embodiments 1 and 2. FIG. 43 illustrates the permanent magnet 9A according to the first configuration example. In the permanent magnet 9A, a first pole N having a first polarity and a second pole S having a second polarity which is different from the first polarity are arranged in a radial direction D1 of the permanent magnet 9A. FIG. 44 illustrates the permanent magnet 9B according to the second configuration example. In the permanent magnet 9B, the first pole N and the second pole S are arranged in the left half of the drawing along the center of the permanent magnet 9B in the axial direction D2 in the drawing of the permanent magnet 9B, while in the right half of the drawing, the first pole N and the second pole S are arranged in the axial direction D2 in the drawing of the permanent magnet 9 in the vertical direction opposite to the left half. An arrow "DM" illustrated in FIG. 43 and FIG. 44 indicate a magnetization direction.

Both the permanent magnet 9A and the permanent magnet 9B can be used as the permanent magnet 9 of the absolute encoders 100-1 and 100-2 of the embodiments 1 and 2. However, in the permanent magnet 9B, the magnetic field formed by the plurality of magnetic field lines is distributed so as to spread in the axial direction D2 compared to the magnetic field generated by the permanent magnet 9A. In contrast, in the permanent magnet 9A, the magnetic field formed by the plurality of magnetic field lines is distributed in the radial direction D1 relative to the magnetic field generated by the permanent magnet 9B. Therefore, when the permanent magnet 9A is used in the absolute encoders 100-1 and 100-2 of the embodiments 1 and 2, the magnetic field generated so as to spread out in the radial direction of the permanent magnet 9A tends to cause magnetic interference in which the magnetic flux is affected by the other magnetic sensors described above.

In the absolute encoders 100-1 and 100-2 according to the modifications of the embodiments 1 and 2, when the permanent magnet 9B is used as the permanent magnet 9, the leakage magnetic flux generated from the permanent magnet 9 is less likely to flow to the magnetic sensor 50 than when the permanent magnet 9A is used. Also, when the permanent magnet 9B is used as the permanent magnet 8, the leakage magnetic flux from the permanent magnet 8 is less likely to flow to the magnetic sensor 40 than when the permanent magnet 9A is used. As a result, it is possible to reduce the deterioration of the detection accuracy of the rotation angle or the rotation quantity of the layshaft gear 5 or the spindle gear 1. Further, the size of the absolute encoder 100-1 and 100-2 can further be reduced, to reduce the deterioration of the detection accuracy of the rotation angle or the rotation quantity.

The absolute encoder 100-1 according to the embodiment 1 is configured such that the center axes of the permanent magnets 8 and the magnet holder 6 coincide with each other as in the permanent magnets 8 and the magnet holder 6 illustrated in FIG. 26. The absolute encoder 100-1 according to the embodiment 1 is configured such that the center axes of the permanent magnets 17, and the second layshaft gears 138 coincide with each other as in the permanent magnets 8 and the magnet holder 6 illustrated in FIG. 26. The absolute encoder 100-1 according to the embodiment 1 is configured such that the center axes of the permanent magnets 9 and the spindle gear 1 coincide with each other as in the permanent magnet 9 and the spindle gear 1 illustrated in FIG. 27. With these configurations, the absolute encoder 100-1 according to the embodiment 1 is capable of detecting the rotation angle or the rotation quantity with higher accuracy.

It should be noted that the configuration illustrated in one or more embodiments described above is an example of the present invention. The configuration can be combined with another known technique. Alternatively, a portion of the configuration can be omitted or changed without departing from a spirit of the present invention.

It should be noted that the present application is based on and claims priority to the Japanese Patent Application No. 2019-066046, filed Mar. 29, 2019, the contents of which are incorporated herein by reference in their entirety.

DESCRIPTION OF THE REFERENCE NUMERALS

1 spindle gear, 1*a* first cylindrical portion, 1*b* second cylindrical portion, 1*c* communicating portion, 1*d* worm gear portion, 1*e* bottom surface, 1*f* press-fitting portion, 1*g* bottom surface, 1*h* magnet holder, 2 intermediate gear, 2*a* worm wheel portion, 2*b* worm gear portion, 2*c* bearing portion, 2*d* press-fitting portion, 2*e* sliding portion, 2*f* bottom surface, 2*g* through hole, 3 bearing, 3*a* outer ring, 3*b* inner ring, 3*c* side surface, 3*d* side surface, 4 shaft, 4*a* one end, 4*b* other end, 5 layshaft gear, 5-1 top surface, 5A layshaft gear, 5A1 resin sheet, 5A11 lid, 5A12 brim portion, 5A2 resin gear portion, 5A3 resin gear portion, 5B layshaft gear, 5C layshaft gear, 5D layshaft gear, 5E layshaft gear, 5F layshaft gear, 5*a* worm wheel portion, 5*b* through hole, 6 magnet holder, 6*a* magnet holding portion, 6*b* shaft, 6*c* head, 7 bearing, 7*a* outer ring, 7*b* inner ring 8 permanent magnet, 8*a* surface, 9 permanent magnet, 9A permanent magnet, 9*a* top surface, 9*b* bottom surface, 10 main base, 10-1 opening, 10-2 bottom surface, 10*a* hole, 10*aa* recess, 10*ab* recess, 10*ac* recess, 10*ad* attaching surface, 10*ae* threaded hole, 10*b* hole, 10*c* contact surface, 10*d* bearing holder portion, 10*da* lower portion, 10*db* upper portion, 10*dc* inner peripheral surface, 10*e* leaf spring attaching surface, 10*f* threaded hole, 10*g* substrate positioning pin, 10*g*1 base portion, 10*h* tip end, 10*i* stepped portion, 10*j* substrate positioning pin, 10*j*1 base portion, 10*k* tip end, 10*l* stepped portion, 10*m* post, 10*p* top end surface, 10*q* post, 10*r* top end surface, 10*s* post, 10*t* top end surface, 10*u* threaded hole, 10*v* threaded hole, 10*w* threaded hole, 11 leaf spring, 11*a* sliding portion, 11*b* attaching portion, 11*c* hole, 11*d* base portion, 12 screw, 13 substrate attaching crew, 14 screw, 15 case, 15-1 top surface, 15A first side surface, 15B second side surface, 15C third side surface, 15D fourth side surface, 15*a* tab, 15*b* tab, 15*c* tab, 15*d* hole, 15*e* recess, 15*f* recess, 15*g* recess, 15*h* connector case, 15*i* opening, 16 attaching screw, 17 permanent magnet, 20 substrate, 20-1 bottom surface, 20-2 top surface, 20a positioning hole, 20b positioning hole, 20c hole, 20e hole, 21 microcomputer, 21b table processing part, 21c rotation quantity determination part, 21e output part, 21p rotation angle acquisition part, 21q rotation angle acquisition part, 22 bidirectional driver, 23 line driver, 24 connector, 40 magnetic sensor, 40a surface, 50 magnetic sensor, 50a surface, 51 first annular portion, 51a groove, 51b first inner peripheral surface, 51c second inner peripheral surface, 51d first stepped portion, 51e protrusion, 52 second annular portion, 52a cylindrical portion, 52b third inner peripheral surface, 52c fourth inner peripheral surface, 52d second stepped portion, 52e warm wheel portion, 53 third annular portion, 53a fifth inner peripheral surface, 54 annular portion, 54a opening, 54b top portion 54b1 curved surface, 54b2 curved surface, 55 cylinder, 56 bearing, 56a outer ring, 56b inner ring, 60 base portion, 70 wall, 71 wall section, 72 wall section, 73 side surface, 80 wall, 81 first end surface, 82 second end surface, 90 magnetic sensor, 100-1 absolute encoder, 100-2 absolute encoder, 101 spindle gear, 101a first cylindrical portion, 101b disk portion, 101c worm gear, 101d magnet holder, 102 first intermediate gear, 102a worm wheel portion, 102b first worm gear portion, 102c base portion, 102d first cylindrical portion, 102e second cylindrical portion, 102f third cylindrical portion, 102g hemispherical projection, 102h second worm gear portion, 102i sliding portion, 104 shaft, 105 first layshaft gear, 105a worm wheel portion, 105b bearing portion, 105c disk portion, 105d holder, 106 shaft, 107 retaining ring, 108 snap ring, 110 main base, 110a base portion, 110b support portion, 110c support portion, 110c leaf spring, 111a sliding portion, 111b attaching portion, 115 case, 115a outer wall section, 115b outer wall section, 115c outer wall section, 115d outer wall section, 116 lid, 117 adhesive, 120 substrate, 121 microcomputer, 121b table processing part, 121c rotation quantity determination part, 121e output part, 121p rotation angle acquisition part, 121q rotation angle acquisition part 121r rotation angle acquisition part, 122 substrate attaching screws, 124 annular portion, 124a first inner peripheral surface, 124b second inner peripheral surface, 124c first stepped portion, 124d third inner peripheral surface, 124e second stepped portion, 124f worm wheel portion, 125 cylindrical portion, 125c end portion, 126 recess, 126a bottom portion, 126b boundary portion, 127 adhesive, 128 inner peripheral surface, 133 second intermediate gear, 133a worm wheel portion, 133b bearing portion, 133c flange portion, 133d fourth driving gear portion, 134 shaft, 138 second layshaft gear, 138a fourth driven gear portion, 138b bearing portion, 138c flange portion, 138d magnet holder, 139 shaft, 141 support, 164 screws, 170 intermediate cylindrical portion, 170a outer peripheral surface, 170b inner peripheral surface, 200 motor, 201 motor shaft, 201a tip end, 202 housing, 202a cutout portion, 301 first side, 302 second side, 303 third side, 304 fourth side, 400 connector.

The invention claimed is:

1. An absolute encoder comprising:
a first driving gear configured to rotate according to rotation of a spindle;
a first driven gear having a center axis perpendicular to a center axis of the first driving gear and configured to engage with the first driving gear;
a second driving gear provided coaxially with the first driven gear and configured to rotate according to rotation of the first driven gear;
a second driven gear having a center axis perpendicular to the center axis of the first driven gear and configured to engage with the second driven gear;
a magnet provided on a cylindrical member where the second driven gear is formed; and
a coming-out preventing member provided on the cylindrical member and configured to prevent the magnet from coming out from the cylindrical member in an axial direction.

2. The absolute encoder according to claim 1,
wherein the cylindrical member includes an annular portion surrounding an outer peripheral surface of the magnet,
wherein the coming-out preventing member includes a plate shaped member facing an end surface in the axial direction of the magnet, and
wherein the plate shaped member closes an opening formed in the annular portion.

3. The absolute encoder according to claim 1,
wherein the cylindrical member includes an annular portion surrounding an outer peripheral surface of the magnet,
wherein the coming-out preventing member includes a protruding member facing an end surface in the axial direction of the magnet, and
wherein the protruding member extends from the annular portion toward a radial center of the annular portion.

4. The absolute encoder according to claim 1,
wherein the cylindrical member includes an annular portion in which a space in which the magnet is arranged is formed,
wherein an annular cylindrical portion is provided between an inner peripheral surface of the annular portion and an outer peripheral surface of the magnet,
wherein an adhesive is provided between an inner peripheral surface of the cylindrical portion and the outer peripheral surface of the magnet, and
wherein the coming-out preventing member includes the cylindrical portion and the adhesive.

5. The absolute encoder according to claim 1,
wherein the cylindrical member includes
a cylindrical portion facing a first end surface in the axial direction of the magnet and that is cylindrical and
an annular portion facing a second end surface opposite to the first end surface of the magnet, where the cylindrical portion is fitted inside, and that is annular, and
wherein the coming-out preventing member includes the cylindrical portion and the annular portion to sandwich the magnet in the axial direction.

6. The absolute encoder according to claim 1,
wherein the cylindrical member includes an annular portion surrounding an outer peripheral surface of the magnet,
wherein a depression is formed on an inner peripheral surface of the annular portion to depress radially outward from a center of the annular portion in a radial direction,
wherein an adhesive that adheres to the outer peripheral surface of the magnet is provided in the depression, and
wherein the coming-out preventing member includes the depression and the adhesive.

7. The absolute encoder according to claim 1,
wherein the cylindrical member includes
- a first annular portion facing a first end surface in the axial direction of the magnet,
- a bowl-shaped second annular portion having a bottom portion facing a second end surface opposite to the first end surface of the magnet, and
- a bearing provided on a side opposite to the magnet side of the first annular portion, wherein the coming-out preventing member includes the first annular portion and the bearing to sandwich the magnet in the axial direction through the second annular portion.

* * * * *